(12) United States Patent
Kinpara et al.

(10) Patent No.: US 7,423,401 B2
(45) Date of Patent: Sep. 9, 2008

(54) AC ROTARY MACHINE CONSTANT MEASURING APPARATUS FOR MEASURING CONSTANTS OF STATIONARY AC ROTARY MACHINE

(75) Inventors: Yoshihiko Kinpara, Tokyo (JP); Takahiko Kobayashi, Tokyo (JP); Masahiro Fukuta, Tokyo (JP); Takumi Oonuma, Tokyo (JP)

(73) Assignees: Mitsubishi Denki Kabushiki Kaisha, Tokyo (JP); Mitsubishi Electric Building Techno-Service Co., Ltd., Tokyo (JP)

(*) Notice: Subject to any disclaimer, the term of this patent is extended or adjusted under 35 U.S.C. 154(b) by 28 days.

(21) Appl. No.: 11/572,153

(22) PCT Filed: Dec. 28, 2004

(86) PCT No.: PCT/JP2004/019584

§ 371 (c)(1),
(2), (4) Date: Jan. 16, 2007

(87) PCT Pub. No.: WO2006/008846

PCT Pub. Date: Jan. 26, 2006

(65) Prior Publication Data

US 2008/0018284 A1    Jan. 24, 2008

(30) Foreign Application Priority Data

Jul. 21, 2004  (JP) ............................. 2004-213124

(51) Int. Cl.
*G01R 31/02* (2006.01)
*H02P 27/04* (2006.01)

(52) U.S. Cl. ................... 318/490; 318/800; 318/801; 318/807; 318/700

(58) Field of Classification Search ................. 318/148, 318/490, 700, 727, 800, 801, 807
See application file for complete search history.

(56) References Cited

U.S. PATENT DOCUMENTS 4,792,742 A * 12/1988 Fujimoto et al. ............ 318/805

(Continued)

FOREIGN PATENT DOCUMENTS

JP    62-262697    11/1987

(Continued)

OTHER PUBLICATIONS

Y. Murai, et al., "Three-Phase Current-Waveform-Detection on PWM Inverters from DC Link Current-Steps", Proceedings of IPEC-Yokohama 1995, Apr. 1995, pp. 271-275.

(Continued)

*Primary Examiner*—Long Nguyen
*Assistant Examiner*—Thai T Dinh
(74) *Attorney, Agent, or Firm*—Oblon, Spivak, McClelland, Maier & Neustadt, P.C.

(57) ABSTRACT

In an apparatus measuring constants of an induction motor, an inverter converts an inputted voltage command signal into a single-phase AC power and feeds the single-phase AC power to the induction motor, and a current detector detects a current of the single-phase AC power fed to the induction motor. An apparatus controller generates a voltage command signal corresponding to an AC voltage as applied to the induction motor and outputs the voltage command signal to the inverter and gerates the voltage command signal and controls the inverter to feed the single-phase AC power having a frequency selected in a range equal to or higher than 0.006 Hz and equal to or lower than 1.5 Hz to the induction motor. A constant calculation controller calculates constants of the induction motor based on the voltage and current of the single-phase AC power fed to the induction motor.

20 Claims, 31 Drawing Sheets

U.S. PATENT DOCUMENTS

| | | | | |
|---|---|---|---|---|
| 5,475,293 | A | * 12/1995 | Sakai et al. | 318/802 |
| 5,751,132 | A | * 5/1998 | Horvath et al. | 318/798 |
| 5,861,728 | A | 1/1999 | Tazawa et al. | |
| 6,879,130 | B2 | * 4/2005 | Iwashita et al. | 318/807 |
| 6,933,701 | B2 | * 8/2005 | Kinpara et al. | 318/700 |
| 6,960,898 | B2 | * 11/2005 | Sato | 318/400.26 |
| 7,312,594 | B2 | * 12/2007 | Yasui et al. | 318/700 |
| 2006/0290338 | A1 | 12/2006 | Kinpara et al. | |

FOREIGN PATENT DOCUMENTS

| | | |
|---|---|---|
| JP | 3-117347 | 5/1991 |
| JP | 6-98595 | 4/1994 |
| JP | 6-153568 | 5/1994 |
| JP | 7-20214 | 1/1995 |
| JP | 7-55899 | 3/1995 |
| JP | 7-298687 | 11/1995 |
| JP | 9-304489 | 11/1997 |
| JP | 2759932 | 3/1998 |
| JP | 11 113300 | 4/1999 |
| JP | 2929344 | 5/1999 |
| JP | 3052315 | 4/2000 |
| JP | 2001 103798 | 4/2001 |
| JP | 2001 112285 | 4/2001 |
| JP | 3284602 | 3/2002 |
| JP | 2003244982 | 8/2003 |
| JP | 2003-339198 | 11/2003 |
| WO | WO 2004/109310 A1 | 12/2004 |

OTHER PUBLICATIONS

Citizen Watch Co., Ltd., Information Bureau, "Questionnaires on "Time Day" (Jun. 10), and Businesspersons' Sense of "Waiting Time" ", http://www.citizen.co.jp/info/news.html and http://www.citizen.co.jp/release/03/0304dn/0305dn_t.htm, published on May 28, 2003, pp. 1-19 (with partial English translation).

* cited by examiner

Fig. 11

| CLASS OF INVERTER 2 | RATED CAPACITY [kW] | WIDTH [mm] | HEIGHT [mm] | DEPTH [mm] |
|---|---|---|---|---|
| CLASS A | 1.5 | 150 | 260 | 140 |
| | 2.2 | | | |
| CLASS B | 3.7 | 220 | 260 | 170 |
| | 5.5 | | | |
| | 7.5 | | | |
| CLASS C | 11 | 250~300 | 400~450 | 190~195 |
| | 15 | | | |
| | 18.5 | | | |
| CLASS D | 22 | 340~450 | 525~530 | 195~250 |
| | 30 | | | |
| | 37 | | | |
| CLASS E | 45 | 480 | 700 | 250~270 |
| | 55 | | | |
| CLASS F | 75~ | 480~ | 740~ | 360~ |

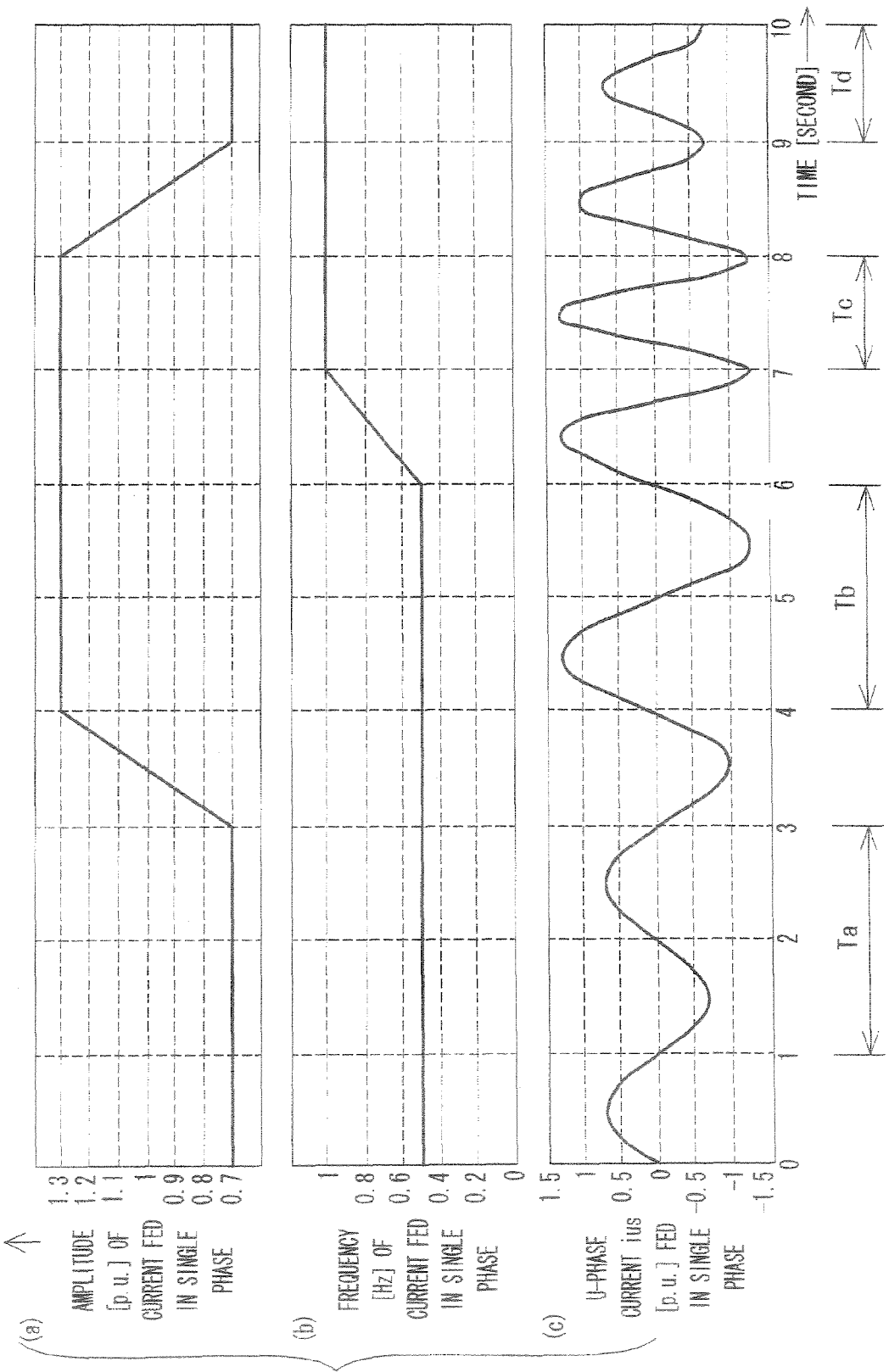

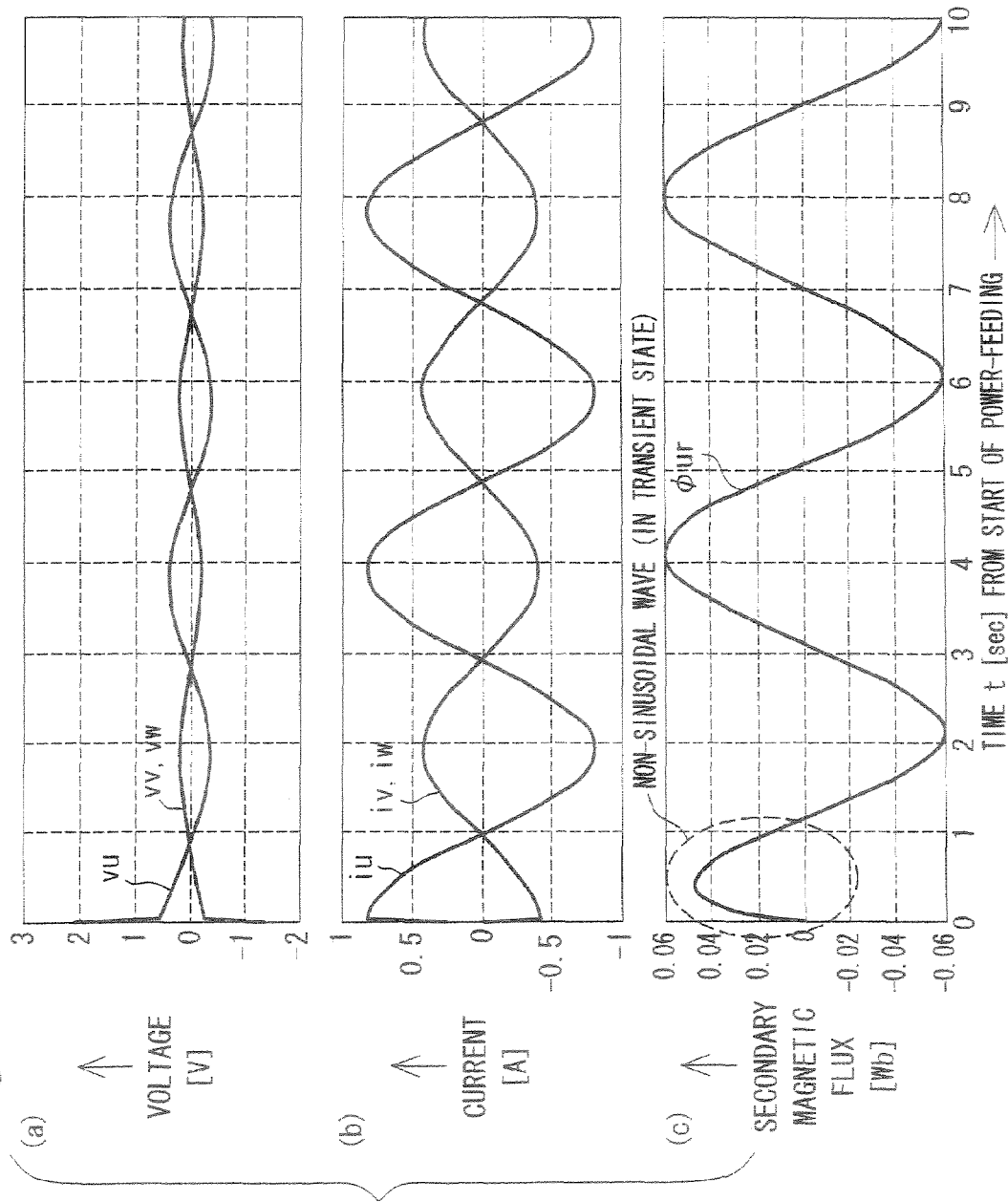

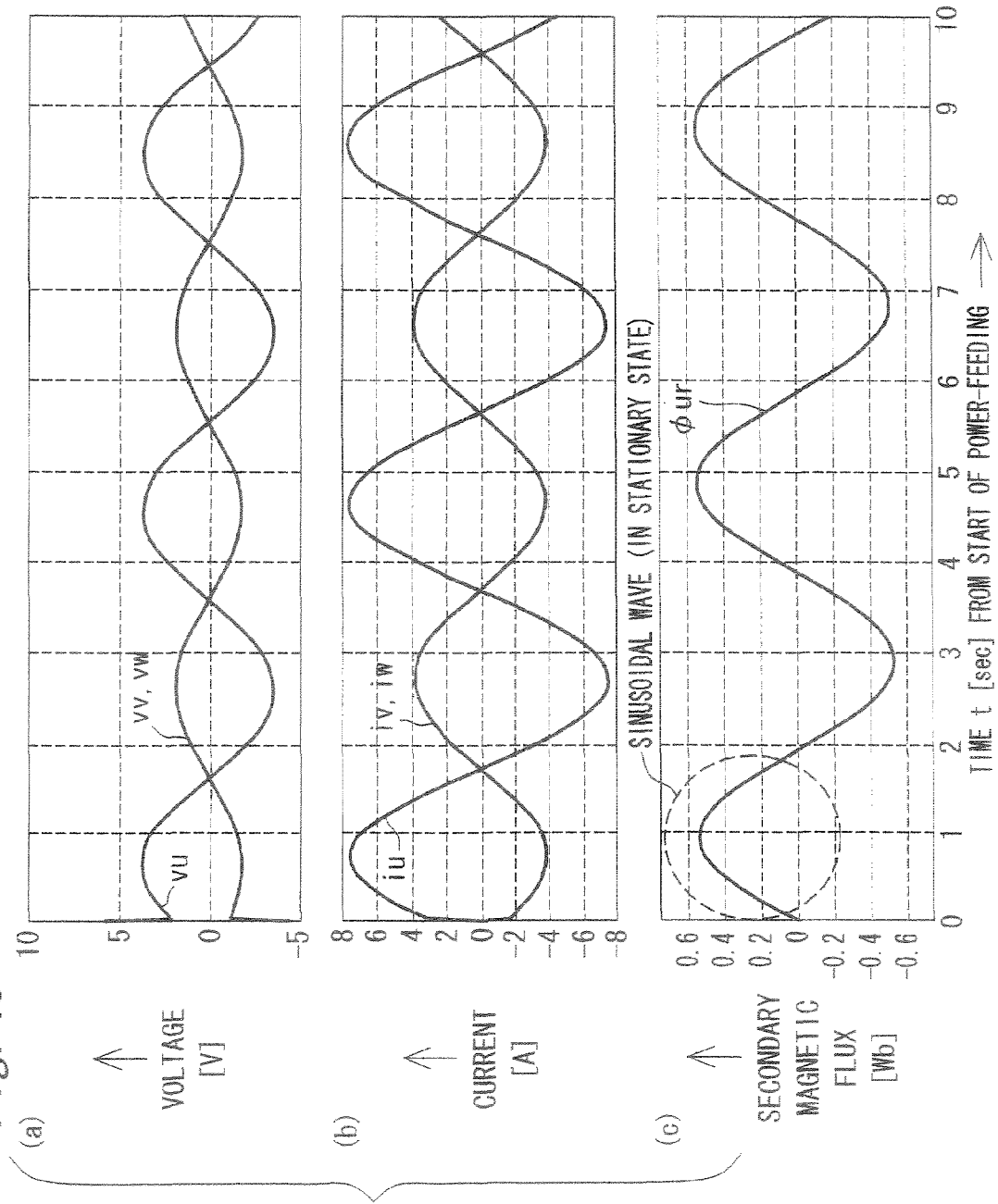

AC ROTARY MACHINE CONSTANT MEASURING APPARATUS FOR MEASURING CONSTANTS OF STATIONARY AC ROTARY MACHINE

TECHNICAL FIELD

The present invention relates to an AC (Alternating Current) rotary machine constant measuring apparatus for measuring electric constants of a stationary AC rotary machine.

BACKGROUND ART

A control apparatus, that controls driving of an AC rotary machine such as an induction motor, an induction generator, a synchronous motor, and a synchronous generator, is required to obtain electric constants such as a resistance and an inductance of the AC rotary machine. The inductance of the rotary machine that is not connected to a load machine can be measured by no-load test. However, the rotary machine connected to the load machine cannot be subjected to any no-load test. Therefore, it is conventionally required to measure the constants of the rotary machine that do not need to be subjected to any no-load test.

As disclosed on page 3 of a Patent document 1, for example, in a rotary machine constant measuring apparatus of a prior art, a single-phase AC voltage having a frequency f1 is applied between two of three-phase input terminals of an induction motor in a stopped state, an AC current flowing and an AC voltage which is applied in the induction motor are detected, an amplitude and a phase of a fundamental wave are calculated based on the detected AC current and AC voltage, and a sum of primary and secondary leakage inductances and a sum of primary and secondary winding resistances are calculated from a relationship between the calculated amplitude and phase.

In addition, as disclosed on page 4 of Patent Document 2, a sinusoidal wave modulated signal is generated by a single-phase AC excitation processing, the generated sinusoidal wave modulated signal is inputted to an inverter through a gate circuit, the inverter is then actuated, an AC motor is driven by an AC excitation voltage converted into a power by the inverter, to make AC current flow in the AC motor. Thereinafter, in a calculation processing for an effective power current Iq (means a current for effective power) and an effective power current Id (means a current for effective power), the effective power current Iq and the ineffective power current Id are calculated based on a signal $\sin\theta$, a signal $-\cos\theta$, and a U-phase motor current iu, where $\theta$ is a rotational phase of an AC excitation voltage vector as obtained by integrating a primary frequency command. Further, in a calculation processing for a combined resistance of primary and secondary resistances and a combined leakage inductance of primary and secondary combined leakage inductances, a sum of the primary and secondary leakage inductances and a sum of the primary and secondary winding resistances are calculated from the calculated effective power current Iq and ineffective power current Id, and a magnitude of the excitation voltage command.

Furthermore, as disclosed in, for example, Patent Document 3, measuring conditions are set so as to be that the command values of a primary angular frequency command and a q-axis voltage command are both zero, and that an AC signal is applied as a command value of a d-axis voltage command. If a measurement is conducted according to these measuring conditions, then any three-phase AC currents do not flow but a V-phase current and a W-phase current become in phase, and a single-phase AC current flows. Therefore, the AC motor can be kept in a stopped state without rotating the same motor. When the rotation of the AC motor is stopped, a d-axis current component flowing in the AC motor is detected, a detection value of the detected d-axis current component is analyzed according to a Fourier expansion by means of a trigonometric function based on the d-axis voltage command value, and the constants of the AC motor are calculated based on a Fourier coefficient of a fundamental wave component and the d-axis voltage command value.

Moreover, for example, Patent Document 4 discloses a induction motor constant measuring method using an inverter. In this case, a lock test is conducted using two frequencies near a slip frequency at which an induction motor actually operates, and a leakage reactance including an excitation inductance and a secondary resistance are calculated. With this method, the single-phase AC voltages having two different angular frequencies $\omega a$ and $\omega b$ near a frequency at which the induction motor operates are applied to an input terminal of the induction motor, and resistances Ra and Rb and inductances Xa and Xb that are serial impedance components when seen from a motor terminal are measured based on currents with the respective angular frequencies $\omega a$ and $\omega b$.

Further, for example, Patent Document 5 discloses an induction motor constant measuring method capable of easily measuring respective constants of a vector control induction motor using only a winding resistance measurement and a lock test. This constant measuring method is provided for measuring the respective constants of a T-1 type equivalent circuit of the induction motor during the lock test when an excitation inductance is connected to a common contact point to a leakage inductance and a secondary resistance. With this constant measuring method, the wiring resistance measurement is conducted, and the lock test using a first frequency out of two arbitrary different frequencies are first performed to measure a resistance component R and a reactance component X of a combined impedance. The lock test is then conducted again using a second frequency to measure a resistance component R' and a reactance component X' of the combined impedance. These resistance components and reactance components are calculated, and this leads to measurement of the respective constants of the induction motor.

Additionally, Patent Document 6 discloses an induction motor constant measuring method including the following steps for calculating induction motor constants:

(a) applying a predetermined voltage having a first frequency to an induction motor, and measuring a magnitude of an induction motor current corresponding to the applied predetermined voltage having the first frequency, and a phase difference between the induction motor current and the applied predetermined voltage having the first frequency.

(b) applying a predetermined voltage having a second frequency different from the first frequency to the induction motor, and measuring a magnitude of an induction motor current corresponding to the applied predetermined voltage having the second frequency, and a phase difference between the induction motor current and the applied predetermined voltage having the second frequency.

(c) calculating the induction motor constants using a magnitude of the applied predetermined voltage having the first frequency, the magnitude of the induction motor current corresponding to the applied predetermined voltage having the first frequency, the phase difference between the induction motor current and the applied predetermined voltage having the first frequency, a magnitude of the applied predetermined voltage having the second frequency, the magnitude of the induction motor current corresponding to the applied predetermined voltage having the second frequency, and the phase difference between the induction motor current and the applied predetermined voltage having the second frequency.

In the prior art, the measurement is conducted twice by changing the frequency condition. On the other hand, this induction motor constant measuring method is characterized by superimposing the predetermined voltage having the first frequency and the predetermined voltage having the second frequency, and by simultaneously applying the voltages to the induction motor. Then the above-mentioned voltage application step can be completed by one measurement.

Patent document 1: Japanese patent No. 2759932;
Patent document 2: Japanese patent No. 3284602;
Patent document 3: Japanese patent No. 2929344;
Patent document 4: Japanese patent No. 3052315;
Patent document 5: Japanese patent laid-open publication No. JP-06-153568-A
Patent document 6: Japanese patent laid-open publication No. JP-2003-339198-A;
Non-patent document 1: Y. Murai et a., "Three-Phase Current-Waveform-Detection on PWM Inverters from DC Link Current-Steps", Proceedings of IPEC-Yokohama 1995, pp. 271-275, Yokohama, Japan, April 1995.
Non-patent document 2: Citizen Watch Co., Ltd., Information Bureau, "Questionnaires on "Time Day" (June 10), and Businessperson's Sense of "Waiting Time"", http://www.citizen.co.jp/info/news.html and http://www.citizen.co.jp/release/03/0304dn/0305dn_t.htm, published on May 28, 2003.

DISCLOSURE OF THE INVENTION

Problems by Dissolved by the Invention

The above-mentioned AC rotary machine constant measuring apparatus calculates the constants of the AC rotary machine based on the relationship between a AC voltage and a AC current fed in a single-phase. However, there has been no guideline to set the frequency of the AC power fed in the single-phase. There has been also no guideline to set the number of power-feeding cycles when feeding the single-phase AC. As a result, it is disadvantageously impossible to keep the accuracy or precision as obtained when measuring the constants of the rotary machine equal to or larger than a predetermined value. Further, when the measuring accuracy is improved, the waiting time for measuring the constants becomes longer, and this leads to such a problem as undesirable state to the user of the apparatus.

In addition, due to a voltage error resulting from a resolution of a voltage of the inverter and an internal dead time voltage (where the dead time voltage means a switching-off time, and a time difference between switching on and switching off, and it similarly applies to hereinafter), and an ON voltage of a switching element, there is caused such a problem as deterioration in the constant accuracy. Further, when the sum of a primary winding resistance and a secondary winding resistance or the serially combined impedance component is converted into the constants, the primary resistance should be separately measured by any method. In this case, there is such a problem that the error of the primary resistance leads to deterioration in accuracies of the other constants.

It is an object of the present invention to provide an AC rotary machine constant measuring apparatus that can solve the above-mentioned problems, that can measure electric constants of an AC rotary machine with higher accuracy than that of the prior art, and that can be comfortably operated by the user.

Means for Solving the Problems

According to the present invention, there is provided an apparatus for measuring constants of an AC rotary machine. The measuring apparatus includes the AC rotary machine, power conversion means, current detection means, first control means, and second control means. The power conversion means converts an inputted voltage command signal into a single-phase AC power, and feeding the single-phase AC power to the AC rotary machine, and the current detection means detects a current of the single-phase AC power fed from the power conversion means to the AC rotary machine. The first control means generates a voltage command signal corresponding to an AC voltage to be applied to the AC rotary machine from the power conversion means, and outputting the generated voltage command signal to the power conversion means, and the second control means calculates the constants of the AC rotary machine based on a relationship between the voltage and the current of the single-phase AC power fed to the AC rotary machine. The first control means generates the voltage command signal and controls the power conversion means so as to feed the single-phase AC power having at least one frequency selected in a range, which is equal to or higher than a lower limit frequency of 0.006 Hz, and which is equal to or lower than an upper limit frequency of 1.5 Hz, to the AC rotary machine at least once, so that the second control means calculates the electric constants of the AC rotary machine.

Effects of the Invention

Therefore, according to the AC rotary machine constant measuring apparatus of the present invention, the measuring apparatus can measure electric constants such as the primary inductance, the secondary resistance and the secondary time constant of the AC rotary machine having a rated capacity of, for example, at least 1.5 kW to 280 kW with higher accuracy than that of the prior art, even when the AC rotary machine is connected to a load equipment or machine. In addition, the measuring apparatus of the present invention can quickly measure the electric constants of the AC rotary machine, and can comfortably measure them within quite a shorter time without making the machine user has any consciousness of the waiting time.

BRIEF DESCRIPTION OF THE DRAWINGS

FIG. 4(a) is a waveform chart of signals cos($2\pi f_{LR} t$) and −sin($2\pi f_{LR} t$), FIG. 4(b) is a waveform chart of a voltage command signal v*, FIG. 4(c) is a waveform chart of an amplitude B1 of a quadrature phase component, and FIG. 4(d) is a waveform chart of an amplitude A1 of an in-phase component.

FIG. 11 is a table exemplary showing rated capacities and external dimensions relative to respective classes of an inverter 2 shown in FIG. 1.

FIG. 33(a) is a waveform chart showing a current command signal iusq* and its fundamental wave component iubase* when a current command signal iu* is a rectangular wave, and FIG. 33(b) is a waveform chart showing a voltage command signal vusq* at that time.

FIG. 34(a) is a waveform chart showing a current command signal iuc*, FIG. 34(b) is a waveform chart that depict signals Kc·cos(2πft) and Kc·sin(2πft), and FIG. 34(c) is a waveform chart showing a voltage command signal vuc*.

FIG. 35(a) is a waveform chart of a current command signal iu* having a modulated amplitude, and FIG. 35(b) is a waveform chart of a voltage command signal vu* having a modulated amplitude.

FIG. 36(a) is a waveform chart of the current command signal iu* having a modulated frequency, and FIG. 36(b) is a waveform chart of a voltage command signal vu* having a modulated frequency.

FIG. 39(a) is a waveform chart showing an amplitude of a current fed in single phase, and FIG. 39(b) is a waveform chart showing a U-phase current ius of an induction motor 1 fed in single phase.

FIG. 41 shows states of feeding a single-phase AC power in an induction motor constant measuring apparatus according to a nineteenth preferred embodiment of the present invention, where FIG. 41(a) is a waveform chart showing an amplitude of a current fed in single phase, FIG. 41(b) is a waveform chart showing a frequency of the current fed in single phase, and FIG. 41(c) is a waveform chart showing a U-phase current ius of an induction motor 1 fed in single phase.

FIG. 42 shows waveform charts when a current command signal iu* is applied so that a current reaches a wave peak value at a power-feeding start time according to a twentieth preferred embodiment of the present invention, where FIG. 42(a) is a waveform chart of three-phase voltages vu, vv, and vw of an induction motor at that time, FIG. 42(b) is a waveform chart of three-phase currents iu, iv and iw of the induction motor at that time, and FIG. 42(c) is a waveform chart showing a secondary magnetic flux φur of the induction motor at that time.

FIG. 43 shows waveform charts when the current command signal iu* is applied so that the secondary magnetic flux φur becomes zero at a power-feeding start time according to the twentieth preferred embodiment of the present invention, where FIG. 43(a) is a waveform chart of three-phase voltages vu, v, and vw of the induction motor at that time, FIG. 43(b) is a waveform chart of three-phase currents iu, iv and iw of the induction motor at that time, and FIG. 43(c) is a waveform chart showing the secondary magnetic flux φur of the induction motor at that time.

DESCRIPTION OF NUMERICAL REFERENCES

1 . . . Induction motor
2 and 2A . . . Inverter,
3 . . . Current detector,
4, 4A, 4B, and 4C . . . Apparatus controller,
5, 5A, 5B, and 5C . . . Constant calculation controller,
5m . . . Internal memory,
8, 8A, and 10 . . . Signal source,
11 . . . Subtracter,
12 . . . Deviation amplifier,
13 . . . Sign inverter, and
13a, and 13b . . . Multiplier.

BEST MODE FOR CARRYING OUT THE INVENTION

Preferred embodiments of the present invention will be described hereinafter with reference to the drawings. Like components are denoted by the sa e reference symbols, respectively.

First Preferred Embodiment

Figure 1:
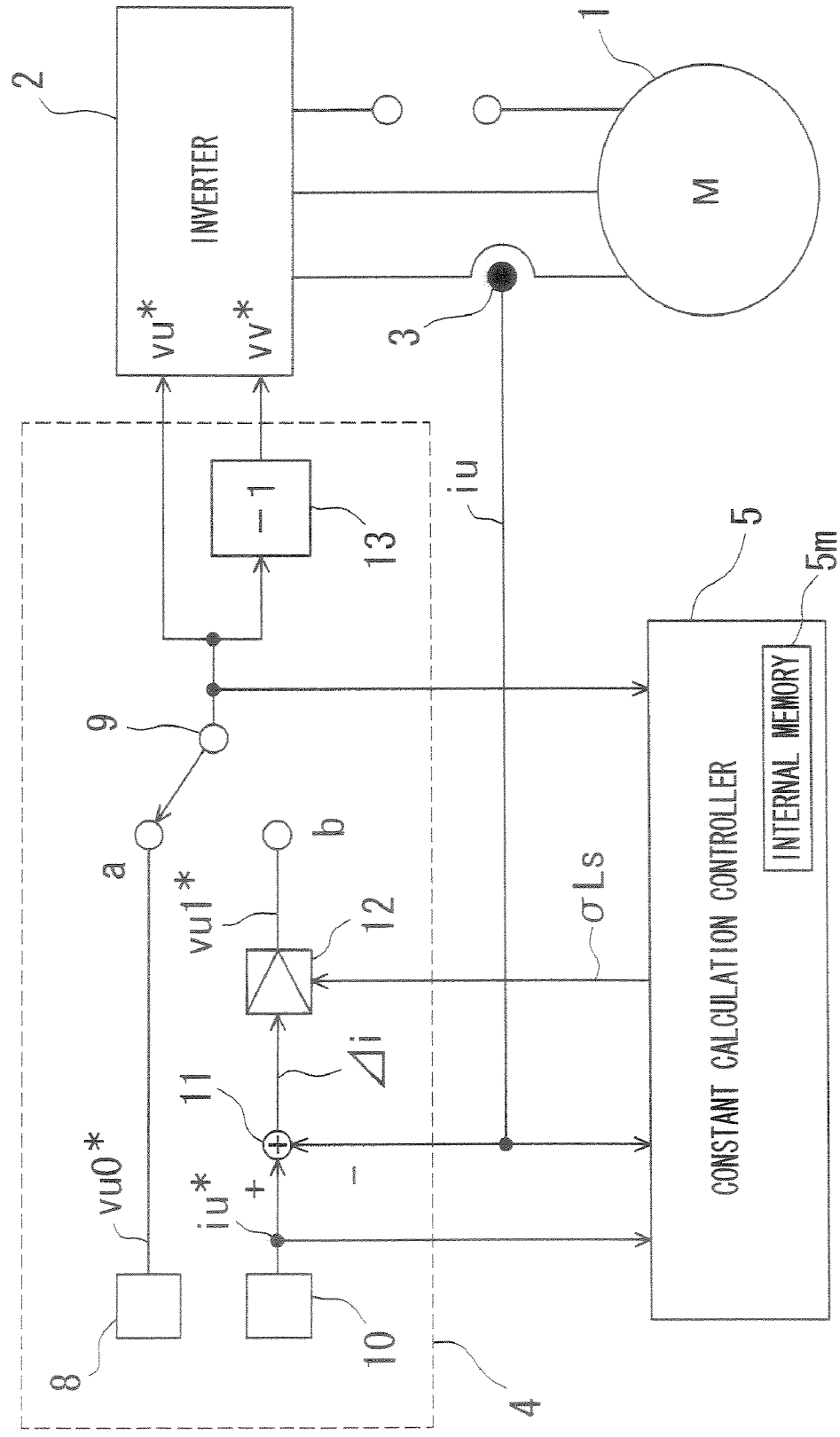
FIG. 1 is a block diagram showing a configuration of an induction motor constant measuring apparatus according to a first preferred embodiment of the present invention.

FIG. 1 is a block diagram showing a configuration of an induction motor constant measuring apparatus according to a first preferred embodiment of the present invention. Referring to FIG. 1, a three-phase induction motor 1 of an AC rotary machine is electrically connected to an inverter 2. In order to feed a single-phase power to the induction motor 1, the inverter 2 opens one of three phases of a U phase, a V phase, and a W phase. In order to do so, an upper arm and a lower arm may be opened by as much as single phase of the inverter 2 or only single phase of the induction motor 1 may be disconnected In other words, the inverter 2 generates an AC voltage in a single-phase feeding state and applies the generated AC voltage to the induction motor 1 so as not to generate a rotating magnetic field and a rotational torque in the induction motor 1, based on two voltage command signals vu* and vv* of inputted DC signal. In addition, a current detector 3 detects a single-phase current iu fed from the inverter 2 to the induction motor 1, and outputs a current signal indicating the detected current iu to a constant calculation controller 5 and outputs the sa e signal to a subtracter 11. The current detector 3 may employ a well-known method for detecting the current iu from a DC link current of the inverter 2 (See, for example, the Non-Patent Document 1) other than the method for directly detecting the U-phase current as shown in FIG. 1.

An apparatus controller 4, which is configured by, for example, a digital calculator, calculates voltages vu* and *vv to be applied to the induction motor 1, and outputs the calculated voltages vu* and vv* to the inverter 2. In addition, the constant calculation controller 5, which is configured by, for example, a digital calculator that includes an internal memory 5m, calculates the constants of the induction motor 1 from a relationship between the voltage command signal vu* and the current iu when the single-phase current is fed to the induction motor 1 from the inverter 2, and outputs one of the calculated motor constants such as a leakage inductance σLs to a deviation amplifier 12. In this case, the apparatus controller 4 includes a switch 9, two signal sources 8 and 10, the subtracter 11, the deviation amplifier 12, and a sign inverter 13. The signal source 8 generates an AC voltage command signal vu0* having a frequency f0, and outputs the generated voltage command signal vu0* as the voltage command signal vu* to the inverter 2 through a contact "a" of the switch 9. In addition, the signal source 8 outputs the voltage command signal vu0* as the voltage command signal vv* to the inverter 2 through the contact "a" of the switch 9 and the sign inverter 13 that inverts a sign by multiplying the signal by (−1). Further, the signal source 10 generates a current command signal iu*, and outputs the generated current command signal iu* to the constant calculation controller 5 and the subtracter 11. The subtracter 11 subtracts the current iu detected by the current detector 3 from the inputted current command signal iu*, and outputs a current deviation signal indicating a current deviation Δi that is a subtraction value to the deviation amplifier 12. The deviation amplifier 12 amplifies the inputted current deviation signal by multiplying the signal by the leakage inductance σLs calculated by the constant calculation controller 5 calculates a voltage command signal vu1* indicating the amplified current deviation signal, and outputs the calculated voltage command signal vu1* to the inverter 2 through a contact "b" of the switch 9, and outputs the same signal to the inverter 2 through the contact "b" of the switch 9 and the sign inverter 13 as the voltage command signal vv*.

Figure 2:
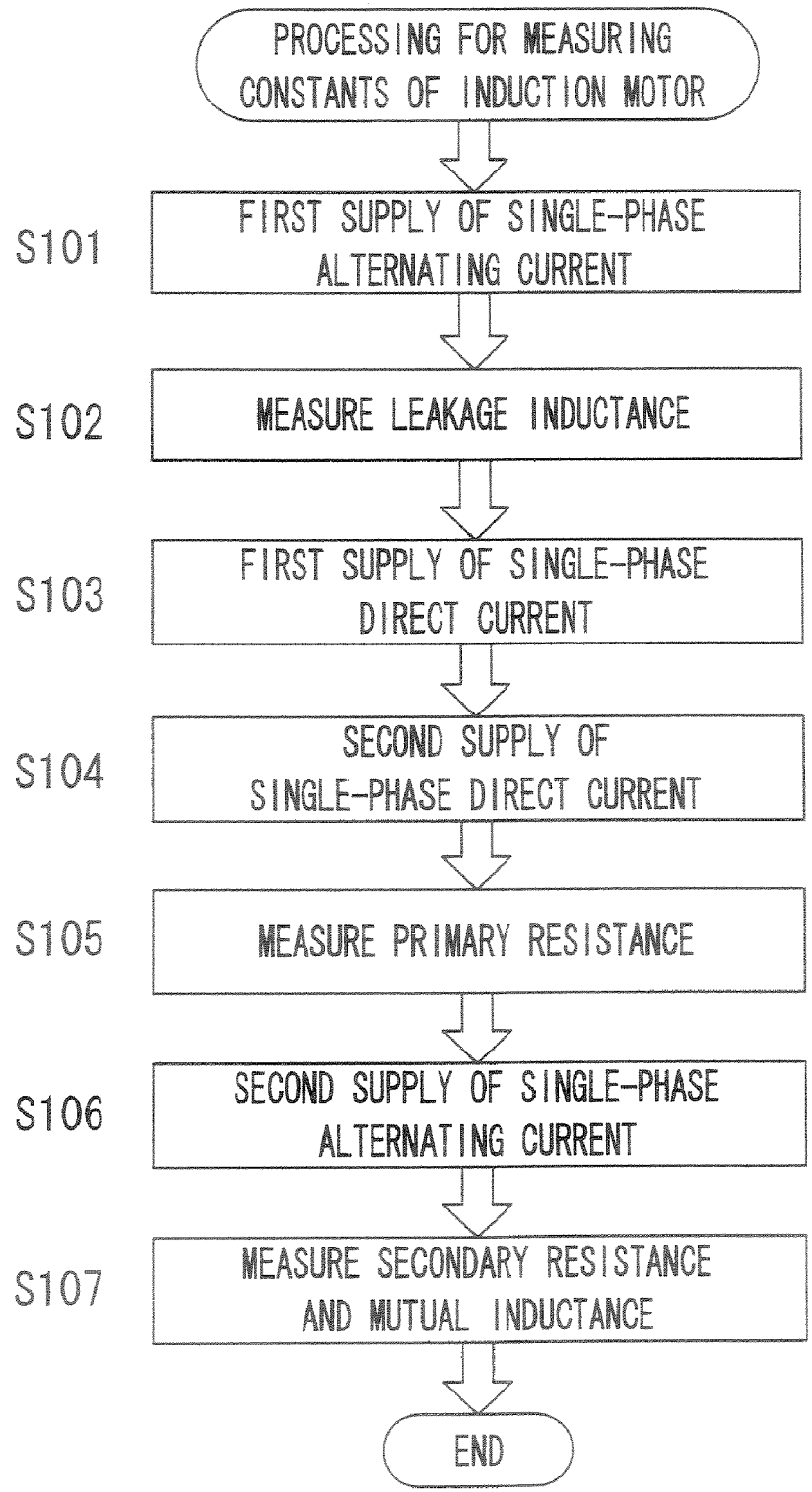
FIG. 2 is a flowchart showing a processing for measuring constants of an induction motor 1 by the induction motor constant measuring apparatus shown in FIG. 1.

FIG. 2 is a flowchart showing an induction motor constant measuring processing which is performed by the induction motor constant measuring apparatus shown in FIG. 1 for measuring the constants of the induction motor 1. The induction motor constant measuring processing will be described with reference to FIG. 2.

Referring to FIG. 2, first of all, at step S101, a first supply of a single-phase alternating current (AC) is executed. At this time, the switch 9 is switched over to the contact "a" thereof, so that the AC command vu0* having the frequency f0 is selected as the voltage vu* to be applied to the induction motor 1. In this case, the frequency f0 is set to a frequency higher than a frequency f1 of a second supply of the single-phase AC (at step S106) which is described later. In addition, the voltage command signal vu* as well as the voltage command signal vv* outputted from the sign converter 13 is inputted to the inverter 2. The inverter 2 generates a single-phase AC voltage according to the two inputted voltage command signals vu* and vv*, and outputs the generated single-phase AC voltage to the induction motor 1. At step S102, a leakage inductance is measured. The constant calculation controller 5 calculates a ratio V0/VI of an amplitude V0 of the voltage command signal vu* from the signal source 8 to an amplitude I0 of the current command signal iu* from the signal source 10 based on the amplitudes V0 and V1, and calculates the leakage inductance 1 using the following equations based on the ratio V0/I0:

$$1 = \sigma Ls \div 2 \quad (1), \text{ and}$$

$$\sigma Ls = V0 \div (I0 \times 2\pi \cdot f0) \quad (2),$$

where σ denotes a leakage coefficient and Ls denotes a primary inductance. The constant calculation controller 5 outputs a signal indicating a value of the leakage inductance σLs as calculated by using the equation (2) to the deviation amplifier 12. Thus, at steps S101 and S102, the leakage inductance 1 of the induction motor 1 is calculated based on the amplitude ratio of the voltage amplitude to the current amplitude during an interval of feeding the AC having the frequency f0. In other words, the constant calculation controller 5 calculates the leakage inductance 1 of the induction motor 1 based on the amplitude ratio VO/IO of the voltage amplitude to the current amplitude during an interval of feeding the AC having a highest frequency among intervals of feeding single-phase AC to the induction motor 1 from the inverter 2. Therefore, by calculating the leakage inductance 1 of the induction motor 1 as mentioned above, there is caused such an advantageous effect that it is possible to easily measure the leakage inductance 1 based on only the amplitude information without any need of phase information such as a voltage phase and a current phase of the induction motor 1.

At step S103, a first supply of a signal phase direct current (DC) is executed. At this time, the signal source 10 outputs a DC signal I1 as the current command signal iu*. In addition, the subtracter 11 calculates a current deviation Δi between the current command signal iu* and the detected current iu, and outputs a signal indicating the current deviation Δi to the deviation amplifier 12. In response to this, the deviation amplifier 12 calculates the voltage command signal vu1* according to the following equation, and outputs the calculated signal to the inverter 2 through the contact "b" of the switch 9 and outputs the same signal to the inverter 2 through the contact "b" of the switch 9 and the sign inverter 13:

$$vu1^* = \omega cc \times \sigma Ls \times \{\Delta i + \int (\omega cc \div N \times \Delta i) dt\} \quad (3),$$

where ωcc denotes a current response set value, N denotes an arbitrary constant, and t denotes a time. It is noted that an integral time of a right side of the equation (3) is sufficiently longer than a predetermined threshold value. At this moment, the switch 9 is switched over to the contact "b" thereof, so that the voltage command signal vu1* outputted from the deviation amplifier 12 is selected. A loop control circuit formed by the apparatus controller 4, the inverter 2 and the current detector 3 shown in FIG. 1 controls the current iu as supplied to the induction motor 1 so as to substantially coincide with the current command signal iu*, and the inverter 2 outputs the AC voltages vu and vv to the induction motor 1. At this time, the constant calculation controller 5 stores the values of the current command signal iu* and the voltage command signal vu* in the internal memory 5m as $iu_{S103}$ and $vu_{S103}$, respectively.

Next, at step S104, the second supply of the single-phase DC is executed. At this time, the signal source 10 outputs a DC signal I2 different from the DC signal I1 as the current command signal iu*. In addition, the subtracter 11 calculates the current deviation Δi between the current command signal iu* and the current iu, and outputs the signal indicating the current deviation Δi to the deviation amplifier 12. The deviation amplifier 12 calculates and outputs the voltage command signal vu1* according to the equation (3). At this moment, the switch 9 is switched over to the contact "b" thereof, so that the voltage command signal vu1* outputted from the deviation amplifier 12 is selected The loop control circuit formed by the apparatus controller 4, the inverter 2, and the current detector 3 shown in FIG. 1 controls the current iu as supplied to the induction motor 1 so as to substantially coincide with the current command signal iu*, and the inverter 2 outputs the AC voltages vu and vv to the induction motor 1. At this time, the constant calculation controller 5 stores the values of the current command signal iu* and the voltage command signal vu* in the internal memory 5m as $iu_{S104}$ and $vu_{S104}$, respectively.

At step S105, a primary resistance Rs is measured. In this case, the constant calculation controller 5 calculates the primary resistance Rs using the following equation based on the command values $iu_{S103}$, $vu_{S103}$, $iu_{S104}$, and $vu_{S104}$ stored in the internal memory 5m:

$$Rs = (vu_{S103} - vu_{S104}) \div (iu_{S103} - iu_{S104}) \quad (4).$$

As described above, at steps S103 and S104, the detected current iu fed from the inverter 2 to the induction motor 1 is controlled so as to substantially coincide with the current command signal iu*, the apparatus controller 5 applies the voltage command signals vu* and vv* to the inverter 2, and the inverter 2 applies the alternating current voltage vu and vv to the induction motor 1 according to these voltage command signals vu* and vv. As a result, the detected current iu is controlled so as to substantially coincide with the current command signal iu* so as to be set to the preset current response set value ωcc instead of the electric time constants unique to the induction motor 1. Then, it is possible to complete feeding the single-phase DC at steps S103 and S104 in a shorter time, irrespectively of the electric time constant characteristic of the induction motor 1. In addition, since the measurement of the constants of the induction motor 1 can be completed in a shorter time, the operating user of the apparatus can comfortably measure the constants of the induction motor 1 without making the user feel irritated with the waiting time.

Next, at step S106, a second supply of the single-phase AC is executed. At this moment, the signals source 10 outputs an AC signal iu1* having a frequency f1 as the current command signal iu*. The subtracter 11 calculates the current deviation Δi between the current command signal iu* and the current iu, and outputs the signal indicating the current deviation Δi to the deviation amplifier 12. The deviation amplifier 12 calculates and outputs the voltage command signal vu1* according to the equation (3). At this moment, the switch 9 is switched over to the contact "b" thereof, so that the voltage command signal vu1* outputted from the deviation amplifier 12 is selected. In this case, the loop control circuit formed by the apparatus controller 4, the inverter 2 and the current detector 3 shown in FIG. 1 controls the current iu as supplied to the induction motor 1 so as to substantially coincide with the current command signal iu*, and the inverter 2 outputs the AC voltages vu and vv to the induction motor 1.

Figure 3:
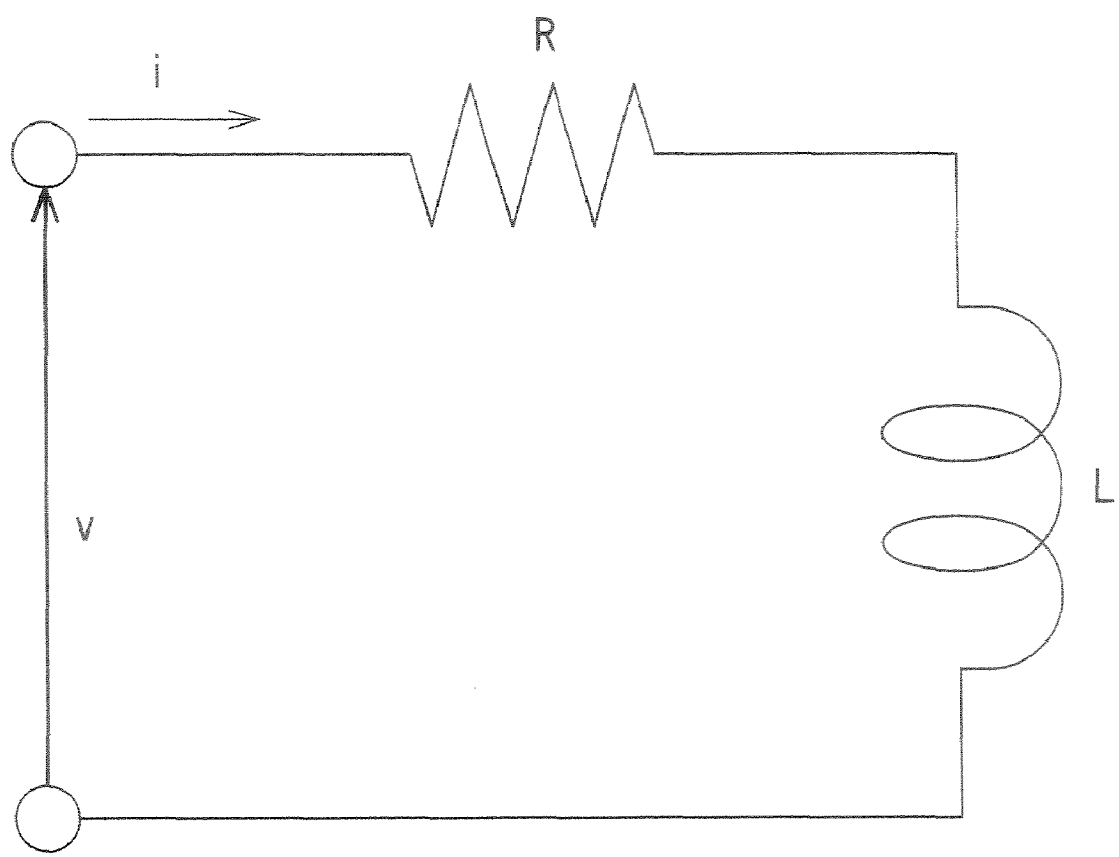
FIG. 3 is a circuit diagram showing an LR serial load circuit connected in place of the induction motor 1 shown in FIG. 1.

Further, at step S107, a secondary resistance and a mutual inductance are measured. First of all, in order to explain a measurement principle of the step S107, an LR serial load circuit of FIG. 3 is constituted so that an inductance L and a resistance K are connected in series is connected to the inverter 2 in place of the induction motor 1, then the procedures for calculating the resistance R and the inductance L will be described.

In the induction motor constant measuring apparatus according to the present preferred embodiment, the loop control circuit formed by the inverter 2, the current detector 3, and the apparatus controller 4 can control the detected current iu fed to the induction motor 1 so as to substantially coincide with the desired current command signal iu* by means of the deviation amplifier 12 of the apparatus controller 5. If the LR serial load circuit shown in FIG. 3 is connected in place of the induction motor 1, it is considered that the current i of the LR serial load circuit can be controlled so as to substantially coincide with a current command signal i*. The current command signal i* is given by an AC current signal I cos($2\pi f_{LR}t$) having an amplitude I [A] and a frequency $f_{LR}$ [Hz]. It is assumed herein that the voltage command signal v* of the inverter 2 and a terminal voltage v (See FIG. 3) of the LR serial load circuit are controlled so as to substantially coincide with each other. In this case, an amplitude A1 of an in-phase component of the voltage command signal v* and an amplitude B1 of a quadrature phase component thereof based on the AC current command signal i* can be calculated using the following equations using cross-correlation functions.

$$A1 = \frac{2}{T}\int_0^T \{v^*\cos(2\pi f_{LR}t)\}dt, \text{ and} \quad (5)$$

$$B1 = -\frac{2}{T}\int_0^T \{v^*\sin(2\pi f_{LR}t)\}dt, \quad (6)$$

where T denotes a preset integral time. As long as the amplitude I of the current command signal i* has been already known and the amplitude A1 of the in-phase component of the voltage command signal v* relative to the current comma d signal i* has been known, a resistance component $Z_{Re}$ of the LR serial load circuit can be calculated using the following equation:

$$Z_{Re}=A1 \div I \quad (7).$$

In addition, if the amplitude B1 of the quadrature phase component of the voltage relative to the current command signal i* has been known, a reactance component $Z_{Im}$ of the LR serial load circuit can be calculated using the following equation:

$$Z_{Im}=B1 \div I \quad (8).$$

Figure 4:
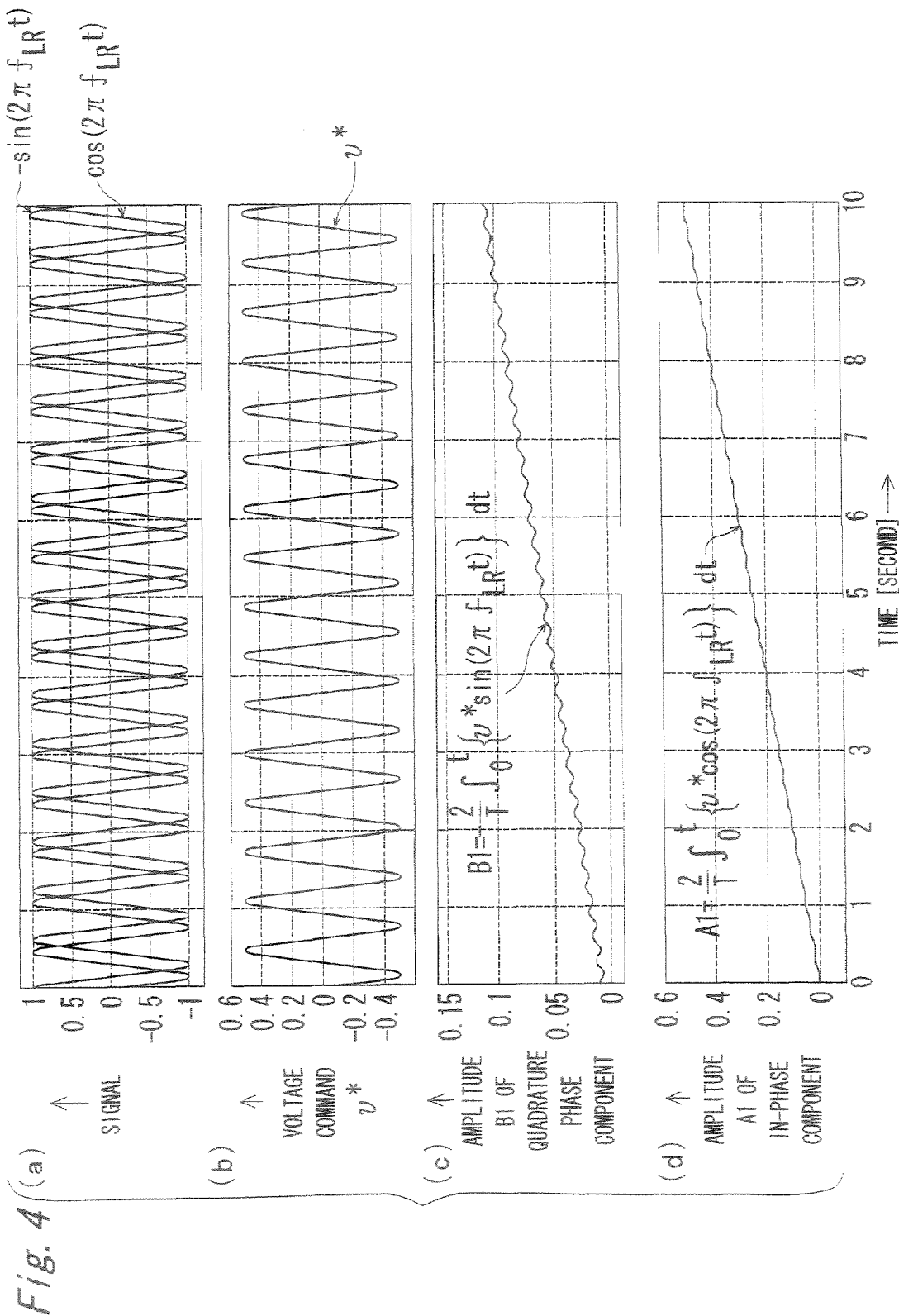
FIG. 4 is a waveform chart of respective parameters of the LR serial load circuit shown in FIG. 3 when a current i is controlled so as to substantially coincide with a current command signal i*=cos($2\pi f_{LR} t$), where

FIG. 4 is a waveform chart of respective parameters of the LR serial load circuit shown in FIG. 3 when the current i is controlled so as to substantially coincide with the current command signal i*=cos($2\pi f_{LR}t$) when the integral time T is ten seconds. FIG. 4(a) is a waveform chart of signals cos($2\pi f_{LR}t$) and -sin($2\pi f_{LR}t$), FIG. 4(b) is a waveform chart of the voltage command signal v*, FIG. 4(c) is a waveform chart of the amplitude B1 of the quadrature phase component, and FIG. 4(d) is a waveform chart of the amplitude A1 of the in-phase component. As apparent from FIG. 4, the in-phase component and the quadrature phase component of the voltage command signal v* are obtained from the amplitudes A1 and B1 when the integral time T elapses.

By setting the integral time T→∞ in the equations (5) and (6), the in-phase component and the quadrature phase component of the voltage command signal v* can be obtained with higher accuracy. However, in other words, the integral interval T is also the measuring time of the LR serial load circuit. As the measuring time is longer, the waiting time of the user who uses the induction motor constant measuring apparatus is longer. In order for the user to use the apparatus comfortably, the integral time is preferably shorter.

Figure 5:
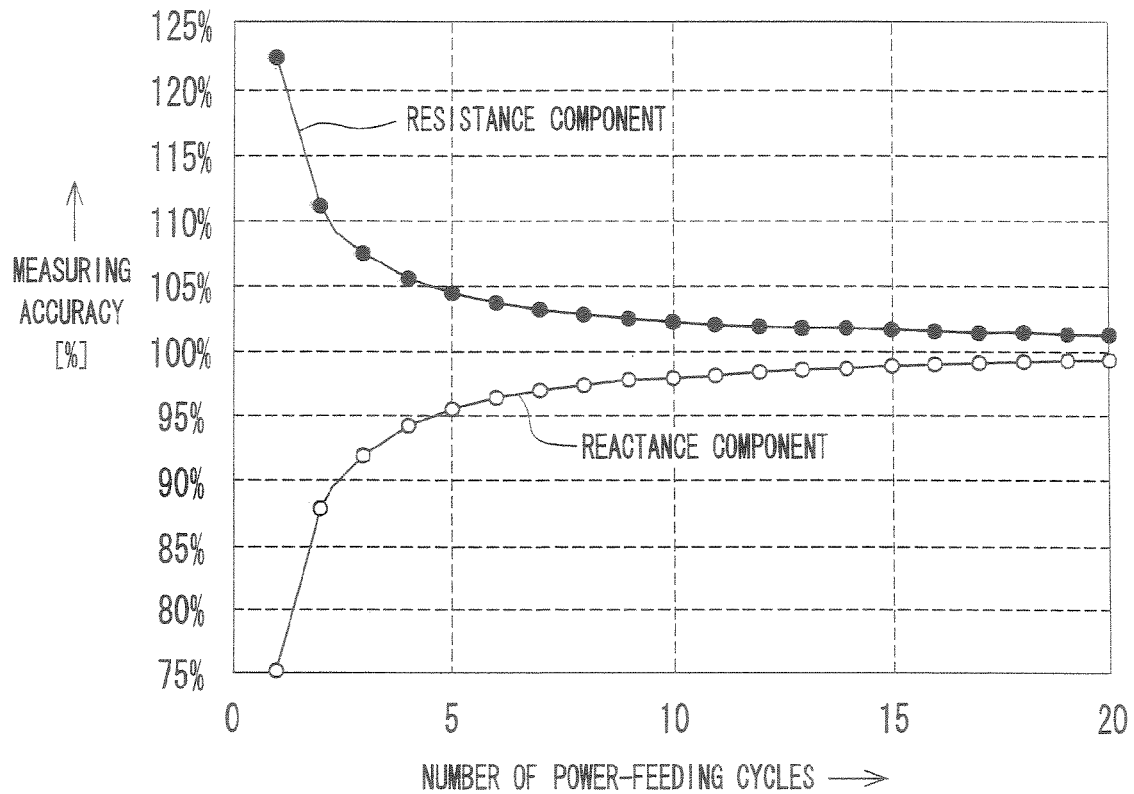
FIG. 5 is a graph showing results of an experiment in the first preferred embodiment of measuring a resistance component and an inductance component by the processing for measuring the constants shown in FIG. 2 when connecting the LR serial load circuit to the inverter in place of the AC induction motor 1, and showing measurement accuracies for measuring the respective components relative to a number of power-feeding cycles.

FIG. 5 is a graph showing results of an experiment of measuring the resistance component and the inductance component using the method at step S107 in the processing for measuring the constants, and showing measurement accuracies or precisions for measuring the respective components relative to the number of power-feeding cycles.

As apparent from the result shown in FIG. 5, it is necessary to feed the singe-phase AC by two or more cycles so as to keep the measurement accuracy for measuring the resistance component and the reactance component to fall within ±12%. It is necessary to feed the singe-phase AC by three or more cycles so as to keep the measurement accuracy for measuring the resistance component and the reactance component to fall within ±10%. Besides, it is necessary to feed the single-phase AC by five or more cycles so as to keep the measurement accuracy for the resistance component and the reactance component to fall within 15%. Accordingly, if the number of power-feeding cycles when feeding the single-phase AC at step S106 is set to two or more, therefore, the measurement accuracy for the resistance component and the reactance component can be kept within ±12%. In addition, if the number of power-feeding cycles when feeding the single-phase AC at step S106 is set to three or more, the measurement accuracy for the resistance component and the reactance component can be kept within ±10% Further, if the number of power-feeding cycles when feeding the single-phase AC at step is set to five or more, the measurement accuracy for the resistance component and the reactance component can be kept within ±5%. Based on the above-mentioned operation principle, the resistance component and the reactance component of the induction motor 1 can be measured using the equations (5) to (8) at step S107.

Figure 6:
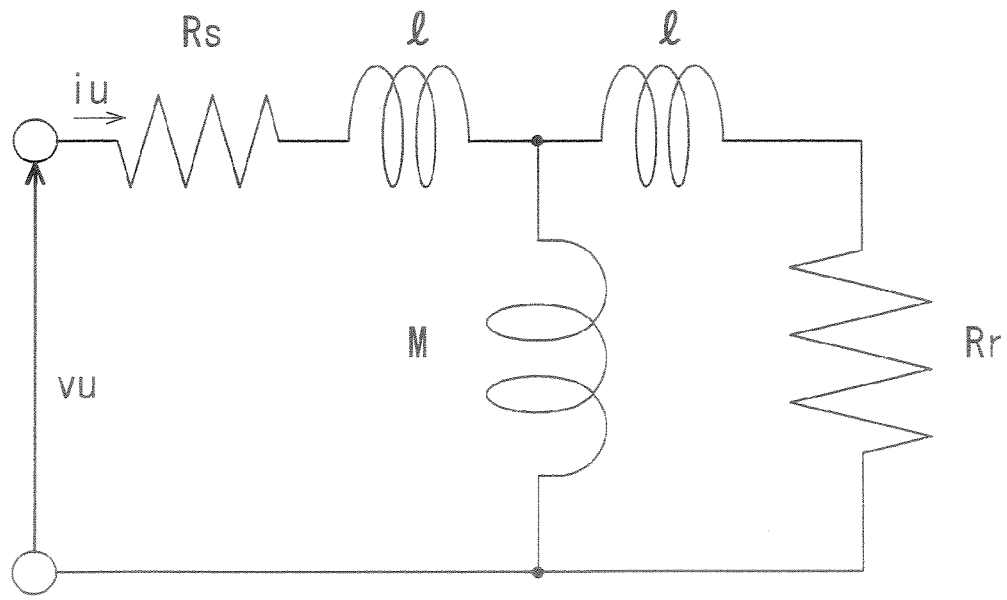
FIG. 6 is a circuit diagram of an equivalent circuit of the induction motor 1 shown in FIG. 1.
Figure 7:
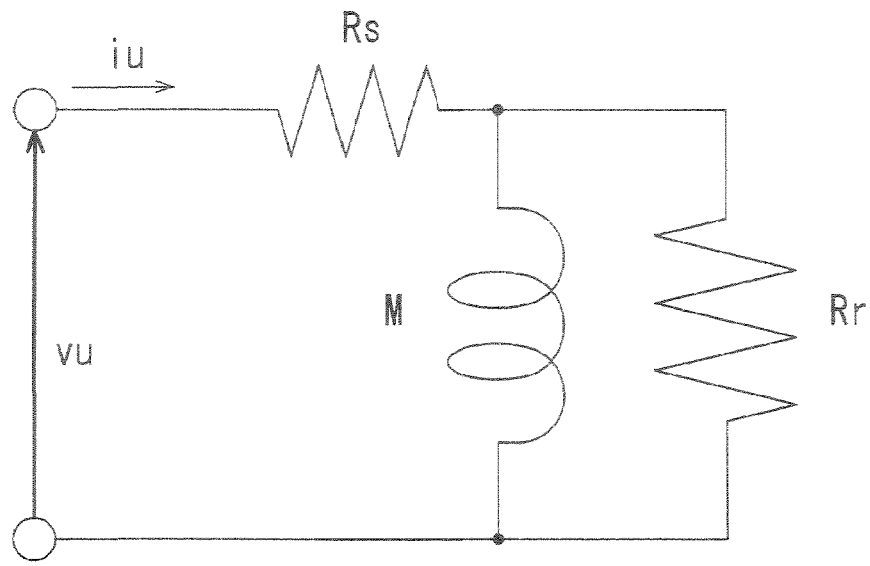
FIG. 7 is a circuit diagram of an approximate equivalent circuit of the equivalent circuit shown in FIG. 6.

FIG. 6 is a circuit diagram of an equivalent circuit of the induction motor 1 shown in FIG. 1. FIG. 7 is a circuit diagram of an approximate equivalent circuit of the equivalent circuit shown in FIG. 6. Referring to FIG. 6, the equivalent circuit of the induction motor 1 is configured so that a mutual inductance M is connected in parallel to the serial circuit of the leakage inductance 1 and the secondary resistance Rr, and further, the serial circuit of the leakage inductance 1 and the primary resistance Rs is connected in series to the parallel circuit. In the induction motor 1, a relationship of the mutual inductance M>>the leakage inductance 1 is satisfied, and therefore, the equivalent circuit shown in FIG. 6 can be approximated to the equivalent circuit shown in FIG. 7. An impedance Z1 of the equivalent circuit shown in FIG. 7 is expressed by the following equation:

$$Z1 = \frac{Rr^2 Rs + (\omega 1 M)^2 (Rs + Rr)}{Rr^2 + (\omega 1 M)^2} + j \frac{\omega 1 M Rr^2}{Rr^2 + (\omega 1 M)^2}, \quad (9)$$

where ω1 is 2πf1, and f1 denotes a frequency of the current command signal iu*. As mentioned above, at step S107, the resistance component $Z_{Re}$ and the reactance component $Z_{Im}$ of the impedance of the induction motor 1 are measured using the equations (5) to (8). The following simultaneous equations are obtained from the measured resistance component $Z_{Re}$ and reactance component $Z_{Im}$, and the equation (9):

$$Z_{Re} = \frac{Rr^2 Rs + (\omega 1 M)^2 (Rs + Rr)}{Rr^2 + (\omega 1 M)^2}, \text{ and} \quad (10)$$

$$Z_{Im} = \frac{\omega 1 M Rr^2}{Rr^2 + (\omega 1 M)^2}. \quad (11)$$

In this case, the values of the secondary resistance Rr and the mutual inductance M are obtained by solving the simultaneous equations (10) and (11), respectively. The solutions are expressed by the following equations:

$$Rr = \frac{Rs^2 + Z_{Im}^2 - 2 Rs Z_{Re} + Z_{Re}^2}{Z_{Re} - Rs}, \text{ and} \quad (12)$$

$$M = \frac{Rs^2 + Z_{Im}^2 - 2 Rs Z_{Re} + Z_{Re}^2}{\omega 1 Z_{Im}}. \quad (13)$$

As can be understood, the constant calculation controller 5 calculates the magnitude of the in-phase component of the voltage corresponding to the current and the magnitude of the quadrature phase component of the voltage corresponding the current, during the interval when the inverter 2 feeds the AC current having the lowest frequency when the inverter 2 feeds the AC current, and then, calculates the secondary resistance and the mutual inductance of the induction motor 1. As a result, if the measurement of the primary resistance Rs is completed, the secondary resistance and the mutual inductance can be simultaneously measured only by feeding the AC at step S106. In addition, the values of the primary inductance Ls and the secondary inductance Lr are given by a sum of the leakage inductance 1 and the mutual inductance M. When the processing at step S107 is finished, the induction motor constant measuring processing is finished.

The frequency of the single-phase AC which the inverter 2 feeds at step S106 will be described hereinafter. In the equivalent circuit shown in FIG. 7, if the frequency of the AC power fed in single phase is set to be quite high, then the impedance of the mutual inductance M is open, and the reactance component of the equivalent circuit becomes zero. If the frequency of the AC power fed in single phase is set to be quite low, then the impedance of the mutual inductance M becomes short-circuited, and the reactance component of the equivalent circuit becomes zero. Thus, the frequency of the AC fed by the inverter 2 in single phase at step S106 should not be too high or too low. In other words, it is necessary to set the frequency of the AC fed by the inverter 2 in single phase to an appropriate frequency.

The reactance component of the induction motor 1 in the equivalent circuit shown in FIG. 7 is the impedance $Z_{Im}$ expressed by the equation (11). When both of the sides of the impedance $Z_{Im}$ expressed by the equation (11) are differentiated by an angular frequency ω1, the following equation is obtained:

$$\frac{d}{d\omega 1} Z_{Im} = \frac{M Rr^4 - \omega 1^2 M^3 Rr^2}{(Rr^2 + (\omega 1 M)^2)^2}. \quad (14)$$

In this case, if $dZ_{Im}/d\omega 1 = 0$, the impedance $Z_{Im}$ becomes the maximum, the angular frequency $\omega_{1MAX}$ at which time is expressed by the following equation:

$$\omega_{1MAX} = Rr \div M [\text{rad/s}] \quad (15).$$

Accordingly, the frequency of the AC fed by the inverter 2 in single phase at step S106 may be set to a frequency $f_{1MAX}$ expressed by the following equation:

$$f_{1MAX} = Rr \div (2\pi \cdot M) [\text{Hz}] \quad (16).$$

Figure 8:
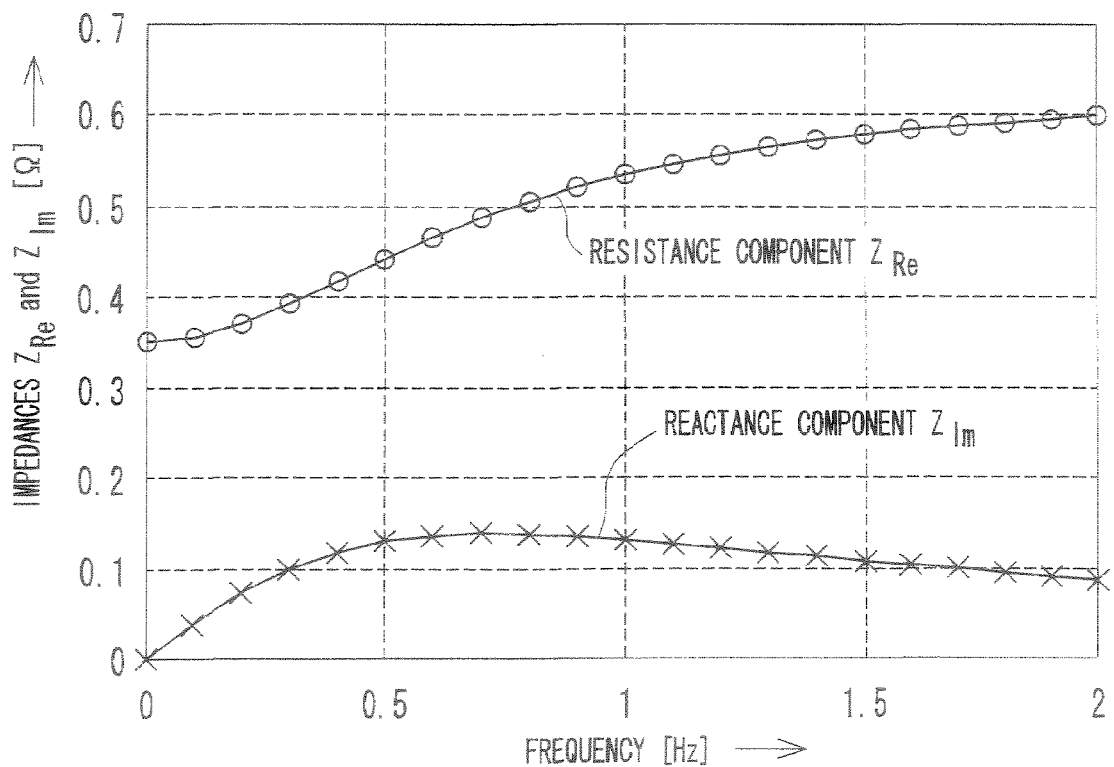
FIG. 8 is a graph showing frequency characteristics of a resistance component $Z_{Re}$ and a reactance component $Z_{Im}$ when a single-phase AC power is fed to an induction motor having a rated capacity of 3.7 kW.

FIG. 8 is a graph showing frequency characteristics of the resistance component $Z_{Re}$ and the reactance component $Z_{Im}$ when the AC power is fed to the induction motor having a rated capacity of 3.7 kW. The secondary resistance Rr is 0.28 [Ω], the primary resistance Rs is 0.35 [Ω], and the mutual inductance M is 0.062 [H]. Therefore, the frequency $f_{1MAX} = Rr/(2\pi M)$ is 0.72 [Hz], and the reactance component $Z_{Im}$ shown in FIG. 8 is the maximum at near the frequency of 0.72 Hz.

Figure 9:
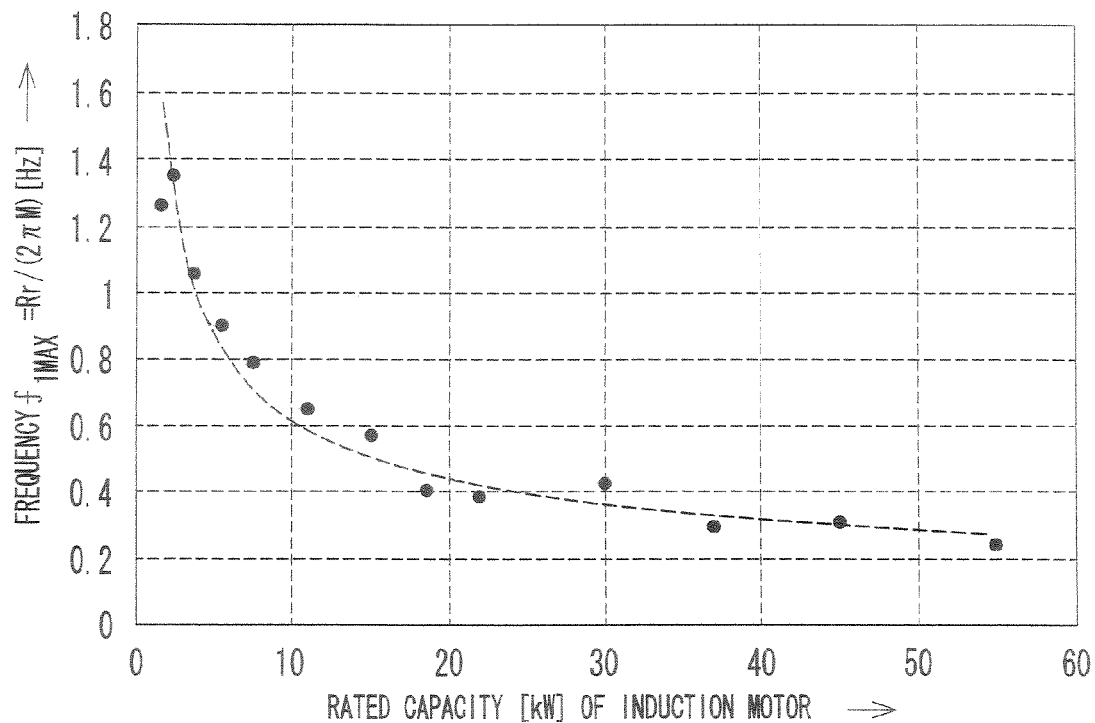
FIG. 9 is a graph showing a frequency $f_{1MAX}=Rr/(2\pi M)$ for the induction motor having a rated capacity from 1.5 kW to 53 kW.
Figure 10:
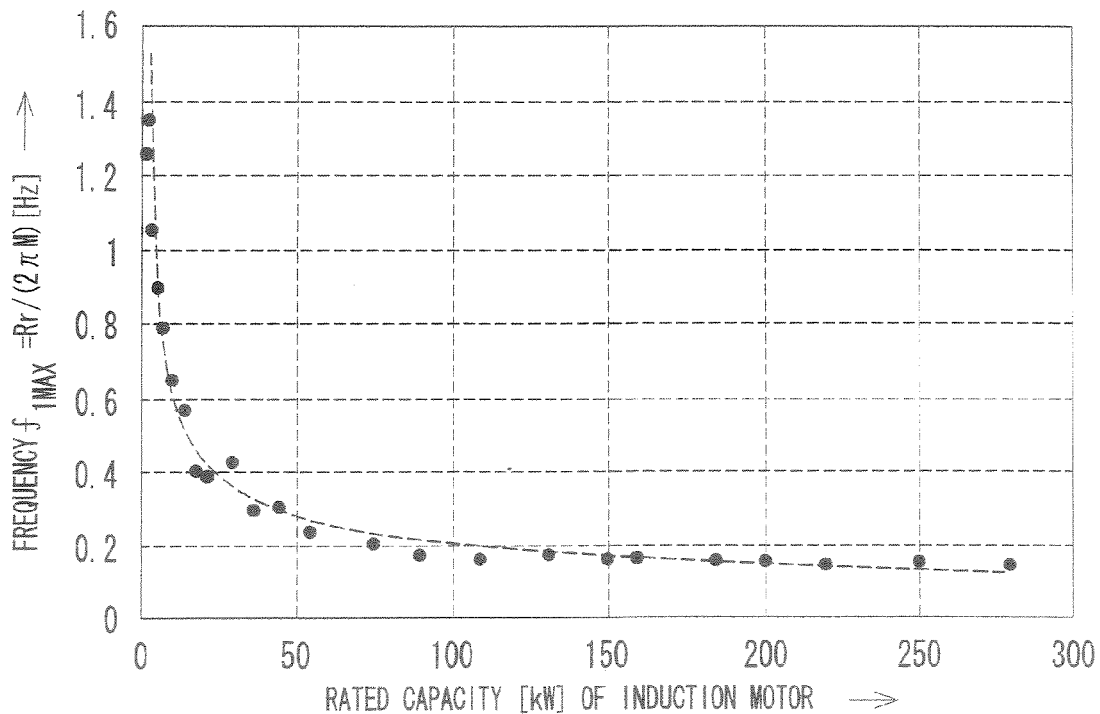
FIG. 10 is a graph showing a frequency $f_{1MAX}=Rr/(2\pi M)$ for the induction motor having a rated capacity from 1.5 kW to 280 kW.

In the induction motor constant measuring apparatus according to the present preferred embodiment, the values of the secondary resistance Rr and the mutual inductance M of the induction motor 1 are unknown when the step S106 is finished. The value of the right side of the equation (16) is measured for the induction motor 1 having the rated capacity ranging from 1.5 kW to 55 kW, and then, the results shown in FIGS. 9 and 10 are obtained. FIG. 9 is a graph showing the frequency $f_{1MAX}Rr/(2\pi M)$ for the induction motor 1 having the rated capacity from 1.5 kW to 55 kW. FIG. 10 is a graph showing the frequency $f_{1MAX}Rr/(2\pi M)$ for the induction motor 1 having the rated capacity from 1.5 kW to 280 kW. As apparent from the results shown in FIGS. 9 and 10, for the induction motor 1 having the rated capacity from 1.5 kW to 55 kW, the frequency band in which the reactance component becomes the maximum is equal to or higher than 0.2 Hz and equal to or lower than 1.5 Hz.

FIG. 11 is a table that exemplary shows rated capacities and external dimensions relative to respective classes of the inverter 2 shown in FIG. 1. The inverter 2 can be classified into classes corresponding to the external dimensions for the respective capacities.

As can be seen from FIG. 9, for the induction motor 1 having the rated capacity from 1.5 kW to 2.2 kW belonging to class A, the frequency band in which the reactance component becomes the maximum is equal to or higher than 1.2 Hz and equal to or lower than 1.5 Hz. Accordingly, by setting the frequency of the AC power fed in single phase at step S106 to be equal to or higher than 1.2 Hz and equal to or lower than 1.5 Hz, the reactance component $Z_{Im}$ of the induction motor 1 having the rated capacity from 1.5 kW to 2.2 kW belonging to the class A can be measured with higher accuracy. As a result, the mutual inductance M and the secondary resistance Rr of the induction motor 1 having the rated capacity from 1.5 kW to 2.2 kW belonging to the class A can be measured with higher accuracy.

In addition, in a manner similar to above, as apparent from FIG. 9, by setting the frequency of the AC power fed in single phase at step S106 to be equal to or higher than 0.7 Hz and equal to or lower than 1.2 Hz, the reactance component $Z_{Im}$ of the induction motor 1 having the rated capacity from 3.7 kW to 7.5 kW belonging to class B can be measured with higher accuracy. As a result, the mutual inductance M and the secondary resistance Rr of the induction motor 1 having the rated capacity from 3.7 kW to 7.5 kW belonging to the class B can be measured with higher accuracy.

Further, in a manner similar to above, as apparent from FIG. 9, by setting the frequency of the AC power fed in single phase at step S106 to be equal to or higher than 0.4 Hz and equal to or lower than 0.7 Hz, the reactance component $Z_{Im}$ of the induction motor 1 having the rated capacity from 11 kW to 18.5 kW belonging to class C can be measured with higher accuracy. As a result, the mutual inductance M and the secondary resistance Rr of the induction motor 1 having the rated capacity from 11 kW to 18.5 kW belonging to the class C can be measured with higher accuracy.

Furthermore, in a manner similar to above, as apparent from FIG. 9, by setting the frequency of the AC power fed in single phase at step S106 to be equal to or higher than 0.3 Hz and equal to or lower than 0.5 Hz, the reactance component $Z_{Im}$ of the induction motor 1 having the rated capacity from 22 kW to 37 kW belonging to class D can be measured with higher accuracy. As a result, the mutual inductance M and the secondary resistance Rr of the induction motor 1 having the rated capacity from 22 kW to 37 kW belonging to the class D can be measured with higher accuracy.

In addition, in a manner similar to above, as apparent from FIG. 9, by setting the frequency of the AC power fed in single phase at step S106 to be equal to or higher than 0.2 Hz and equal to or lower than 0.3 Hz, the reactance component $Z_{Im}$ of the induction motor 1 having the rated capacity from 45 kW to 55 kW belonging to class E can be measured with higher accuracy. As a result, the mutual inductance M and the secondary resistance Rr of the induction motor 1 having the rated capacity from 45 kW to 55 kW belonging to the class E can be measured with higher accuracy.

Further in a manner similar to above, as apparent from FIG. 10, by setting the frequency of the AC power fed in single phase at step S106 to be equal to or lower than 0.2 Hz, the reactance component $Z_{Im}$ of the induction motor 1 having the rated capacity from 55 kW to 280 kW belonging to class F can be measured with higher accuracy. As will be described later, the inverter 2 can keep a voltage resolution at a frequency equal to or higher than 0.006 Hz. Therefore, by setting the frequency of the AC power fed in single phase at step S106 to be equal to or lower than 0.2 Hz, the reactance component $Z_{Im}$ of the induction motor having the rated capacity from 55 kW to 280 kW belonging to the class F can be measured with higher accuracy. As a result, the mutual inductance M and the secondary resistance Rr of the induction motor 1 having the rated capacity equal to or larger than 55 kW belonging to the class F can be measured with higher accuracy.

As mentioned above, as apparent from FIGS. 9 and 10, as the rated capacity of the induction motor 1 is larger, the frequency $f_{1MAX}$ is lower. In order to secure the large rated capacity of the induction motor 1 which capacity enables measuring the constants, it is desirable to set the frequency of the AC power fed in the single phase at step S106 to be lower. The lower limit of the frequency at which the induction motor constant measuring apparatus according to the present preferred embodiment can measure the constants with higher accuracy will be described. The factors for determining the lower limit of the frequency include the "voltage resolution of the inverter 2" and the "amplitude B1 of the quadrature phase component of the voltage command signal v* based on the AC current comma d signal i*".

The voltage resolution of the inverter 2 will be first described. The DC voltage applied by the inverter 2 to the induction motor 1 is sampled and quantized for each interval of the voltage resolution dependent on the inverter 2. According to the present preferred embodiment, it is assumed that the voltage command signal vu* of the inverter 2 and the terminal voltage vu of the induction motor 1 are controlled so as to substantially coincide with each other. It is necessary to set the amplitude A1 of the in-phase component of the voltage command signal v* and the amplitude B1 of the quadrature phase component thereof based on the AC current command signal i* to be higher than at least the voltage resolution of the inverter 2. In addition, the amplitude B1 of the quadrature phase component of the voltage command signal v* is a product between the reactance component of the induction motor 1 and a current amplitude thereof. As apparent from FIG. 8, the reactance component of the induction motor 1 is a function of a voltage frequency applied by the inverter 2 to the induction motor 1. In the present preferred embodiment, the voltage resolution C [V] of the inverter 2 when the inverter 2 outputs the AC voltage by a triangular wave comparison type pulse width modulation (hereinafter, the pulse width modulation will be referred to as a "PWM") using a digital processing will be described. The inverter 2 outputs the AC voltage from a magnitude relationship between the voltage command signal v* and a triangular wave carrier Trc.

Figure 12:
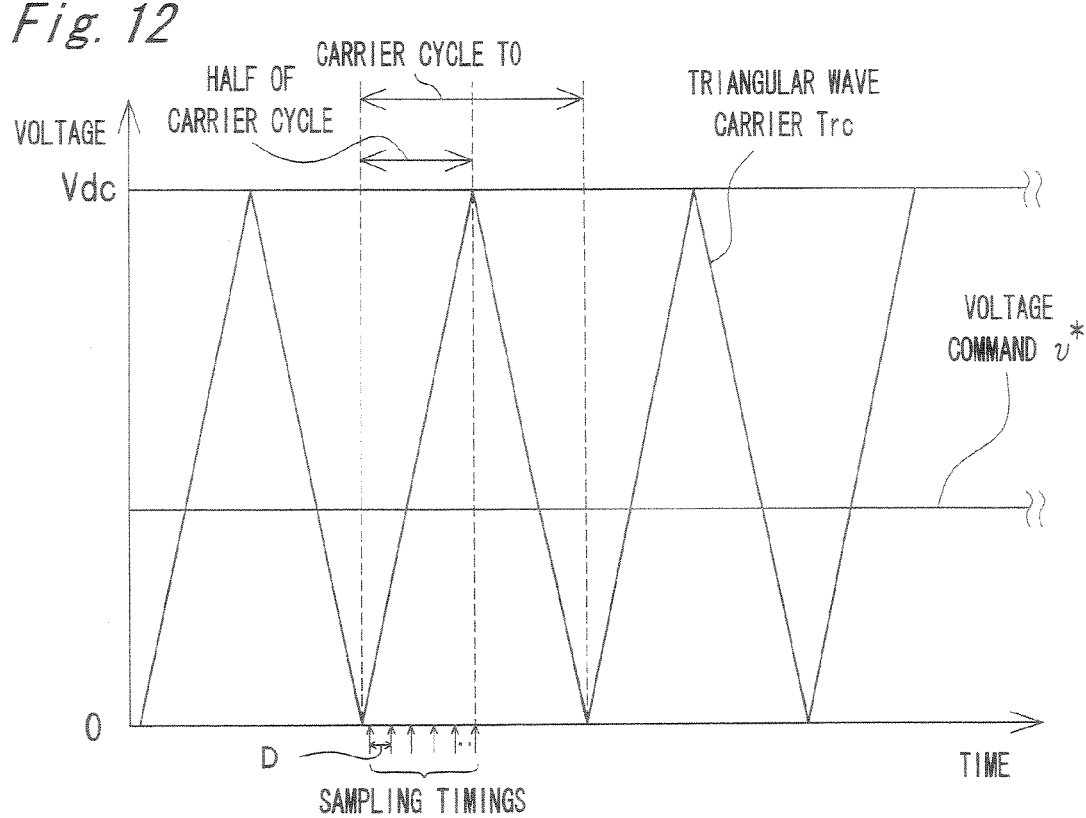
FIG. 12 is a waveform chart showing a relationship between a voltage command and a triangular wave carrier for explaining an output voltage Vout from the inverter 2 shown in FIG. 1.

FIG. 12 is a waveform chart showing a relationship between the voltage command signal v* and the triangular wave carrier Trc for explaining an output voltage Vout outputted from the inverter 2 shown in FIG. 1. The output voltage Vout from the inverter 2 is selected and outputted per sampling cycle of the digital processing as follows. It is assumed herein that the maximum amplitude of the triangular wave carrier Trc is denoted by Vdc [V].

$$\text{If } v^* \geq Trc, Vout = Vdc \text{ [V]} \qquad (17), \text{and}$$

$$\text{If } v^* < Trc, Vout = 0 \text{ [V]} \qquad (18).$$

By performing this selection and output processing, an average voltage for half of the interval of the carrier cycle can be controlled so as to substantially coincide with the voltage command signal v*. If the carrier cycle of the triangular wave carrier Trc used in the PWM is set to T0 [sec], half of the interval of the carrier cycle T0 is T0÷2 [sec]. If the sampling cycle of the digital processing is D [sec], the processing for comparison between the voltage command signal v* and the triangular wave carrier Trc is executed by (T0÷(2×D)) times during half of the interval of the carrier cycle T0. Thus, the voltage resolution C [V] is expressed by the following equation:

$$C[V] = Vdc[V] \div (T0 \div (2 \times D) \text{ (times)}) \qquad (19)$$

$$= (2 \times D \times Vdc) \div T0 \text{ [V]}.$$

In the case of the carrier cycle T0 of one millisecond and the sampling cycle D of 25 nanoseconds, which are practical values for the inverter 2, the voltage resolution C [V] can be also calculated using the equation (19). When the DC link voltage is obtained by rectifying the AC voltage from, for example, a three-phase 200-V commercial power source, the maximum amplitude Vdc of the triangular wave carrier Trc is 280 [V], and the voltage resolution C [V] can be calculated as expressed by the following equation:

$$C = 2 \times (25 \times 10^{-9}) \times 280 \div (10^{-3}) = 0.014 \text{ [V]} \quad (20).$$

Next, the amplitude B1 of the quadrature phase component of the voltage command signal v* based on the AC current command signal i* will be described. In a low frequency band, the amplitude A1 of the in-phase component of the voltage relative to the current command signal i* is sufficiently higher than the amplitude B1 of the quadrature phase component thereof. Therefore, it suffices that the inverter 2 has such a voltage resolution C as to output the amplitude B1 of the quadrature phase component of the voltage command signal v*. Now, the value B1/C as obtained by dividing the voltage amplitude B1 by the voltage resolution C will be described.

Figure 13:
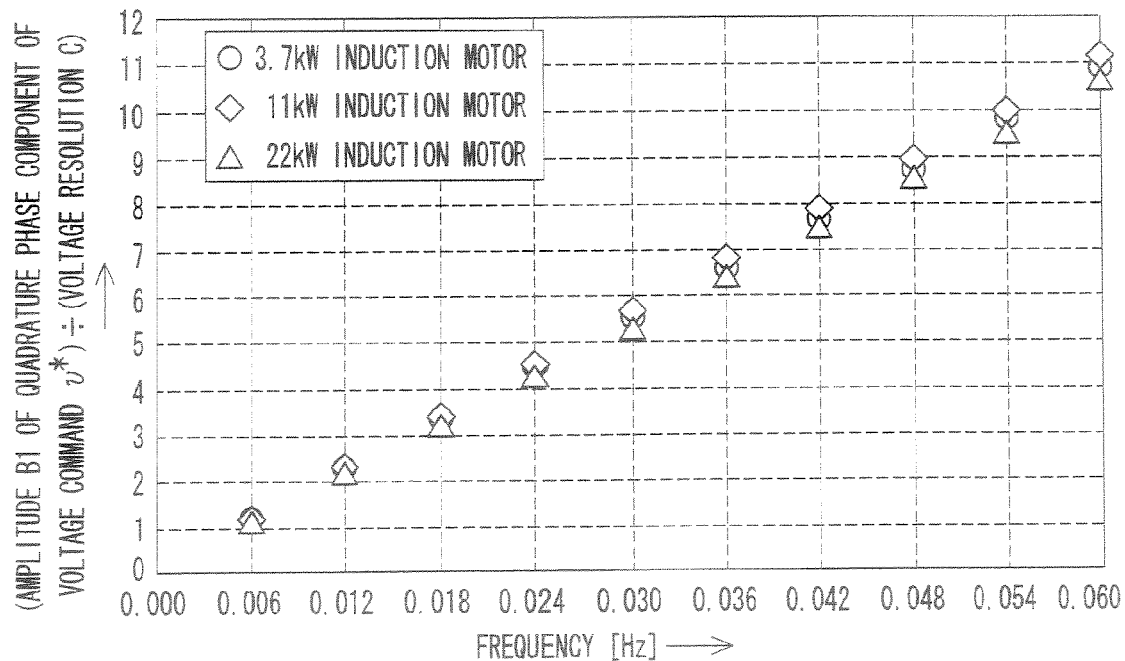
FIG. 13 is a graph showing frequency characteristics of a division value as obtained by dividing an amplitude B1 of a quadrature phase component of the voltage command signal v* by a voltage resolution C for each of an induction motor having a rated capacity of 3.7 kW, an induction motor having a rated capacity of 11 kW, and an induction motor having a rated capacity of 22 kW.

FIG. 13 is a graph showing frequency characteristics of the division value B1/C as obtained by dividing the amplitude B1 of the quadrature phase component of the voltage command signal v* by the voltage resolution C for each of an induction motor having a rated capacity of 3.7 kW, an induction motor having a rated capacity of 11 kW, and an induction motor having a rated capacity of 22 kW. The current command signal i* is set to a value corresponding to a rated exciting current (no-load current), and the amplitude B1 is calculated as a product between the amplitude I of the current command signal i* and a reactance component corresponding to the frequency f. As apparent from FIG. 13, the relationship between the frequency f and the division value B1/C is substantially consistent irrespective of the rated capacity of the induction motor 1. In addition, if the frequency f is equal to or higher than 0.006 [Hz], the amplitude B1 of the quadrature phase component of the voltage command signal v* based on the AC current command signal i* is higher than the voltage resolution C of the inverter 2.

As obvious from the above description, even for a induction motor having a rated capacity exceeding 55 kW, the induction motor constant measuring apparatus according to the present preferred embodiment can measure constants of the induction motor by setting the lower limit of the frequency of the AC power fed in single phase at step S107 to be equal to or higher than 0.006 [Hz]. In other words, by setting the frequency f of the AC power fed in single phase to be equal to or higher than 0.006 [Hz] at step S106, the inverter 2 can have the voltage resolution C high enough to output the amplitude B1 of the quadrature phase component of the voltage command signal v*, and the induction motor constant measuring apparatus according to the present preferred embodiment can measure the constants of the induction motor having the rated capacity exceeding 55 kW with higher accuracy.

Further, if the lower limit of the frequency f of the AC power fed in single phase at step S106 is set to be equal to or higher than 0.03 [Hz] the ratio of the voltage amplitude B to the voltage resolution C can be set to five or more. Therefore, the resolution of the inverter 2 with respect to the quadrature phase component of the voltage command signal v* can be improved, and the induction motor constant measuring apparatus according to the present preferred embodiment can measure the constants of the induction motor 1 having the rated capacity exceeding 55 kW with further higher accuracy.

Further, if the lower limit of the frequency f of the AC power fed in single phase at step S106 is set to be equal to or higher than 0.06 [Hz], the ratio of the voltage amplitude B to the voltage resolution C can be set to ten or more. Therefore, the resolution of the inverter 2 with respect to the quadrature phase component of the voltage command signal v* can be improved, and the induction motor constant measuring apparatus according to the present preferred embodiment can measure the constants of the induction motor 1 having the rated capacity exceeding 55 kW with further higher accuracy.

By the way, the inventors of the present invention conducted hearings with users of the induction motor constant measuring apparatuses, and got majority opinion that the waiting time that does not make the user feel irritated during constant measurement is within 30 minutes. According to the Non-Patent Document 2, for a limit time until the user feels irritated since a personal computer is turned on and started, an answer percentage is 38.3% when the waiting time is one minute, 34.5% when the waiting time is 30 seconds, and 72.8%, which percentage exceeds 70%, when the waiting time is within one minute. From these facts, although they differ in target apparatus, one for the apparatus which measures the constants of the induction motor 1 and the other which is the persona computer, the inventors of the present invention discovered that the waiting time for the user to wait without operating the apparatus is preferably within 30 seconds.

In the induction motor constant measuring processing according to the present preferred embodiment as shown in FIG. 2, at steps S101 and S102, the feeding of the single-phase AC and the measurement of the leakage inductance at steps S101 and S102 are completed within a couple of seconds, respectively, since the single-phase AC is fed at high frequency as will be described later. In a manner similar to that of above, at steps S103 to S105, the feeding of the single-phase DC and the measurement of the primary resistance are completed within a couple of seconds, respectively, for the following reason. The loop control circuit as configured by the inverter 2, the current detector 3, and the apparatus controller 4 including the deviation amplifier 12 can control the inverter 2 to apply the AC voltages vu and vv to the induction motor 1 so that the current iu substantially coincides with the current command signal iu*.

In the processing at steps S106 and S107, the frequency of the AC power fed in single phase is set to a value between 0.006 Hz and 1.5 Hz. As mentioned above, in order to keep the measurement accuracy for measuring the resistance component and the reactance component at step S107 to be within the range from +10% and −10%, it is necessary to feed the single-phase AC by three or more cycles. In addition, in order to keep the measurement accuracy for measuring the resistance component and the reactance component to be within the range from +5% and −5%, it is necessary to feed the single-phase AC by five or more cycles. By setting the cycle of feeding the single-phase AC longer, the measurement accuracy for measuring the resistance component and the reactance component can be made higher. At step S106, as the time when the inverter 2 feeds the singe-phase AC voltage is set to be longer, the waiting time for the user who uses the induction motor measuring apparatus to wait until the measurement of the constants is completed is longer.

Figure 14:
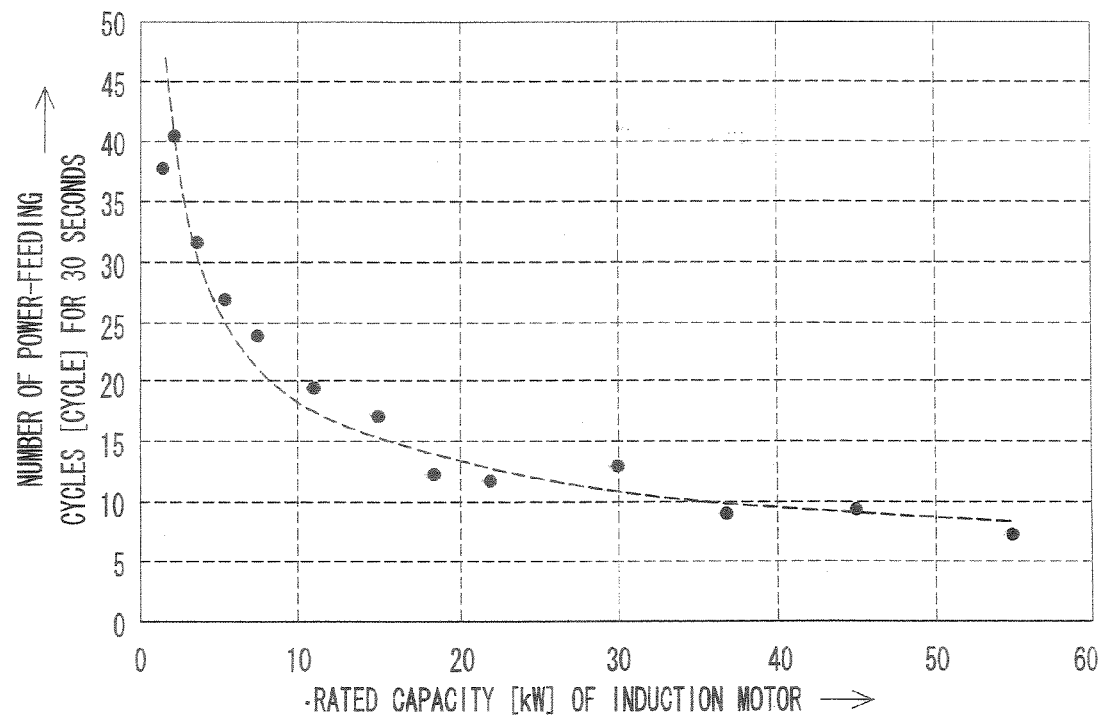
FIG. 14 is a graph showing a number of power-feeding cycles within 30 seconds relative to the rated capacity of the induction motor ranging from 1.5 kW to 55 kW, and showing how many number of cycles within 30 seconds the inverter 2 can feed the single-phase AC when the frequency of an AC power fed in single phase by the inverter 2 in the processing for measuring the constants shown in FIG. 2 is set to values shown in FIG. 13.
Figure 15:
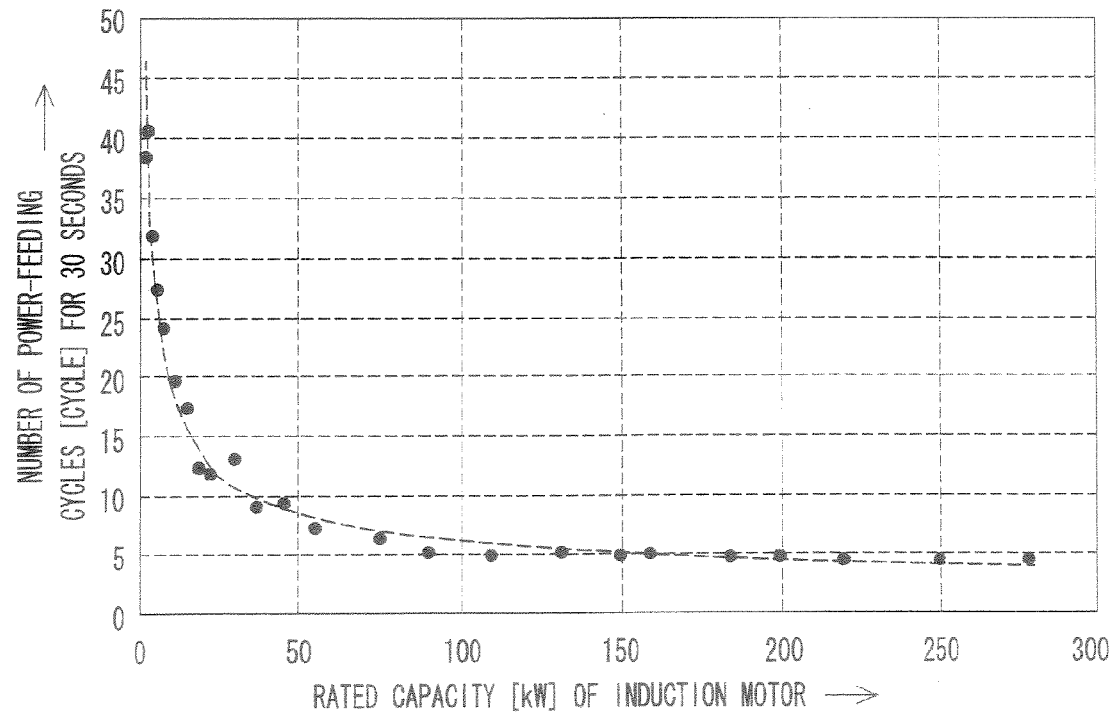
FIG. 15 is a graph showing a number of power-feeding cycles within 30 seconds relative to the rated capacity of the induction motor ranging from 1.5 kW to 280 kW, and showing how many number of power-feeding cycles within 30 seconds the inverter 2 can feed the single-phase AC when the frequency of an AC power fed in single phase by the inverter 2 in the processing for measuring the constants shown in FIG. 2 is set to values shown in FIG. 13.

By the way, the upper limit of the cycle for which the inverter 2 feeds the single-phase AC voltage at step S107 will be described hereinafter. FIG. 14 is a graph showing the number of power-feeding cycles within 30 seconds relative to the rated capacity of the induction motor ranging from 1.5 kW to 55 kW, and showing that how many number of power-feeding cycles within 30 seconds the inverter 2 can feed the AC voltage when the frequency of the AC power fed in single phase by the inverter 2 in the processing for measuring the constants shown in FIG. 2 is set to the values shown in FIG. 13. FIG. 15 is a graph showing the number of power-feeding cycles within 30 seconds relative to the rated capacity of the induction motor ranging from 1.5 kW to 280 kW, and showing how many number of power-feeding cycles within 30 seconds the inverter 2 can feed the AC voltage when the frequency of the AC power fed in single phase by the inverter 2 in the processing for measuring the constants shown in FIG. 2 is set to the values shown in FIG. 13.

As apparent from FIG. 14, for the induction motor 1 having the rated capacity of, for example, 55 kW, the frequency of the AC power fed in single phase is 0.24 Hz. Therefore, the time of 30 seconds elapses when the inverter 2 feeds the AC voltage by 7.2 cycles. For the induction motor 1 having the rated capacity of 2.2 kW, the frequency of the AC power fed in single phase is 1.35 Hz. Therefore, the time of 30 seconds elapses when the inverter 2 feeds the AC voltage by 40.4 cycles. As mentioned, in order to keep the measurement accuracy for measuring the resistance component and the reactance component within ±10%, the single-phase AC needs to be fed by three or more cycles. If the frequency of the AC power fed in single phase is set to be equal to or higher than 0.1 Hz, the measurement can be completed within 30 seconds with keeping the measurement accuracy within ±10%.

The processing from the steps S101 to S105 shown in FIG. 2 can be completed within a couple of seconds. In addition, in order to improve the measurement accuracy for measuring the resistance component and the reactance component in the processing of the steps S106 and S107, the cycle when the inverter 2 feeds the single-phase AC at step S106 is desirably set to be longer. However, the constant measurement needs to be completed within 30 seconds so that the user can comfortably operate the induction motor constant measuring apparatus. Due to this, the number of power-feeding cycles when the inverter 2 feeds the single-phase AC to the induction motor 1 at step S106 needs to be equal to or smaller than 45 based on the results shown in FIGS. 14 and 15.

Thus, the setting of the number of power-feeding cycles when feeding the singe-phase AC at step S106 to be equal to or smaller than 45 is a requirement for the time required at steps S106 and S107 to be able to fall within 30 seconds. Consequently, the requirement that the induction motor constant measuring apparatus according to the present preferred embodiment completes the constant measurement within 30 seconds is that the inverter 2 feeds the single-phase AC at least once at the frequency equal to or higher than 0.1 Hz and equal to or lower than 1.5 Hz by the number of power-feeding cycles equal to or smaller than 45.

Next, the frequency of the AC power fed in the single phase at step S101 will be described. If a Laplace operator is denoted by "s", a transfer function G(s) of the equivalent circuit of the induction motor 1 shown In FIG. 6 is expressed by the following equation:

$$G(s) = \frac{1}{Rs} \frac{1 + T_r s}{1 + (T_s + T_r)s + \sigma T_s T_r s^2}, \quad (21)$$

where $T_s = L_s \div R_s$, and (22)

$T_r = L_r \div R_r.$ (23)

In this case, if the frequency band is in a region sufficiently higher than $(T_s+T_r) \div (2\pi\sigma T_s T_r)$ [Hz], the equation (21) can be approximated to the following equation (24). By substituting $j2\pi f0$ into the Laplace operator "s" in the equation (24), the leakage inductance 1 can be measured using the above equation (1).

In this case, it is defined herein that the frequency sufficiently higher than $(T_s+T_r) \div (2\pi\sigma T_s T_r)$ [Hz] is five times as high as $(T_s+T_r) \div (2\pi\sigma T_s T_r)$ [Hz]. The measurement is made to the induction motor having the rated capacity from 1.5 kW to 55 kW for the frequency of $5\times(T_s+T_r) \div (2\pi\sigma T_s T_r)$ [Hz], and then, the inventors obtained the results shown in FIG. 16. In other words, FIG. 16 is a graph showing characteristics of the frequency $5\times(T_s+T_r) \div (2\pi\sigma T_s T_r)$ [Hz] relative to the rated capacity of the induction motor ranging from 1.5 kW to 55 kW.

Figure 16:
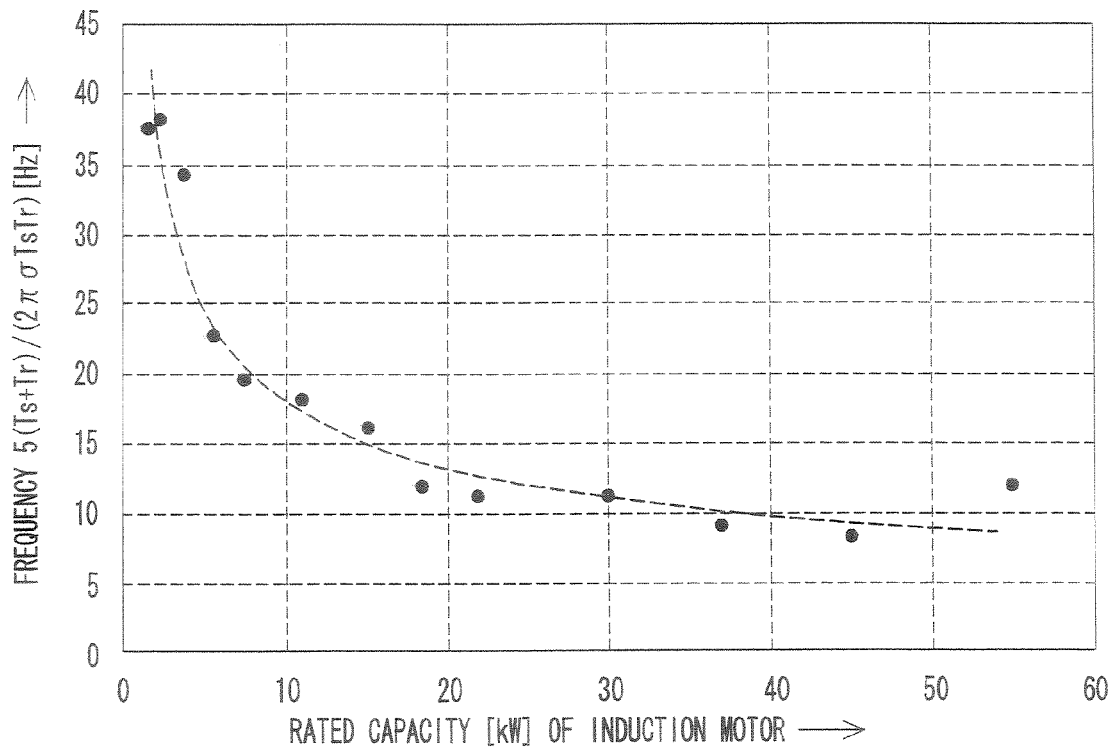
FIG. 16 is a graph showing characteristics of a frequency $5\times(Ts+Tr)/(2\pi\sigma TsTr)$ [Hz] relative to the rated capacity of the induction motor ranging from 1.5 kW to 55 kW.

As can be seen from FIG. 16, the frequency $5\times(T_s+T_r) \div (2\pi\sigma T_s T_r)$ is 38 Hz for the induction motor having the rated capacity of 2.2 kW, and 8.22 Hz for the induction motor having the rated capacity of 45 kW. Therefore, if the frequency of the AC power fed in the single phase at step S101 is set to be equal to or higher than 40 Hz, the following approximate equation is satisfied:

$$G(s) = \frac{\frac{1}{\sigma L_s T_r} \frac{1}{s} + \frac{1}{\sigma L_s}}{\frac{1}{\sigma T_s T_r} \frac{1}{s} + \frac{(T_s + T_r)}{\sigma T_s T_r} + s} \approx \frac{1}{\sigma L_s s}. \quad (24)$$

In addition, the upper limit of the frequency at which the inverter 2 can output the AC power is the carrier frequency of the inverter 2. Therefore, it is preferable that the inverter 2 measures the leakage inductance 1 by feeding the single-phase AC power at least once at the frequency equal to or higher than 40 Hz and selected within a frequency range equal to or lower than the carrier frequency thereof. As a result, the approximate equation (24) that is the condition for measuring the leakage inductance 1 is held. By thus feeding the single-phase AC power, the leakage inductance 1 can be measured with higher accuracy without rotating the induction motor 1.

Second Preferred Embodiment

In the first preferred embodiment, the second supply of the single-phase AC power is executed at step S106. At this time, the signal source 10 outputs, as the current command signal iu*, the AC signal iu1* having the frequency f1. However, even if the signal source 10 outputs a current command signal iu* as obtained by adding up a DC component and an AC component as expressed by the following equation, the DC component is removed by the calculations of the equations (5) and (6). A second preferred embodiment is characterized in that the signal source 10 outputs a current command signal iu* as obtained by adding up a DC component and an AC component as expressed by the following equation:

$$iu^* = I2 \times \{1 + \cos(2\pi f1 \cdot t)\} \quad (25).$$

In the equation (25), I2 is assumed to be a value as obtained by multiplying a rated current by a predetermined coefficient (e.g., a predetermined value from 0 to 0.5). By using this current I2, a sign of the current command signal iu* becomes positive irrespectively of a time t, so that there can be such an advantageous effect that any influence of the dead time error can be avoided.

In addition, with the current amplitude given as I2, the subtracter 11 calculates a current deviation Δi between the current command signal iu* expressed by the equation (25)

and a current iu detected by the current detector 3, and outputs a signal indicating the current deviation Δi to the deviation amplifier 12. In response to this, the deviation amplifier 12 outputs a voltage command signal vu1* having a value calculated using the equation (3) to the inverter 2. A loop control circuit constituted by the inverter 2, the current detector 3, and an apparatus controller 4 controls the detected current iu so as to substantially coincide with the current command signal iu*, and the inverter 2 applies AC voltages vu and vv to the induction motor 1. Therefore, a current amplitude of a induction motor 1 can be set to a predetermined value irrespective of a value of a frequency f1. The mutual inductance M of the induction motor 1 is changed to be dependent on the amplitude of the current. However, as a result of controlling the current amplitude to be set to a predetermined value, the value of the mutual inductance M at the predetermined current amplitude can be measured irrespectively of the value of the frequency f1.

Third Preferred Embodiment

In the first preferred embodiment, the secondary resistance and the mutual inductance are measured using the equations (12) and (13) at step S107. However, since the measurement of the leakage inductance 1 and σLs is completed at step S102, the secondary resistance and the mutual inductance may be measured using these values (this embodiment will be referred to as "a third preferred embodiment" hereinafter) According to the third preferred embodiment, in a manner similar to that of the first preferred embodiment, a resistance component and a reactance component of the induction motor 1 are measured using the equations (5), (6), and (7) at step S107. In FIG. 6 showing the equivalent circuit of the induction motor 1, an impedance Z1 of the equivalent circuit is expressed by the following equation:

$$Z1 = \frac{Rr^2 Rs + (\omega 1 M)^2 Rr + (\omega 1 Ls)^2 Rs)}{Rr^2 + (\omega 1 Ls)^2} + j\frac{\omega 1 Ls(Rr^2 + \omega 1^2 (Ls - M)^2)}{Rr^2 + (\omega 1 Ls)^2}, \quad (26)$$

where ω1 is 2πf1, and f1 denotes a frequency of a current command signal iu*. As mentioned above, at step S107, the resistance component $Z_{Re}$ and the reactance component $Z_{Im}$ of the impedance of the induction motor 1 are measured using the equations (5), (6), and (7). The following simultaneous equations are obtained from the measured resistance component $Z_{Re}$ and reactance component $Z_{Im}$, and the equation (26):

$$Z_{Re} = \frac{Rr^2 Rs + (\omega 1 M)^2 Rr + (\omega 1 Ls)^2 Rs)}{Rr^2 + (\omega 1 Ls)^2}, \text{ and} \quad (27)$$

$$Z_{Im} = \frac{\omega 1 Ls(Rr^2 + \omega 1^2 (Ls - M)^2)}{Rr^2 + (\omega 1 Ls)^2}. \quad (28)$$

In this case, the values of the secondary resistance Rr and the mutual inductance M are obtained by solving the simultaneous equations (27) and (28), respectively. The solutions are expressed by the following equations:

$$Rr = \frac{Rs^2 + Z_{Im}^2 - 2Rs Z_{Re} + Z_{Re}^2 - \omega 1 \sigma Ls Z_{Im}}{Z_{Re} - Rs}, \quad (29)$$

$$Ls = \frac{Rs^2 + Z_{Im}^2 - 2Rs Z_{Re} + Z_{Re}^2 - \omega 1 \sigma Ls Z_{Im}}{\omega 1 (Z_{Im} - \omega 1 \sigma Ls)}, \text{ and} \quad (30)$$

$$M = Ls - 1. \quad (31)$$

As can be understood, the constant calculation controller 5 calculates a magnitude of an in-phase component of a voltage corresponding to an AC current fed by the inverter 2 during the interval when the inverter 2 feeds the AC power having the lowest frequency among the intervals when the inverter 2 feeds the AC power, and the magnitude of the quadrature phase component of the voltage corresponding thereto, and calculates the secondary resistance and the mutual inductance of the induction motor 1 based on these calculated values and the leakage inductance 1 and σLs measured at step S102. As a result, as long as the measurement of the leakage inductance 1 σLs, and the primary resistance Rs is completed there can be such an effect that the secondary resistance and the mutual inductance can be simultaneously measured only by feeding the AC power at step S106. In addition, since the leakage inductance is considered in the measurement, there can be obtained such an advantageous effect that the measurement accuracy can be further improved.

Fourth Preferred Embodiment

At step S107 according to the preceding preferred embodiments, the amplitude A1 of the in-phase component of the voltage command signal v* and the amplitude B1 of the quadrature phase component thereof based on the AC current command signal i* are obtained by the equation (4) using the cross-correlation function. Alternatively, the following equations may be used in place of the equations (5) and (6) (this embodiment will be referred to as "a fourth preferred embodiment" hereinafter):

$$A1 = \frac{2}{T}\int_0^T \{v^* \cos(2\pi f_{LR} t)\} dt + \Delta A1, \text{ and} \quad (32)$$

$$B1 = -\frac{2}{T}\int_0^T \{v^* \sin(2\pi f_{LR} t)\} dt + \Delta B1, \quad (33)$$

where ΔA1 denotes a preset A1 correction amount and ΔB1 denotes a preset B1 correction amount.

Figure 17:
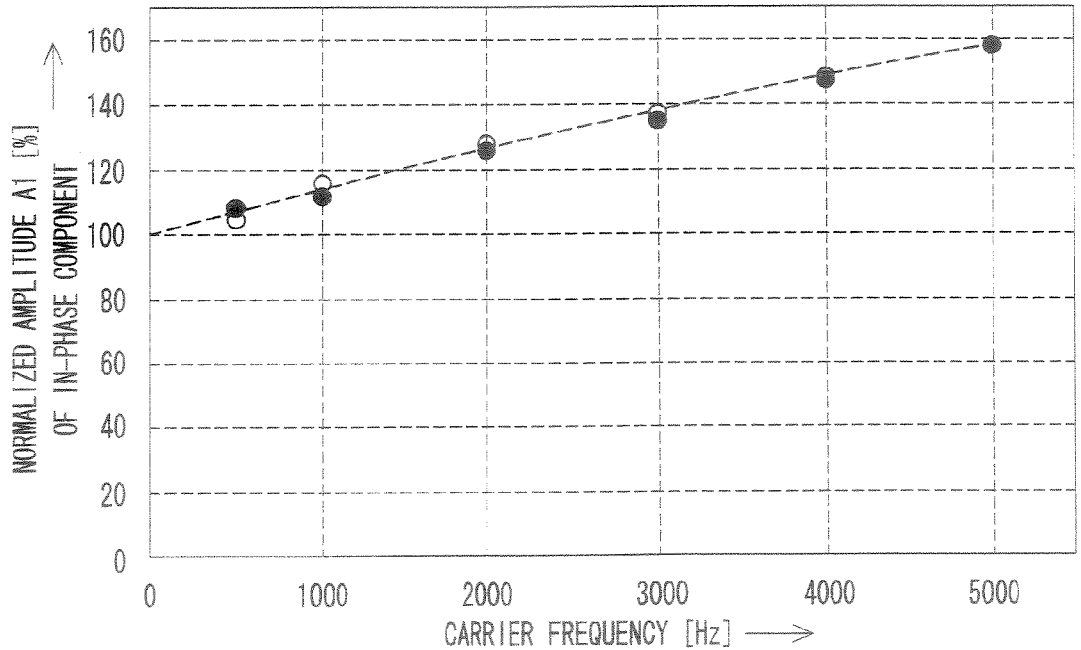
FIG. 17 is a graph showing a normalized amplitude A1 (experimental value) of an in-phase component relative to a carrier frequency of the inverter 2 when the LK serial load circuit shown in FIG. 3 is connected, in place of the induction motor 1, to the inverter 2 in the processing for measuring the constants shown in FIG. 2.
Figure 18:
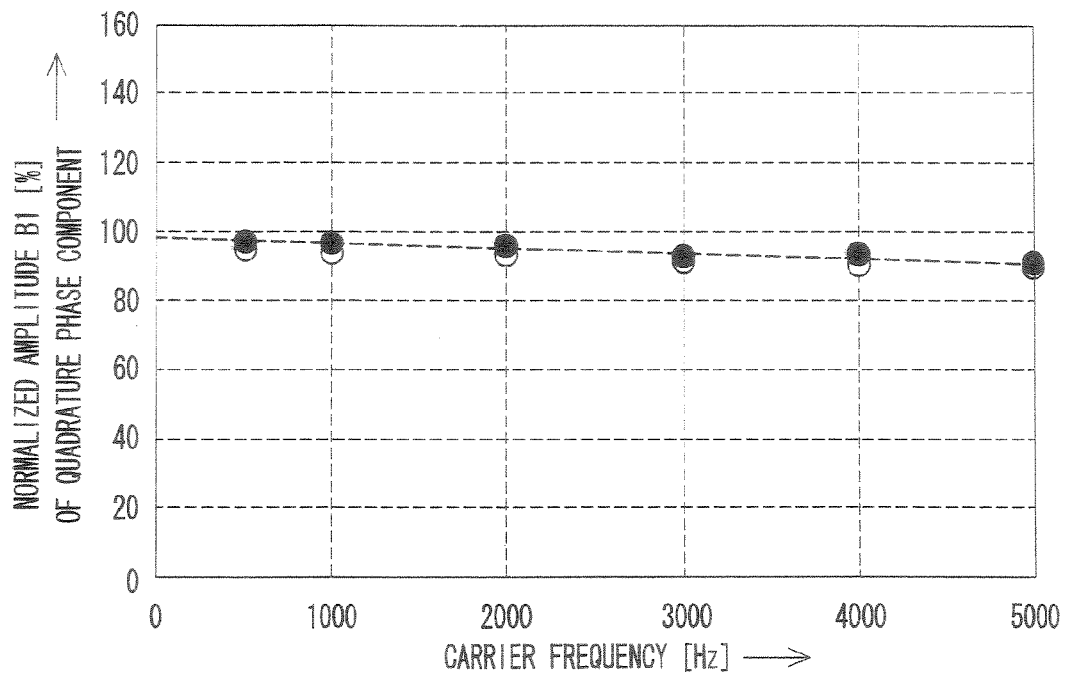
FIG. 18 is a graph showing a normalized amplitude B1 (experimental value) of a quadrature phase component relative to the carrier frequency of the inverter 2 when the LR serial load circuit shown in FIG. 3 is connected, in place of the induction motor 1, to the inverter 2 in the processing for measuring the constants shown in FIG. 2.

The reason for using the equations (32) and (33) in place of the equations (5) and (6) will be described below. In the measurement at step S107, the relationship between a carrier frequency of an inverter 2 when the LR serial load circuit of the inductance L and the resistance R shown in FIG. 3 is connected in place of an induction motor 1, and the amplitude A1 as obtained by an experiment using the equations (5) and (6) is shown in FIG. 17. In other words, FIG. 17 is a graph showing a normalized amplitude A1 (an experimental value) of an in-phase component relative to the carrier frequency of the inverter 2 when the LR serial load circuit shown in FIG. 3 is connected, in place of the induction motor 1, to the inverter 2, in the processing for measuring the constants shown in FIG. 2. In this case, the current command signal iu* at step S106 is calculated using the equation (25) shown in the second preferred embodiment. In addition, as the frequency f1 of the AC power fed in single phase as shown in the equation (25) two frequencies 0.5 Hz and 1 Hz are used. In FIG. 17 and FIG. 18 which is described later, mark ● denotes a case of using the frequency 0.5 Hz, and mark ○ denotes a case of using the frequency 1 Hz.

The vertical axis of FIG. 17 indicates a normalized value based on a theoretical value of the amplitude A1 of the in-phase component, and is obtained by plotting data on an experiment conducted to respective carrier frequencies. As apparent from FIG. 17, an error in the measured amplitude A1 with respect to the theoretical value thereof is larger as the carrier frequency is higher, and the error in the amplitude A1 is not changed by the frequency of the AC power fed in single phase. In the present preferred embodiment, the carrier frequency of the inverter 2 is fixed to 1000 Hz, and the value of the correction amount ΔA1 of the amplitude A1 of the in-phase component is experimentally determined in advance.

FIG. 18 is a graph showing a normalized amplitude B1 (an experimental value) of a quadrature phase component relative to the carrier frequency of the inverter 2 when the LR serial load circuit shown in FIG. 3 is connected, in place of the induction motor 1, to the inverter 2, in the processing for measuring the constants shown in FIG. 2. As apparent from FIG. 18, an error in the measured amplitude B1 with respect to the theoretical value thereof is slightly decreased but hardly changed according to the carrier frequency, and the error in the amplitude B1 is not changed by the frequency of the AC power fed in single phase. Therefore, as for the amplitude B1, in a manner similar to the amplitude A1, the value of the correction amount ΔB1 of the amplitude B1 is experimentally determined in advance.

As mentioned above, the constant calculation controller 5 calculates the amplitude A1 of the in-phase component of the voltage corresponding to the AC current fed by the inverter 2 during the interval when the inverter 2 feeds the AC current having the lowest frequency among the intervals when the inverter 2 feeds the AC current, and adds to this calculated amplitude A1 the predetermined correction amount ΔA1 which is set in advance. In addition, the constant calculation controller 5 calculates the amplitude B1 of the quadrature phase component of the voltage corresponding thereto, and adds to this calculated amplitude B1 the predetermined correction amount ΔB1 set in advance. As a result, the error resulting from the carrier frequency of the inverter 2 can be corrected, so that the amplitude A1 of the in-phase component of the voltage corresponding to the current and the amplitude B1 of the quadrature phase component thereof can be measured with higher accuracy. Accordingly, the measurement accuracy for measuring the secondary resistance and the mutual inductance at step S107 can be further improved.

Figure 19:
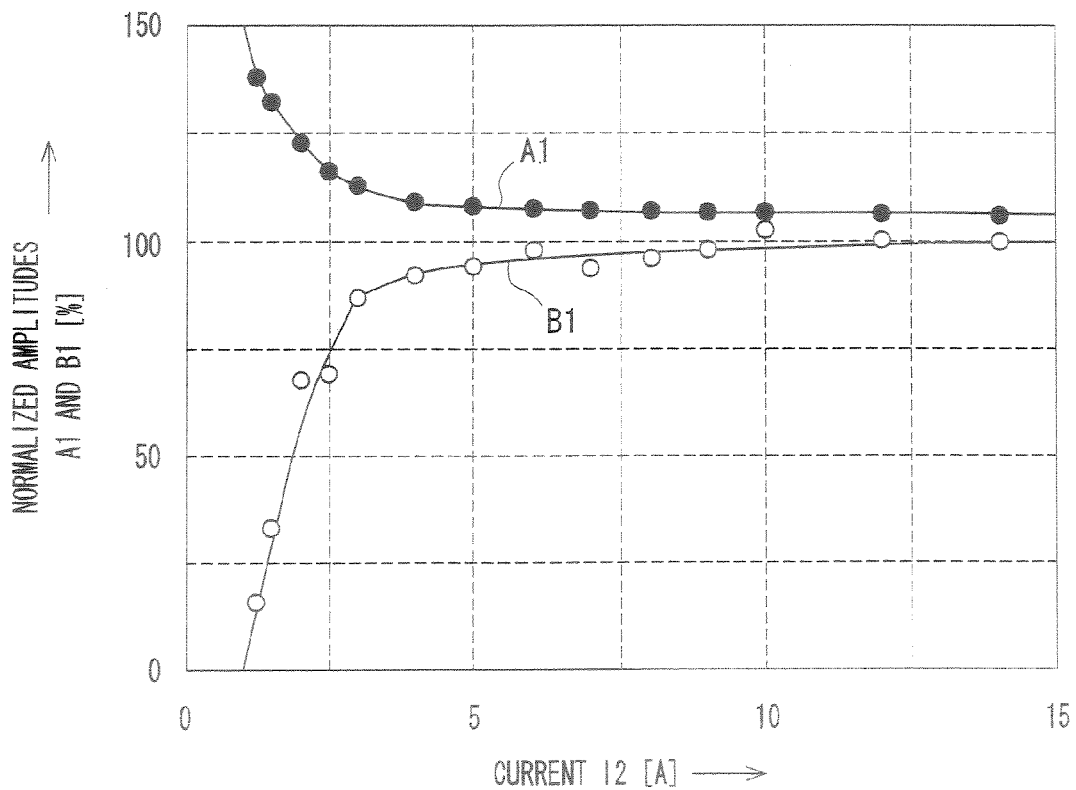
FIG. 19 is a graph showing the normalized amplitudes A1 and B1 (experimental values) relative to a current I2 when the LR serial load shown in FIG. 3 is connected, in place of the induction motor 1, to the inverter 2 in the processing for measuring the constants shown in FIG. 2.

In the present preferred embodiment, the correction amounts ΔA1 and ΔB1 may be expressed as functions of the current I2 shown in the equation (25), respectively. This leads to that, even if the setting of the current amplitude is changed, the measurement accuracy for measuring the secondary resistance and the mutual inductance can be improved. A relationship between the current I2 flowing when the LR serial load circuit configured by the inductance L and the resistance R as shown in FIG. 3 is connected, in place of the induction motor 1, to the inverter 2, and the normalized amplitudes A1 and B1 as obtained by the experiments using the equations (5) and (6) is shown in FIG. 19. In other words, FIG. 19 is a graph showing the normalized amplitudes A1 and B1 (experimental values) relative to the current I2 when the LR serial load shown in FIG. 3 is connected, in place of the induction motor 1, to the inverter 2 in the processing for measuring the constants shown in FIG. 2. A vertical axis of FIG. 19 is indicated based on the theoretical value of the amplitude A1 and is obtained by plotting data on an experiment conducted to each current I2 when the carrier frequency is fixed to 1000 Hz.

As apparent from FIGS. 17, 18, and 19, errors in the amplitudes A1 and B1 as measured with respect to their theoretical values are functions of the current I2, respectively, and the errors are not changed to depend on the frequency of the AC power fed in single phase. In the present preferred embodiment, therefore, the carrier frequency of the inverter 2 is fixed to 1000 Hz, the value of the correction amount ΔA1 of the amplitude A1 is experimentally determined as the function of the current I2, and the value of the correction amount ΔB1 of the amplitude B1 is similarly experimentally determined as the function of the current I2. This leads to that, even if the setting of the current amplitude is changed, there can be obtained an advantageous effect that the measurement accuracy for measuring the secondary resistance and the mutual inductance can be further improved.

Fifth Preferred Embodiment

In the preceding preferred embodiments, the inverter 2 opens single phase so as to feed a single-phase power to the induction motor 1. However, the present invention is not limited to this. It suffices that the generation of the rotation magnetic field in the induction motor 1 is not caused. Therefore, instead of opening single phase, a V-phase voltage command signal vv* and a W-phase voltage command signal vw* as expressed by the following equations as well as a U-phase voltage command signal vu* may be applied to the inverter 2 (this embodiment will be referred to as "a fifth preferred embodiment" hereinafter):

$$vv^* = -vu^* \div 2 \quad (34), \text{ and}$$

$$vw^* = -vu^* \div 2 \quad (35).$$

The voltage command signals vv* and vw* expressed by the equations (34) and (35), respectively, are applied to the inverter 2, so that the single-phase power can be fed to the induction motor 1. As a result, a work for opening single phase of a connection connected to the induction motor 1 from the inverter 2 can be omitted.

Sixth Preferred Embodiment

Figure 20:
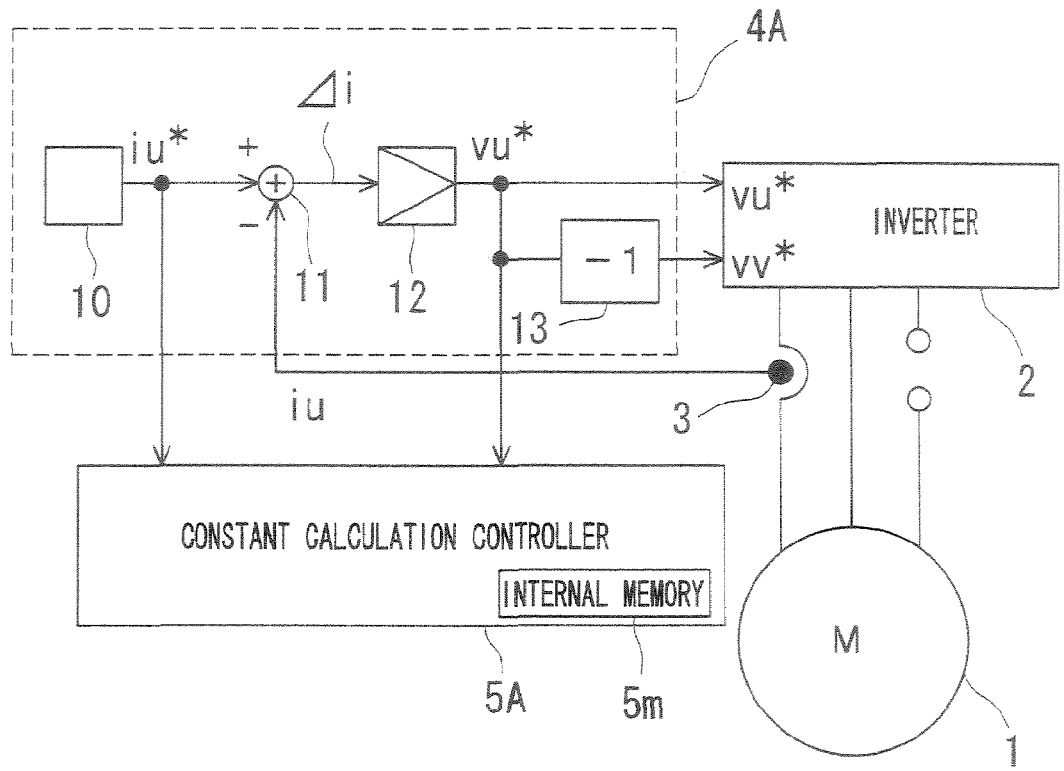
FIG. 20 is a block diagram showing a configuration of an induction motor constant measuring apparatus according to a sixth preferred embodiment of the present invention.

FIG. 20 is a block diagram showing a configuration of an induction motor constant measuring apparatus according to a sixth preferred embodiment of the present invention. In FIG. 20, an induction motor 1, which is an AC rotary machine, is connected to the inverter 2. With a view of feeding a single-phase power to the induction motor 1, the inverter 2 opens one of three phases of a U phase, a V phase, and a W phase. In this case, the upper arm and the lower arm may be opened by as much as single phase of the inverter 2 or only single phase of the induction motor 1 may be disconnected. In other words, the inverter 2 feeds an AC power in a single-phase feeding state to the induction motor 1 so as not to generate a rotating magnetic field and a rotational torque in the induction motor 1. This leads to that, even when the induction motor 1 is connected to a load equipment and cannot be subjected to a no-load test, constants of the induction motor 1 can be measured. The current detector 3 detects a single-phase current iu flowing from the inverter 2 to the induction motor 1, and outputs a current signal indicating the detected current iu to a subtracter 11. The current detector 3 may employ a well-known method for detecting three-phase currents from a DC link current of a power converter (See, for example, the Non- Patent Document 1) other than the method for directly detecting the U-phase current as shown in FIG. 1.

An apparatus controller 4A, which is configured by, for example, a digital calculator, specifically includes a signal source 10, the subtracter 11, a deviation amplifier 12, and a sign inverter 13. The apparatus controller 4A calculates voltage command signals vu* and vv* to be applied to the induction motor 1, and outputs the calculated voltage command signals vu* and vv* to the inverter 2. In addition, a constant calculation controller 5A, which is configured by, for example, a digital calculator that includes an internal memory 5m, calculates and outputs the constants of the induction motor 1 from a relationship between the voltage command signal vu* and a current command signal iu* when the inverter 2 feeds a single-phase power to the induction motor 1. In the apparatus controller 4A, the sign& source 10 generates the current command signal iu* and outputs the generated signal to the constant calculation controller 3A and outputs the same signal to the subtracter 11. The subtracter 11 calculates a current deviation Δi between the current command signal iu* from the signal source 10 and a current iu detected by the current detector 3, and outputs the current deviation Δi to the deviation amplifier 12. The deviation amplifier 12 amplifies the inputted current deviation Δi by a predetermined amplification constant, generates the voltage command signal vu* after the amplification, and outputs the voltage command signal vu* to the inverter 2, and then outputs the same signal to the constant calculation controller 5A. In addition, the deviation amplifier 12 outputs the inputted signal to the inverter 2 through the sign inverter 13 that multiplies the inputted signal by (−1).

Figure 21:
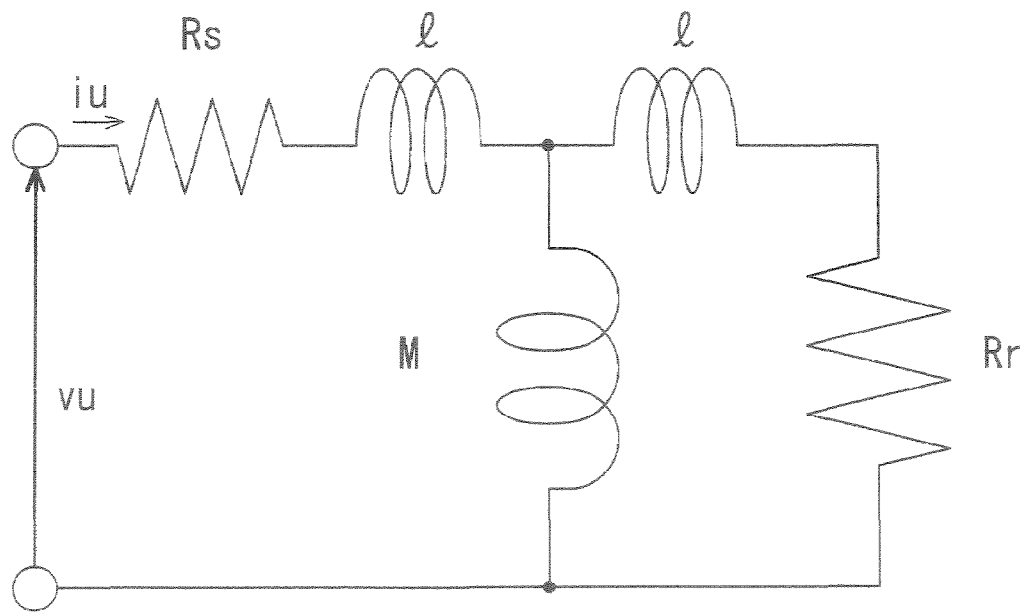
FIG. 21 is a circuit diagram of a T type equivalent circuit of the induction motor 1 shown in FIG. 20 in a stationary state.

FIG. 21 is a circuit diagram of a T type equivalent circuit of the induction motor 1 shown in FIG. 20 in a stationary state. In FIG. 21, the equivalent circuit of the induction motor 1 is configured so that a mutual inductance M is connected in parallel to the serial circuit of the leakage inductance 1 and the secondary resistance Rr, and so that the serial circuit of the leakage inductance 1 and the primary resistance Rs is connected in serial to the parallel circuit. In the present preferred embodiment, it is assumed that the primary-side leakage inductance and the secondary-side leakage inductance have the same value 1, and that a primary-side inductance and a secondary-side inductance have the same value L, accordingly.

Figure 22:
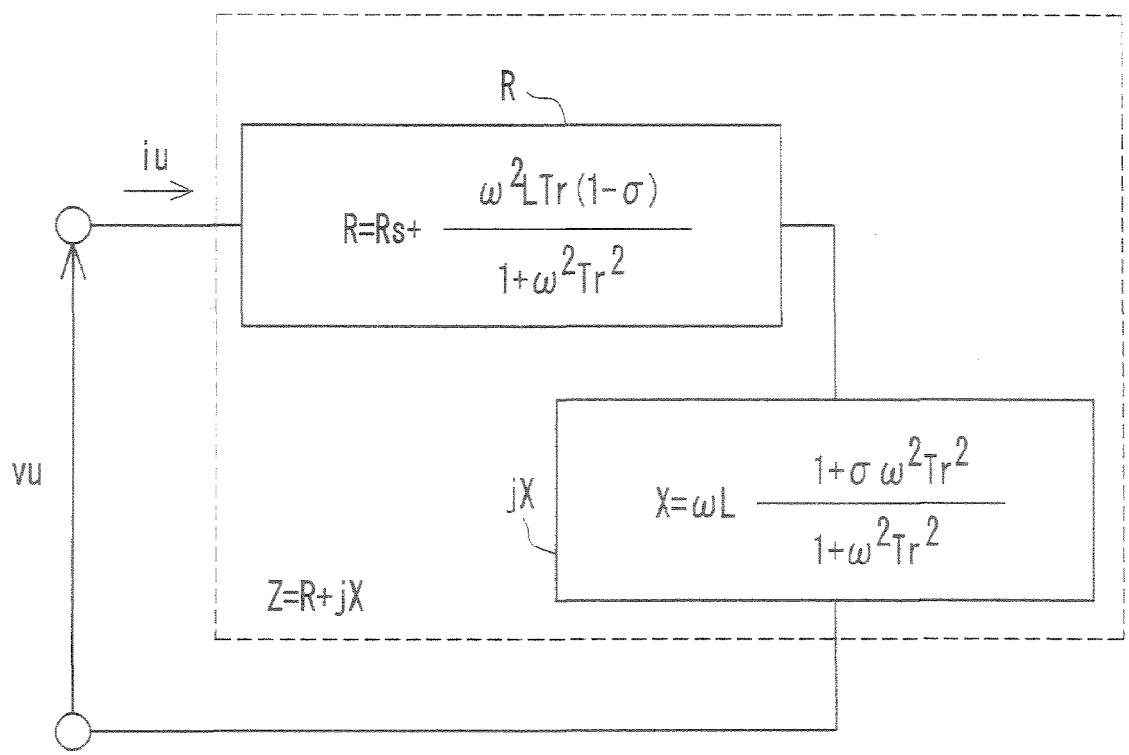
FIG. 22 is a circuit diagram of an equivalent circuit that expresses the T type equivalent circuit shown in FIG. 21 using an R serial circuit.

FIG. 22 is a circuit diagram of an equivalent circuit that expresses the T type equivalent circuit shown in FIG. 21 using an RX serial circuit. In FIG. 22, the RX serial circuit is expressed using a serially combined impedance Z between a resistance component R and a reactance component X, and this serially combined impedance Z is expressed by the following equation:

$$Z = R + jX = Rs + j\omega 1 + \frac{j\omega M(j\omega 1 + Rr)}{j\omega M + (j\omega 1 + Rr)}, \quad (36)$$

where $\omega$ is $2\pi f$, f denotes a frequency of the current command signal iu*, $\omega$ denotes an angular frequency of the current command signal iu*, and j denotes an imaginary unit. When the resistance component R and the reactance component X are calculated from the equation (36), they are expressed by the following equations:

$$R = Rs + \frac{\omega^2 L Tr(1-\sigma)}{1+\omega^2 Tr^2}, \quad (37)$$

$$X = \omega L \frac{1+\sigma\omega^2 Tr^2}{1+\omega^2 Tr^2}, \text{ and} \quad (38)$$

$$L = M + 1. \quad (39)$$

where L denotes a primary inductance. In the present preferred embodiment, it is assumed that the primary inductance L is equal to the secondary inductance L. Further, the secondary time constant Tr and the leakage coefficient σ are expressed by the following equations:

$$Tr = L \div Rr \quad (40), \text{ and}$$

$$\sigma = 1 - M^2 \div L^2 \quad (41).$$

In the equations (37) and (38), if the reactance components X corresponding to the two frequencies f1 and f2 are assumed as X1 and X2, respectively, the following equations are obtained:

$$X1 = \omega 1 L \frac{1+\sigma\omega 1^2 Tr^2}{1+\omega 1^2 Tr^2}, \text{ and} \quad (42)$$

$$X2 = \omega 2 L \frac{1+\sigma\omega 2^2 Tr^2}{1+\omega 2^2 Tr^2}, \quad (43)$$

where ω1 is 2πf1 and ω2 is 2πf2. If the equations (42) and (43) are rewritten to simultaneous equations with the secondary time constant Tr and the primary inductance L assumed to be unknown, values of the secondary time constant Tr and the primary inductance L are obtained by solving the following simultaneous equations:

$$Tr = \sqrt{\frac{\omega 2 X1 - \omega 1 X2}{\omega 1 \omega 2\{(\omega 2 X2 - \omega 1 X1) + (\sigma L)(\omega 1^2 - \omega 2^2)\}}}, \text{ and} \quad (44)$$

$$L = \frac{X1 X2(\omega 2^2 - \omega 1^2) + \sigma L(\omega 1^3 X2 - \omega 2^3 X1)}{\omega 1 \omega 2\{(\omega 2 X2 - \omega 1 X1) + (\sigma L)(\omega 1^2 - \omega 2^2)\}}. \quad (45)$$

In other words, if a leakage inductance σL that is a product between the leakage coefficient σ and the primary inductance L has been known, the secondary time constant Tr and the primary inductance L can be calculated only using the reactance component X without using the resistance component R of the serially combined impedance Z. It is noted that a value of the leakage inductance σL may be measured by the same method as that at step S102 according to the first preferred embodiment or a design value or an approximate value may be used as the leakage inductance σL.

If the secondary time constant Tr and the primary inductance L are obtained, the secondary resistance Rr can be calculated using the following equation:

$$Rr = L \div Tr \quad (46).$$

Using the above method, the constant calculation controller 5A calculates the secondary time constant Tr, the primary inductance L, and the secondary resistance Rr from the values of the reactance components X1 and X2 corresponding to the two frequencies f1 and f2, respectively, as well as the leakage inductance σL that is the product between the leakage inductance σ and the primary inductance L.

Figure 23:
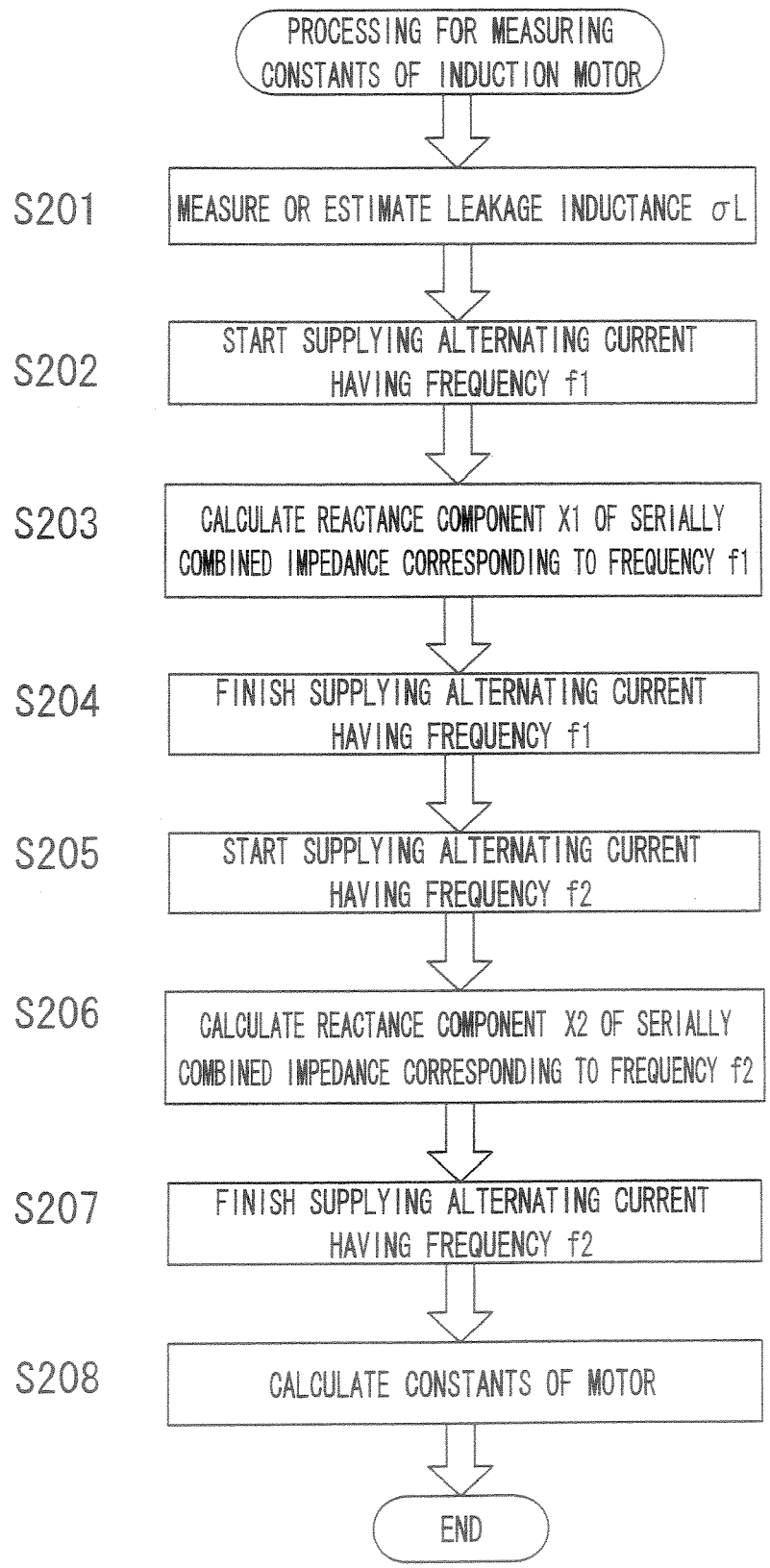
FIG. 23 is a flowchart showing an induction motor constant measuring processing which is performed by the induction motor constant measuring apparatus shown in FIG. 20 for measuring the constants of the induction motor 1.

FIG. 23 is a flowchart showing a induction motor constant measuring processing which is performed by the induction motor constant measuring apparatus shown in FIG. 20 for measuring the constants of the induction motor 1. The procedures for measuring the reactance components X1 and X2, and for calculating the constants of the induction motor 1 will be described hereinafter with reference to FIG. 23.

At step S201 shown in FIG. 23, the leakage inductance σL is first measured or estimated. In this case, the leakage inductance σL may be measured or estimated using an arbitrary method including the above-mentioned method. Next, at step S202, feeding of an AC power having the frequency f1 is started. At this time, the signal source generates, as the current command signal iu*, an AC signal iu1* having the frequency f1, and outputs the AC signal iu1* to the subtracter 11 and the constant calculation controller 5A. The subtracter 11 calculates the current deviation Δi between the current command signal iu* from the signal source 10 and the current iu detected by the current detector 3, and outputs the signal indicating the current deviation Δi to the deviation amplifier 12. In response to this, the deviation amplifier 12 generates the voltage command signal vu* according to the following equation, outputs the generated signal to the inverter 2 and the constant calculation controller 5A, and also outputs, as the voltage command signal vv*, the generated signal to the inverter 2 through the sign inverter 13:

$$vu^* = \omega cc(\sigma L)\left\{\Delta i + \int \frac{\omega cc}{N} \Delta i\, dt\right\}, \tag{47}$$

where ωcc denotes a current response set value, N denotes an arbitrary constant, and "t" denotes a time. Further, the current deviation Δi is expressed by the following equation.

$$\Delta i = iu^* - iu \tag{48}$$

A loop control circuit configured by the inverter 2, the current detector 3, and the apparatus controller 4A controls the current iu of the induction motor detected by the current detector 3 so as to substantially coincide with the current command signal iu*, and the inverter 2 applies AC voltages vu and vv to the induction motor 1.

Next, at step S203, the constant calculation controller 5A calculates and measures the reactance component X1 corresponding to the frequency f1. The principle of this measurement will be described below. In the induction motor constant measuring apparatus according to the present preferred embodiment, the deviation amplifier 12 of the apparatus controller 4A can control the current iu of the induction motor 1 so as to substantially coincide with the desired value iu* as indicated by a current command. Next, at step S202, an AC signal iu1* as expressed by the following equation using an amplitude I1 and the frequency f1 is generated and outputted as the current command signal iu*:

$$iu1^* = I1\cos(2\pi f1 t) \tag{49}$$

In this case, it is assumed that the voltage command signal vu* of the inverter 2 and a terminal voltage vu of the induction motor 1 are vu1* and vu1, respectively. When the loop control circuit configured by the inverter 2, the current detector 3, and the apparatus controller 4A controls the voltage command signal vu1* and the terminal voltage vu1 of the induction motor 1 so as to substantially coincide with each other, an amplitude B1 of a quadrature phase component of the voltage command signal vu1* based on the AC signal iu1* is expressed by the following equation using a cross-correlation function:

$$B1 = \frac{2}{T1}\int_0^{T1} vu1^*\sin(2\pi f1 t)\, dt, \tag{50}$$

where T1 denotes a preset integral time. In the equation (50), the integral time T1 may be set to an integer multiple of a cycle of the AC signal iu1*.

Next, since the quadrature phase component B1 of the voltage based on the AC signal iu1* can be calculated from the equation (50) when the amplitude I1 of the AC signal iu1* has been already known, the reactance component X1 corresponding to the frequency f1 is calculated by the following equation (51):

$$X1 = B1 \div I1 \tag{51}$$

At step S204, the feeding of the AC having the frequency f1 is finished. At step S205, the feeding of an AC having the frequency f2 is started using the same method as that used at step S202. At this time, the signal source 10 generates, as the current command signal iu*, an AC signal iu2* having the frequency f2, and outputs the generated signal to the subtracter 11 and outputs the same signal to the constant calculation controller 5A. The subtracter 11 calculates the current deviation Δi between the current command signal iu* from the signal source 10 and the current iu fed to the induction motor 1 and detected by the current detector 3, and then, outputs the signal indicating the current deviation Δi to the deviation amplifier 12. In response to this, the deviation amplifier 12 generates the voltage command signal vu* using the equation (47) and outputs the generated signal to the inverter 2. The loop control circuit configured by the inverter 2, the current detector 3, and the apparatus controller 4A controls the current iu of the induction motor 1 so as to substantially coincide with the current command signal iu*, and the inverter 2 generates the AC voltages vu and vv and applies the voltages to the induction motor 1.

At step S206, in a manner similar to that of the processing at step S203, the constant calculation controller 5A calculates and measures the reactance component X2 corresponding to the frequency f2 different from the frequency f1. At step S205, the AC signal iu2* having an amplitude I2 and the frequency f2 is assumed to be generated and outputted as the current command signal iu*. The value of the amplitude I2 may be either the same as or different from he values of the current command signal iu1* and iu2*.

$$iu2^* = I2\cos(2\pi f2 t) \tag{52}$$

It is assumed herein that the voltage command signal vu* of the inverter 2 and the terminal voltage vu of the induction motor 1 are vu2* and vu2, respectively. If the voltage command signal vu2* and the terminal voltage vu2 of the induction motor 2 are controlled so as to substantially coincide with each other, an amplitude B2 of a quadrature phase component of the voltage command signal vu2* based on the AC signal iu2* is obtained by the following equation using the cross-correlation function:

$$B2 = \frac{2}{T2}\int_0^{T2} vu2^*\sin(2\pi f2 t)\, dt, \tag{53}$$

where T2 denotes a preset integral time. In the equation (53), the integral time T2 may be set to an integer multiple of a cycle of the AC signal iu2*.

Since the quadrature phase component B2 of the voltage based on the AC signal iu2* can be calculated from the equation (53) when the amplitude I2 of the AC signal iu2* has been already known, the reactance component X2 corresponding to the frequency f2 is calculated by the following equation (54):

$$X2 = B2 \div I2 \tag{54}$$

Next, at step S207, the feeding of the AC having the frequency f2 is finished. Further, at step S208, the secondary time constant Tr, the primary inductance L, and the secondary resistance Rr are calculated using the equations (44) to (46) based on the reactance component X1 corresponding to the frequency f1 and the reactance component X2 corresponding to the frequency f2 as measured at steps S203 and S206, respectively. The processing at step S208 is finished, and then, finishing the processing for measuring the constants of the induction motor. At steps S203 and S206, the quadrature phase components B1 and B2 of the voltage relative to the current command signal (AC signal) iu* are calculated. However, the present invention is not limited to this. The quadrature phase components of the voltage based on the current iu detected by the current detector 3 may be calculated and set as the amplitudes B1 and B2.

The frequencies at which the inverter 2 feeds the AC power at steps S202 and S205 shown in FIG. 23 will be next described. The upper limit of the frequency at which the induction motor constant measuring apparatus according to the present preferred embodiment can measure constants with higher accuracy will be first described.

Next, at step S201 shown in FIG. 23, the leakage inductance σL that is the product between the leakage coefficient σ and the inductance L is measured or estimated. At step S208, when the secondary time constant Tr and the primary inductance L of the induction motor 1 are calculated using the equations (44) and (45), the value of the leakage inductance σL as measured at step S201 is necessary. However, when an error is included in the value of the leakage inductance σL, calculation errors in the secondary time constant Tr and the primary inductance L become large even if the reactance components X1 and X2 are correctly measured. Therefore, it is necessary to measure the secondary time constant Tr and the primary inductance L in a frequency band in which the reactance component X does not depend on the value of the leakage inductance σL.

Figure 24:
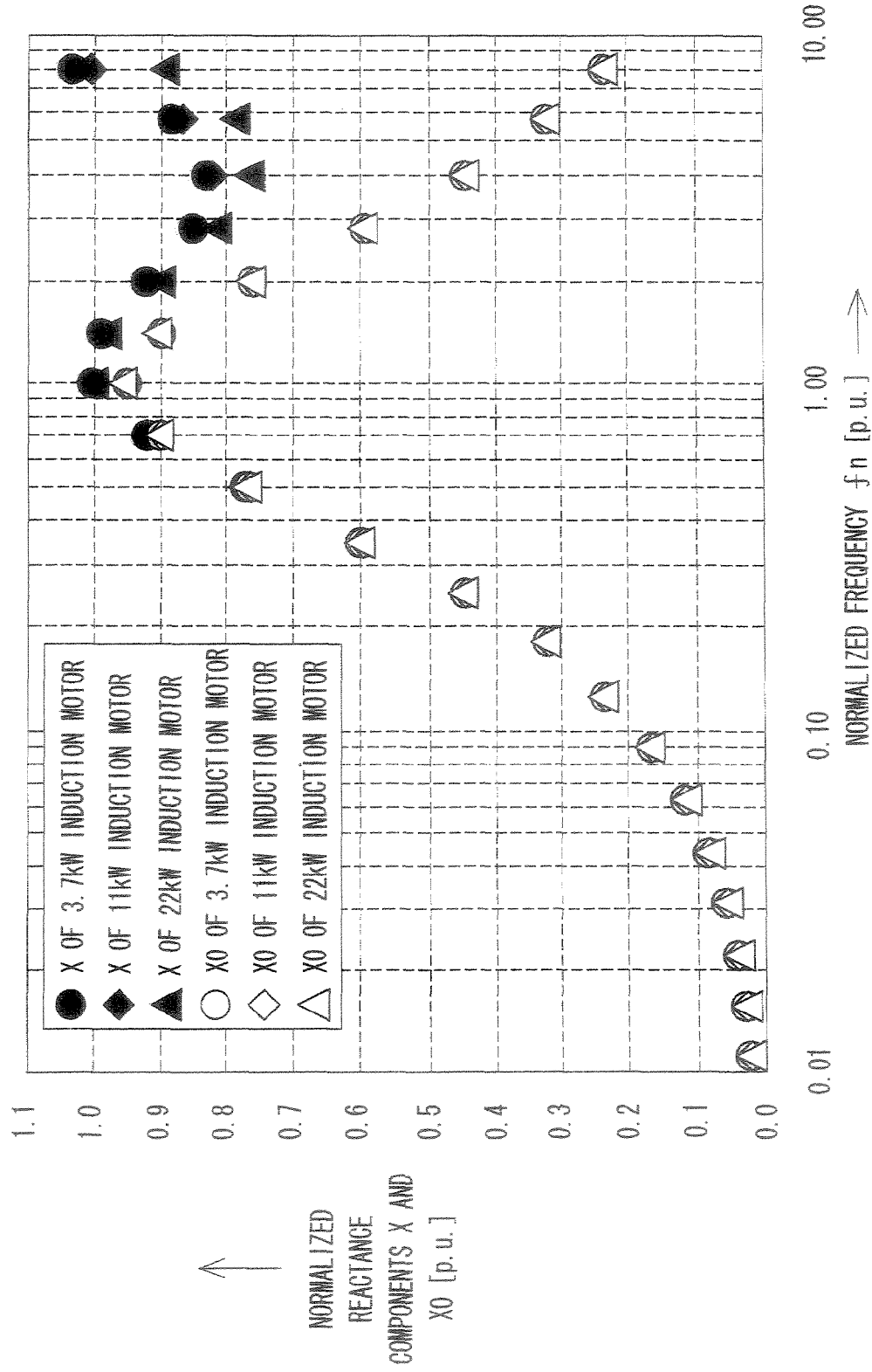
FIG. 24 is a graph showing characteristics of a normalized frequency fn of reactance components X and X0 of each of the induction motors having rated capacities of 3.7 kW, 11 kW, and 22 kW.

FIG. 24 is a graph showing characteristics of a normalized frequency fn of reactance components X and X0 of each of the induction motors 1 having rated capacities of 3.7 kW, 11 kW, and 22 kW. In other words, in FIG. 24, the frequency characteristics of the reactance component X that can be calculated using the calculation equation for calculating the reactance component X shown in the equation (38), and the reactance component X0 when the leakage coefficient σ is regarded as zero and the influence of the leakage inductance is ignored are plotted. In this case, the reactance component X0 when the influence of the leakage inductance corresponding to the frequency f is ignored can be expressed by the following equation with the leakage coefficient σ in the equation (38) assumed as zero:

$$X0 = \omega L \frac{1}{1 + \omega^2 Tr^2}, \tag{55}$$

where ω is 2πf and f denotes the frequency of the current command signal iu*. In FIG. 24, the magnitudes of the reactance components X and X0 largely depend on the rated capacity and the frequency f of the induction motor 1. For this reason, both axes of FIG. 24 are normalized by the following method. The normalized frequency fn on the horizontal axis is normalized with a frequency f=1/(2πTr) [Hz] set to 1 [p.u], and the normalized frequency fn is represented in logarithmic scale. In addition, the reactance component X and the reactance component X0 when the influence of the leakage inductance is ignored on the vertical axis are normalized with the value of the reactance component X at the frequency f=1/(2πTr) [Hz] set to 1 [p.u.].

As shown in FIG. 24, the difference between the reactance component X and the reactance component X0 when the influence of the leakage inductance is ignored appears in a frequency band higher than this normalized frequency fn=1 [p.u.]=1/(2πTr) [Hz] with a boundary as set to a frequency near the normalize frequency fn=1 [p.u.]=1/(2πTr) [Hz], irrespectively of the rated capacity of the induction motor 1. That is, FIG. 24 indicates that the value of the leakage coefficient σ influences the reactance component X. Therefore, it is clear that the frequency band in which the reactance component X does not depend on the leaage inductance σL is a frequency band approximately equal to or lower than f=1/(2πTr) [Hz].

In addition, as apparent from FIG. 24, the reactance component X becomes the maximum at the frequency near the frequency f=1 [p.u.]=1/(2πTr) [Hz]. The fact that the reactance component X becomes the maximum at the frequency near the frequency f=1/(2πTr) [Hz] will be described below using equations. The reactance component X is a function of the frequency f, i.e., the angular frequency ω. In this case, when both of the sides of the calculation equation for calculating the reactance component X as expressed by the equation (38) are differentiated by the angular frequency ω, the following equation is obtained:

$$\frac{dX}{d\omega} = \frac{L\{1 + (-1 + 3\sigma)\omega^2 Tr^2 + \sigma\omega^4 Tr^4\}}{(1 + \omega^2 Tr^2)^2} \tag{56}$$

$$\cong \frac{L\{1 + (-1 + 3\sigma)\omega^2 Tr^2\}}{(1 + \omega^2 Tr^2)^2},$$

where it is set to that σω⁴Tr⁴<<1. If dX/dω=0, the reactance component X becomes the maximum, the angular frequency ωmax at which time is expressed by the following equation:

$$\omega\max = \frac{1}{\sqrt{1 - 3\sigma}\,Tr} \cong \frac{1}{Tr} \text{ [rad/sec]}, \tag{57}$$

where it is set to that 3σ<<1. The frequency fmax of the angular frequency ωmax is expressed by the following equation:

$$f\max \cong \frac{1}{2\pi Tr} \text{ [Hz]}. \tag{58}$$

Thus, the fact that the reactance component X becomes the maximum at the frequency near the frequency f=1/(2πTr) [Hz] is indicated using the equations.

In addition, as the amplitude B of the quadrature phase component of the voltage command signal vu* relative to the current command signal iu* is higher, the influence of the voltage error resulting from the inverter 2 is smaller. Accordingly, by setting the frequency f to the frequency at which the amplitude B becomes the maximum, the constants can be measured with higher accuracy. In the present preferred embodiment, when the amplitudes I1 and I2 of the current command signal iu* are set to a constant value I irrespective of the frequencies f1 and f2 at which the inverter 2 feeds the AC power to the induction motor 1, the amplitude B of the quadrature phase component of the voltage command signal vu* relative to the current command signal iu* is a product between the amplitude I of the current command signal iu* and the reactance component X that changes to correspond to the frequency f. Therefore, the frequency at which the amplitude B becomes the maximum, coincides with the frequency at which the reactance component X becomes the maximum. In other words, the amplitude B becomes the maximum near the frequency $f=1/(2\pi Tr)$ [Hz].

Figure 25:
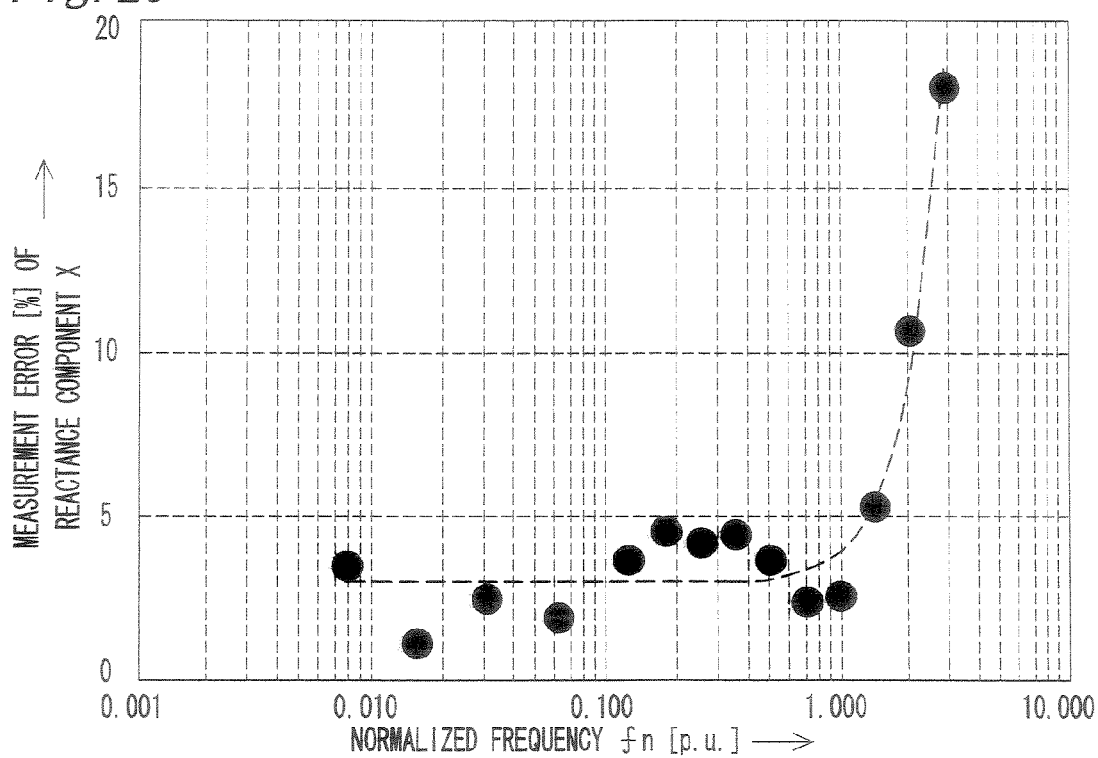
FIG. 25 is a graph showing characteristics of the normalized frequency fn relative to a measurement error in the reactance component X of the induction motor having the rated capacity of 3.7 kW according to the sixth preferred embodiment.

FIG. 25 is a graph showing characteristics of the normalized frequency fn relative to the measurement error in the reactance component X of the induction motor 1 having the rated capacity of 3.7 kW according to the sixth preferred embodiment. That is, FIG. 25 shows results of an experiment of measuring the error in the reactance component X corresponding to the frequency f by the method at steps S201 to S204 shown in FIG. 23. In FIG. 25, the normalized frequency fn on a horizontal axis is normalized with the frequency $f=1/(2\pi Tr)$ [Hz] set to 1 [p.u.]. It is found out by the inventors, as shown in FIG. 25, that measurement accuracy for measuring the reactance component X is deteriorated in the frequency band in which the frequency f is higher than $1/(2\pi Tr)$ [Hz]. Taking this into consideration, it is preferable that the frequency f is set to fall within a frequency band lower than $1/(2\pi Tr)$ [Hz]. Thus, the upper limit of the frequency at which the inverter 2 feeds the AC power to the induction motor 1 in each of the steps S202 and S205 is $f=1/(2\pi Tr)$.

Further, in the present preferred embodiment, a lower limit of the frequency at which the constants can be measured with higher frequency can be considered in a manner similar to that of the first preferred embodiment. When a digital processing is performed using a triangular wave comparison type PWM, the lower limit can be considered using the voltage resolution C defined by the equation (19). As apparent from FIG. 13, when the relationship between the frequency f and the amplitude B substantially coincides irrespectively of the rated capacity of the induction motor 1 and the frequency f is equal to or higher than 0.006 [Hz], the amplitude B of the quadrature phase component of the voltage command signal vu* relative to the current command signal iu* is higher than the voltage resolution C of the inverter 2. In order to further improve the constant measurement accuracy, the lower limit of the frequency f may be determined so that the division value B/C becomes high. For example, when the division value B/C is set to 5, the frequency is preferably set to be equal to or higher than 0.03 [Hz]. When the division value B/C is set to 10 or more, the frequency is preferably set to be equal to or higher than 0.06 [Hz].

Figure 26:
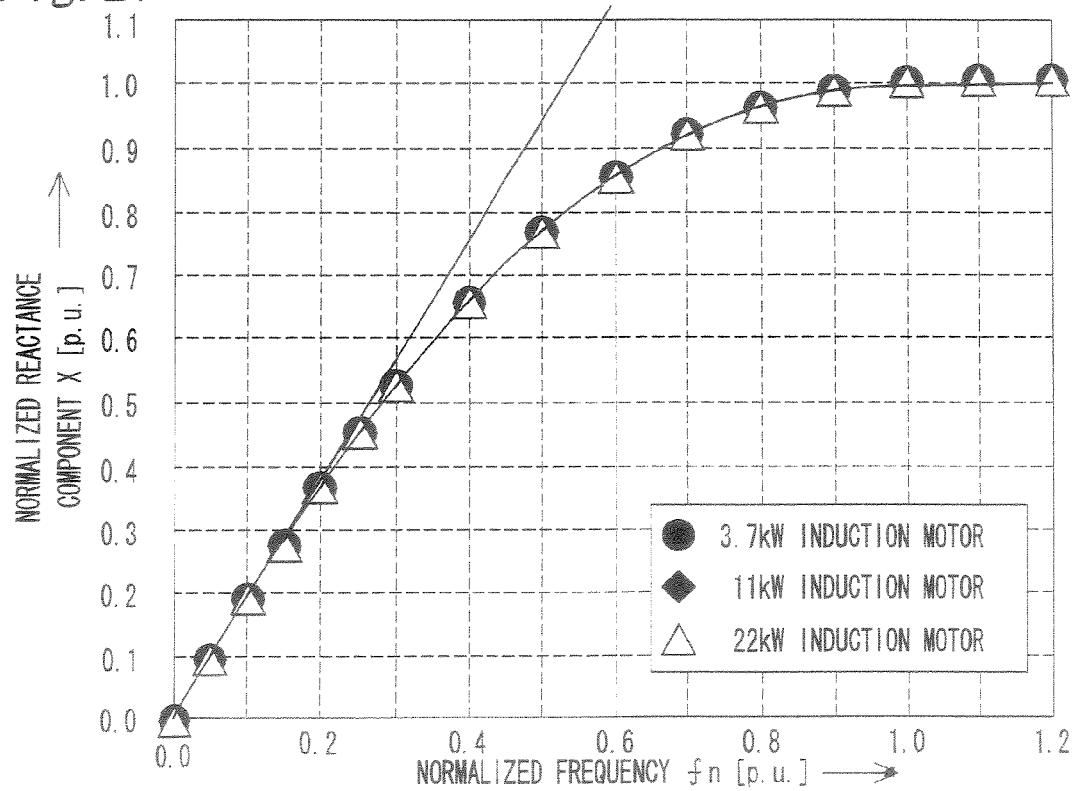
FIG. 26 is a graph showing characteristics of the normalized frequency fn of the reactance component X in each of the induction motors having rated capacities of 3.7 kW, 11 kW, and 22 kW according to the sixth preferred embodiment.

FIG. 26 is a graph showing characteristics of the normalized frequency fn of the reactance component X in each of the induction motors 1 having rated capacities of 3.7 kW, 11 kW, and 22 kW. In other words, in FIG. 26, the reactance component X calculated using the equation (38) is plotted relative to the normalized frequency fn for each of the induction motors 1 having the rated capacities of 3.7 kW, 11 kW, and 22 kW. In FIG. 26, in a manner similar to that of FIG. 5, the normalized frequency fn on a horizontal axis is normalized with the frequency $f=1/(2\pi Tr)$ [Hz] set to 1 [p.u.]. Further, the reactance component X on a vertical axis is a normalized reactance component X with the value of the reactance component at the frequency $f=1/(2\pi Tr)$ [Hz] set to 1 [p.u.]

As shown in FIG. 26, the reactance component X in a frequency band lower than the normalized frequency $fn=0.2$ [p.u.]$=0.2/(2\pi Tr)$ [Hz] is proportional to the frequency f, irrespectively of the rated capacity of the induction motor 1, with a boundary as set to the normalized frequency $fn=0.2$ [p.u.]$=0.2/(2\pi Tr)$ [Hz]. The reason is as follows. In the calculation equation for calculating the reactance component X as expressed by the equation (38), the frequency f, i.e., the angular frequency ω is quite low, so that $\sigma\omega^2 Tr^2 \ll 1$ and $\omega^2 Tr^2 \ll 1$ are satisfied. Therefore, the calculation equation for calculating the reactance component X as expressed by the equation (38) can be approximated as expressed by the following approximate equation.

$$X \approx \omega L \qquad (59).$$

Accordingly, when the reactance components X1 and X2 corresponding to the two angular frequencies ω1 and ω2 in the frequency band in which the approximate equation (59) is held, the reactance components X1 and X2 satisfy the following approximate equations:

$$X1 \approx \omega 1\, L \qquad (60), \text{ and}$$

$$X2 \approx \omega 2\, L \qquad (61).$$

When the approximations of the equations (60) and (61) are satisfied, the value of (ω2X1−ω1X2) in the equation (44) becomes quite small and close to zero. On the other hand, in order to make the value of (ω2X1−ω1X2) in the equation (44) sufficiently larger than zero, the frequencies f1 and f2 are set to fall within a frequency band equal to or higher than a frequency of $0.2/(2\pi Tr)$ [Hz]. By so setting, the value of (ω2X1−ω1X2) is sufficiently larger than zero, and the secondary time constant Tr can be measured with higher accuracy. Therefore, it is clear that the frequencies f1 and f2, at which the inverter 2 feeds the AC power to the induction motor 1, needs to be determined based on the value of the secondary time constant Tr so as to measure the secondary time constant Tr, the prima inductance L, and the secondary resistance Rr with higher accuracy.

Figure 27:
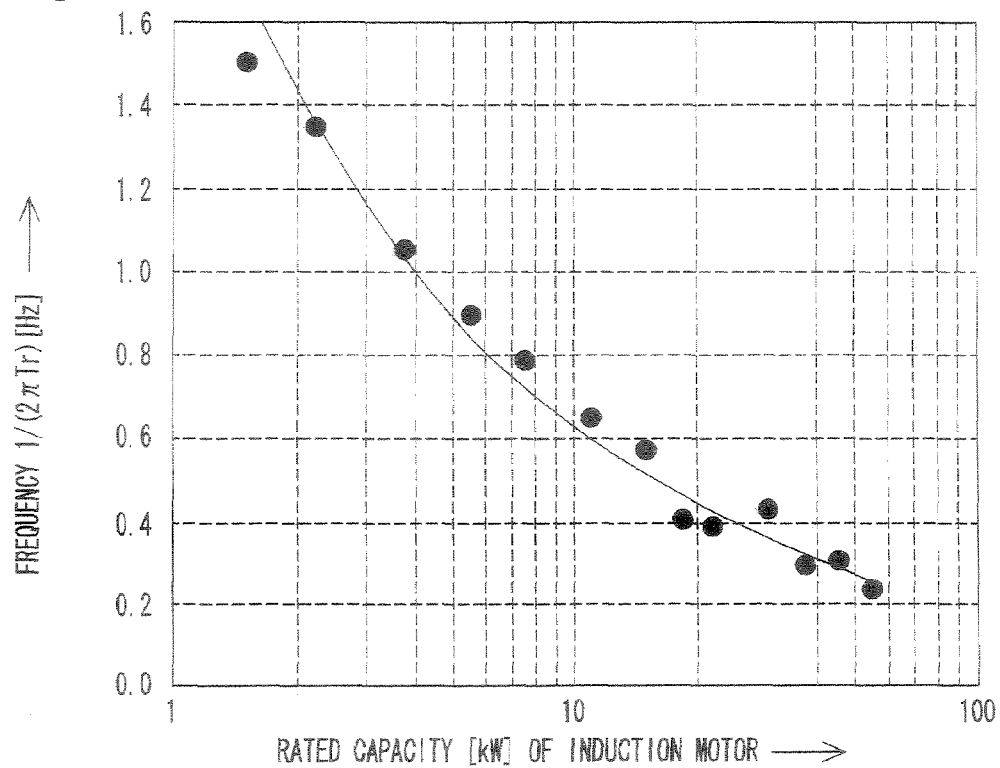
FIG. 27 is a graph showing characteristics of the frequency $1/(2\pi Tr)$ relative to the rated capacity of the induction motor ranging from 1.5 kW to 55 kW according to the sixth preferred embodiment.

However, the induction motor constant measuring apparatus according to the resent preferred embodiment is intended to obtain the secondary time constant Tr. Due to this, the value of the secondary time constant Tr is unknown at the time of the step S102 when the first supply of the AC power having the frequency f1 is executed. Taking this into consideration, the value of the frequency $1/(2\pi Tr)$ is measured for the induction motor having the rated capacity ranging from 1.5 kW to 55 kW. The results of the measurement are shown in FIG. 27. FIG. 27 is a graph showing characteristics of the frequency $1/(2\pi Tr)$ relative to the rated capacity of the induction motor 1 ranging from 1.5 kW to 55 kW.

As apparent from FIG. 27, for the induction motor having the rated capacity ranging from 1.5 kW to 55 kW, the frequency band of $1/(2\pi Tr)$ is equal to or higher than 0.24 Hz and equal to or lower than 1.5 Hz. In addition, for the induction motor having the rated capacity ranging from 1.5 kW to 45 kW, the frequency band of $1/(2\pi Tr)$ is equal to or higher than 0.3 Hz and equal to or lower than 1.5 Hz. Further, the rated capacity of the induction motor employed in, for example, an elevator is normally equal to or higher than 3 kW. The frequency $1/(2\pi Tr)$ of the induction motor having the rated capacity of 3 kW is approximately 1.2 Hz. Furthermore, for the induction motor having the rated capacity ranging from 1.5 kW to 45 kW, the frequency band of $0.2/(2\pi Tr)$ is equal to or higher than 0.06 Hz and equal to or lower than 0.3 Hz.

By setting the frequency f1 of the AC power fed in single phase at step S202 shown in FIG. 23 and the frequency f2 of the AC power fed at step S205 to fall within the frequency range equal to or higher than 0.006 Hz and equal to or lower than 1.5 Hz with taking into consideration that the lower limit of the frequency f determined by the voltage resolution C of the inverter 2 is 0.006 Hz, the reactance components X1 and X2 corresponding to the frequencies f1 and f2, respectively, can be measured with higher accuracy for the induction motor 1 having the rated capacity at least from 1.5 kW to 55 kW. As a result, there can be obtained such an advantageous effect that the secondary time constant Tr, the primary inductance L, and the secondary resistance Rr of the induction motor 1 having the rated capacity ranging at least from 1.5 kW to 55 kW can be measure with higher accuracy.

Further, the lower limit of the frequency f, at which the division value B/C that is the ratio of the voltage resolution C of the inverter 2 to the amplitude B of the quadrature phase component of the voltage command signal vu* relative to the current command signal iu* is equal to or higher than 10, is 0.06 Hz. The frequency $0.2/(2\pi Tr)$ of the induction motor 1 having the rated capacity of 45 kW is also 0.06 Hz. Taking this into consideration, the frequency f1 of the AC power fed at step S202 shown in FIG. 23 and the frequency f2 of the AC power fed at step S205 are set to fall within the frequency range equal to or higher than 0.06 Hz and equal to or lower than 1.5 Hz. By so setting, the reactance components X1 and X2 corresponding to the frequencies f1 and f2, respectively, can be measured with higher accuracy for the induction motor 1 having the rated capacity at least from 1.5 kW to 45 kW. As a result, there can be obtained an advantageous effect that the secondary time constant Tr, the primary inductance L, and the secondary resistance Rr of the induction motor 1 having the rated capacity ranging at least from 1.5 kW to 45 kW can be measured with higher accuracy.

If the frequency f is set to be equal to or higher than 0.06 Hz, the influence resulting from the voltage resolution C of the inverter 2 can be advantageously removed. In addition, for the induction motor 1 having the rated capacity ranging at least from 1.5 kW to 45 kW, the value of $(\omega 2 X1 - \omega 1 X2)$ in the equation (44) can be advantageously set sufficiently grater than 1, so that the error can be advantageously reduced.

Further, by setting the frequency f1 of the AC power fed at step S202 shown in FIG. 23 and the frequency f2 of the AC power fed at step S205 to fall within a frequency range equal to or higher than 0.06 Hz and equal to or lower than 1.2 Hz, the reactance components X1 and X2 corresponding to the respective frequencies f1 and f2 for the induction motor 1 employed at least in the elevator can be measured with higher accuracy. As a result, there can be obtained an advantageous effect that the secondary time constant Tr, the primary inductance L, and the secondary resistance Rr of the induction motor 1 employed in at least in the elevator can be measured with higher accuracy.

As can be seen from the above, with a view of removing the influence resulting from the voltage resolution C of the inverter 2 and the influence resulting from the leakage inductance 1 of the induction motor 1, the inverter 2 feeds the AC power to the induction motor 1 in the frequency range equal to or higher than 0.06 Hz and equal to or lower than 1.5 Hz. By executing this AC power feeding using at least two types of powers, the primary inductance L, the secondary resistance Rr, and the secondary time constant Tr can be measured with higher accuracy even when the induction motor 1 is connected to the load equipment.

Next, the advantageous effect of measuring the secondary time constant Tr, the primary inductance L, and the secondary resistance Rr from the reactance component X1 corresponding to the frequency f1 and the reactance component X2 corresponding to the frequency f2 will be described hereinafter from viewpoints of a voltage error that occurs to the inverter 2.

A voltage error resulting from a dead time voltage within the inverter 2 occurs between the voltage command signal vu* and the voltage vu applied to the induction motor 1 from the inverter 2. In addition, a power loss that occurs when an internal element of the inverter 2 is in an ON state causes a voltage drop, which is referred to as ON voltage, in a switching element, and this leads to a voltage error. According to the present preferred embodiment, however, the voltage errors influence only the resistance component R of the serially combined impedance Z and do not influence any reactance component X.

Figure 28:
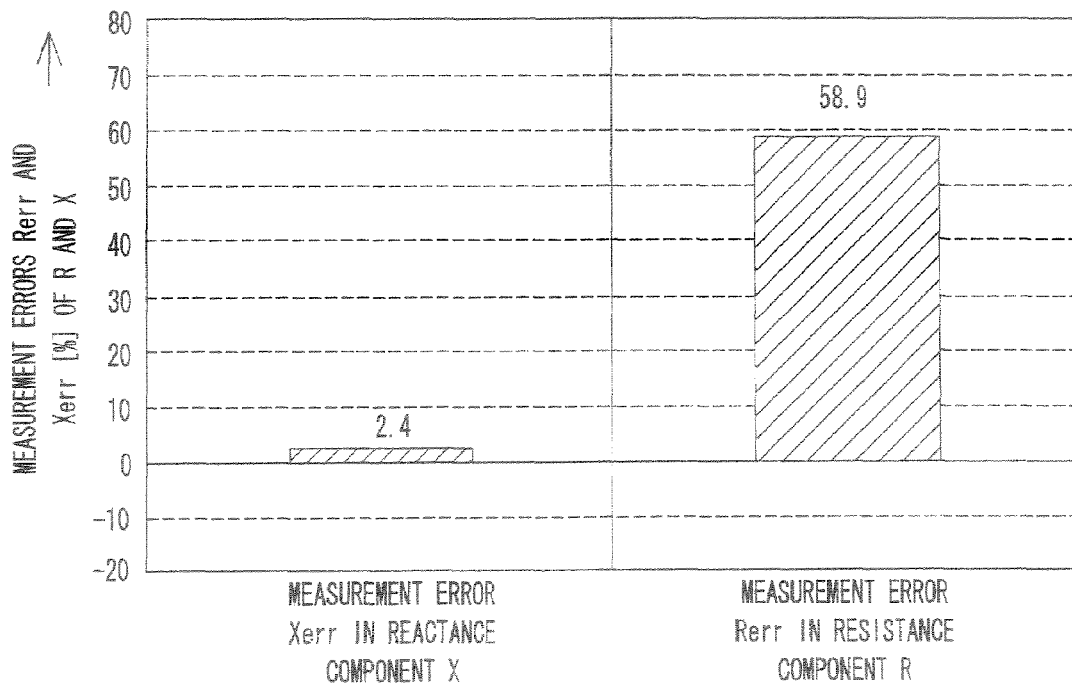
FIG. 28 is a graph showing measurement errors Rerr and Xerr in the resistance component R and the reactance component, respectively, according to the sixth preferred embodiment.

FIG. 28 is a graph showing measurement errors Rerr and Xerr in the resistance component R and the reactance component X, respectively, of the serially combined impedance Z corresponding to the frequency 0.18 Hz of the induction motor 1 having the rated capacity of 3.7 kW according to the sixth preferred embodiment. In this case, the reactance component X is measured using the method based on the processing at steps S201 to S204 shown in FIG. 23. No voltage correction is made against the voltage error resulting from the dead time of the inverter 2 and that resulting from the ON voltage.

The resistance component R can be calculated using the following equation by the cross-correlation function in parallel to the measurement of the amplitude B1 of the quadrature phase component of the voltage command signal vu1* based on the current command AC signal iu1* at step S203 shown in FIG. 23:

$$R = \frac{1}{I} \frac{2}{T1} \int_0^{T1} v1 * \cos(2\pi f 1 t) dt, \tag{62}$$

where I1 denotes an amplitude of the alternating current signal iu1*. In addition, T1 is a preset integral time, which is similarly set to the integral time T1 in the equation (50). Referring further to FIG. 28, the measurement error Rerr in the resistance component R and the measurement error Xerr in the reactance component X on the vertical axis are defined as follows:

$$Rerr = \frac{Rm - Rbase}{Rbase} \times 100 \; [\%], \text{ and} \tag{63}$$

$$Xerr = \frac{Xm - Xbase}{Xbase} \times 100 \; [\%], \tag{64}$$

where Rbase denotes a theoretical value of the resistance component R and Xbase denotes a theoretical value of the reactance component X. In addition, Rm denotes a measured value of the resistance component R and Xm denotes a measured value of the reactance component X. The theoretical values Rbase and Xbase are calculated by substituting known true values of the primary resistance Rs, the primary inductance L, the secondary resistance Rr, and the secondary time constant Tr of the induction motor 1 having the rated capacity of 3.7 kW, into the equations (37) and (38). As apparent from FIG. 28, the influence of the voltage errors resulting from the dead time voltage within the inverter 2 and the ON voltage of the switching element appears as the measurement error in the resistance component R but the influence is not exerted on the reactance component X.

Therefore, if the reactance components X of the serially combined impedance of the equivalent circuit of the induction motor 1 corresponding to the two frequencies, respectively, are calculated by feeding the single-phase AC powers having the two frequencies in a time division manner, the primary inductance, the secondary resistance, and the secondary time constant can be measured with higher accuracy without any influence of the errors resulting from the dead time voltage within the inverter 2 and the ON voltage of the switching element.

In addition in the present preferred embodiment, in the process of measuring the primary inductance L, the secondary resistance Rr, and the secondary time constant Tr, the value of the primary resistance Rs is unnecessary. That is, the measurement of the primary resistance Rs can be omitted. Even if the primary resistance Rs is measured separately, it is advantageously possible to prevent the influence of the measurement error in the primary resistance Rs from being exerted on the accuracy for the primary inductance L, the secondary resistance Rr, and the secondary time constant Tr.

Thus, the constant calculation controller 5A calculates the reactance components X of the serially combined impedance of the equivalent circuit of the induction motor 1 corresponding to at least two frequencies, respectively. The error resulting from the dead time voltage within the inverter 2 and that resulting from the ON voltage of the switching element appear in the resistance component R of the serially combined impedance of the equivalent circuit of the induction motor 1. By executing this calculation, the primary inductance L, the secondary resistance Rr, and the secondary time constant Tr can be measured with higher accuracy without any influence of the primary resistance error as well as the errors resulting from the dead time voltage within the inverter 2 and the ON voltage of the switching element even when the induction motor 1 is connected to the load equipment.

In addition, by allowing the inverter 2 to feed the AC power within the above frequency range twice, the values of the current amplitudes I1 and I2 and the frequencies f1 and f2 can be set to desired values, respectively. Therefore, the primary inductance L, the secondary resistance Rr, and the secondary time constant Tr can be measured with higher accuracy even when the induction motor 1 is connected to the load equipment.

Modified Preferred Embodiment of Sixth Preferred Embodiment

In the sixth preferred embodiment, the constants of the induction motors 1 are calculated from the reactance components X of the serially combined impedance of the equivalent circuit of the induction motor 1 corresponding to the two frequencies f. However, the present invention is not limited to this. The constants of the induction motor 1 may be calculated from the reactance components X of the serially combined impedance of the equivalent circuit of the induction motor 1 corresponding to three or more frequencies f (this embodiment will be referred to as "a modified preferred embodiment of the sixth preferred embodiment" hereinafter).

For example, besides the reactance components X1 and X2 corresponding to the frequencies f1 and f2, a reactance component X3 corresponding to a frequency f3 different from the frequencies f1 and f2 is measured by the same method as that for measuring the reactance components X1 and X2. In other words, as combinations of the frequency f and the reactance component X, three sets (f1, X1), (f2, X2), and (f3, X3) can be measured. Using arbitrary two out of thee three combinations, the primary inductance L, the secondary resistance Rr, and the secondary time constant Tr are calculated from the equations (44) to (46). In addition, results of the calculations are set as measured values of the primary inductance L, the secondary resistance Rr, and the secondary time constant Tr.

When the reactance components corresponding to three frequencies, there are three methods for selecting two out of the three sets (f1, X1), (f2, X2), and (f3, X3). Accordingly, the maximum of three sets of the primary inductance L, the secondary resistance Rr, and the secondary time constant Tr can be measured. The average values of the respective three constants L, Rr, and Tr as thus obtained may be calculated, and the calculated average values may be set as the measured values of the respective constants L, Rr, and Tr. By thus calculating the average values of the plural constants L, Rr, and Tr measured as mentioned above, respectively, the constant measurement accuracy can be further improved.

Moreover, even when reactance components corresponding to four or more frequencies are measured, the primary inductance L, the secondary resistance Rr, and the secondary time constant Tr can be calculated by the same method as that for calculating the reactance components corresponding to the three frequencies.

Seventh Preferred Embodiment

In the sixth preferred embodiment, the feeding of the AC power is executed twice, i.e., at steps S202 and S205 shown in FIG. 23, and the reactance component X1 corresponding to the frequency f1 and the reactance component X2 corresponding to the frequency f2 are calculated at steps S203 and S206, respectively. However, the present invention is not limited to this. The power when two types of components having frequencies f1 and f2 are superposed may be fed to the induction motor 1, and two reactance components X1 and X2 may be calculated by the feeding of the AC power performed once (this embodiment will be referred to as "a seventh preferred embodiment" hereinafter).

If the signal source 10 shown in FIG. 20 generates and outputs, as the current command signal iu*, a superimposed AC signal iu3*, which is obtained by superimposing an AC signal having a frequency f1 and an AC signal having a frequency f2, and which is expressed by the following equation, an inverter 2 can feed an AC power, where the two types of components having the frequencies f1 and f2 are superimposed, to an induction motor 1:

$$iu3^* = I01 \cos(2\pi f1 t) + I02 \cos(2\pi f2 t) \tag{65},$$

where I01 denotes a current amplitude of the component having the frequency f1, and I02 denotes a current amplitude of the component having the frequency f2.

Figure 29:
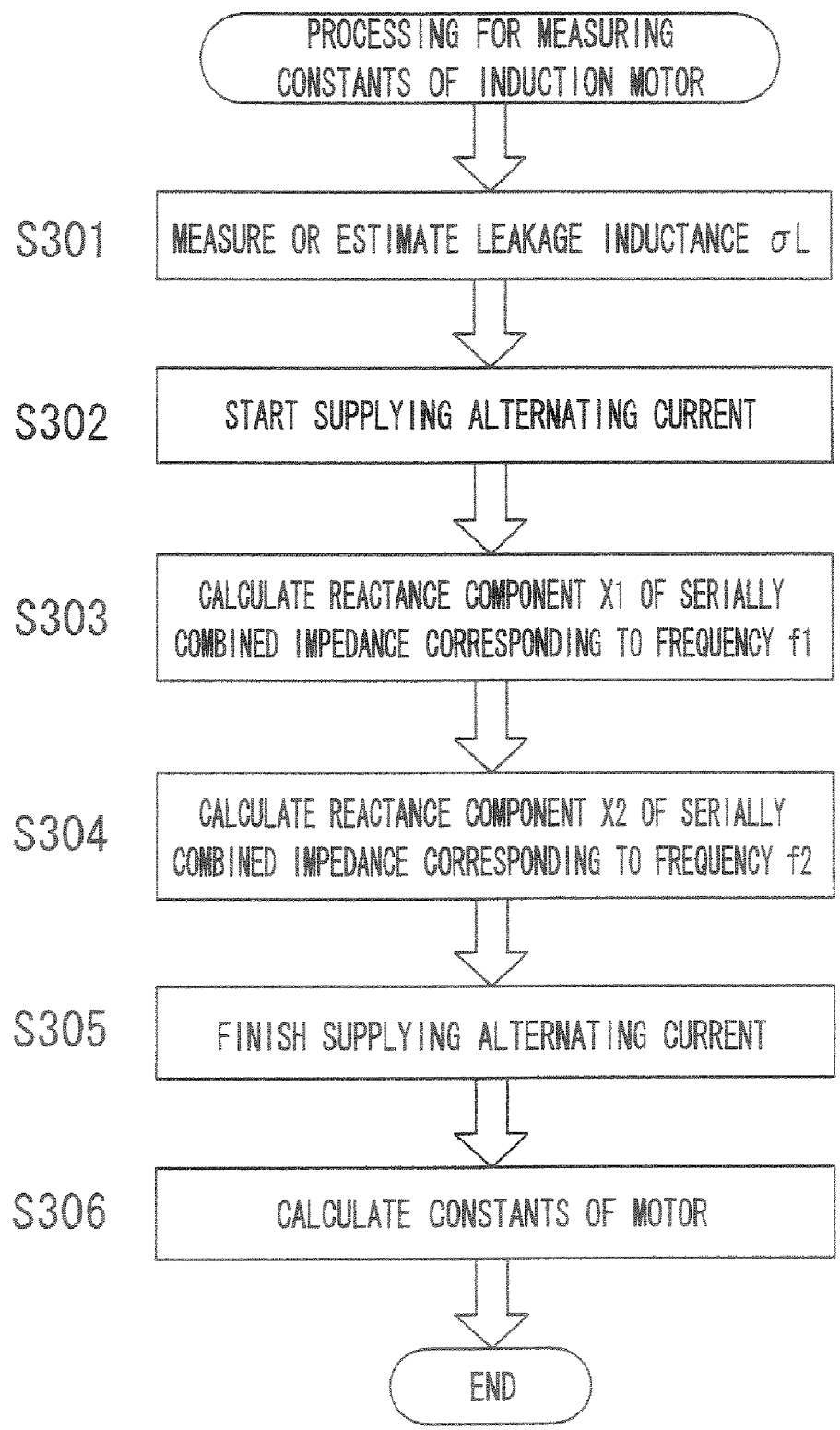
FIG. 29 is a flowchart showing a processing for measuring constants of an induction motor according to a seventh preferred embodiment of the present invention.

FIG. 29 is a flowchart showing a processing for measuring constants of an induction motor according to the seventh preferred embodiment of the present invention The processing for measuring constants of the induction motor according to the seventh preferred embodiment will be described with reference to FIG. 29.

At step S301 shown in FIG. 29, in a manner similar to that of the step S201 shown in FIG. 23, a leakage inductance σL is measured or estimated. At step S302, feeding of the AC signal as obtained by superimposing the two components having frequencies f1 and f2, respectively, is started. At this time, the signal source 10 generates, as a current command signal iu*, a superimposed AC signal iu3* expressed by the equation (65), and outputs the generated signal to a subtracter 11 and outputs the same signal to a constant calculation controller 5A. The subtracter 11 calculates a current deviation Δi between the current command signal iu* (=iu3*) and a current iu detected by a current detector 3, and outputs a signal indicating the calculated current deviation Δi to a deviation amplifier 12. In response to this, the deviation amplifier 12 calculates a voltage command signal vu* using the equation (47), generates a voltage command signal vu*, and outputs the generated signal to an inverter 2. The current iu detected by the current detector 3 is controlled so as to substantially coincide with the current command signal iu*, and the inverter 2 generates AC voltages vu and vv and applies the generated voltages to the induction motor 1.

Next, at step S303, the constant calculation controller 5A calculates and measures a reactance component X1 corresponding to the frequency f1. At step S304, the constant calculation controller 5A calculates and measures a reactance component X2 corresponding to the frequency f2. In this case, a measurement principle for measuring the reactance components X1 and X2 at steps S303 and S304, respectively, will be described.

At step S302 shown in FIG. 29, the voltage command signal vu* of the inverter 2 and a terminal voltage vu of the induction motor 1 when the current command signal iu3* calculated using the equation (65) as the current command signal iu* are assumed as vu3* and vu3, respectively. When the voltage command signal vu3* and the terminal voltage vu3 of the induction motor 1 are controlled so as to substantially coincide with each other, an amplitude B01 of a quadrature phase component corresponding to the frequency f1 of the voltage command signal vu3* based on the current command signal iu3* is expressed by the following equation using a cross-correlation function:

$$B01 = -\frac{2}{T01}\int_0^{T01} vu3^* \sin(2\pi f1 t)dt, \quad (66)$$

where T01 denotes a preset integral time. In the equation (66), the integral time T01 may be set to an integer multiple of a cycle 1/f1. Likewise, an amplitude B02 of a quadrature phase component corresponding to the frequency f2 of the voltage command signal vu3* based on the current command signal iu3* is expressed by the following equation using the cross-correlation function:

$$B02 = -\frac{2}{T02}\int_0^{T02} vu3^* \sin(2\pi f2 t)dt, \quad (67)$$

where T02 denotes a preset integral time. In the equation (67), the integral time T02 may be set to an integer multiple of a cycle 1/f2. Therefore, the reactance component X1 corresponding to the frequency f1 and the reactance component X2 corresponding to the frequency f1 are calculated by the following equations, respectively:

$$X1 = B01 \div I01 \quad (68), \text{ and}$$

$$X2 = B02 \div I02 \quad (69).$$

Referring back to the flowchart of FIG. 29, the feeding of the AC power is finished at step S305. At step S306, the secondary time constant Tr, the primary inductance L, and the secondary resistance Rr are calculated using the equations (44) to (46), respectively, based on the reactance component X1 corresponding to the frequency f1 and the reactance component X2 corresponding to the frequency f2. After executing the processing at step S306, the processing for measuring the constants of the induction motor is finished.

In the seventh preferred embodiment, similarly to the sixth preferred embodiment, the quadrature phase components of a voltage based on not the current command signal iu* but the current iu detected by the current detector 3 may be calculated, and their amplitudes values may be set as B01 and B02, respectively.

In the seventh preferred embodiment, it suffices that the feeding of the AC power is executed at least once. Therefore, as compared with the sixth preferred embodiment, the constants of the induction motor 1 can be measured in a shorter time.

As can be seen from the above, with a view of removing an influence resulting from a voltage resolution of the inverter 2 and an influence resulting from a leakage inductance of the induction motor 1, the inverter 2 feeds the superimposed AC power including at least two types of frequency components to the induction motor 1. By executing the feeding of this superimposed AC power, and by setting the frequencies f1 and f2 of the power superimposed at step S302 shown in FIG. 29 to fall within a frequency range equal to or higher than 0.006 Hz and equal to or lower than 1.5 Hz in light of the fact that a lower limit of a frequency f determined by the voltage resolution C of the inverter 2 is 0.006 Hz, the reactance components X1 and X2 corresponding to the frequencies f1 and f2, respectively, can be measured for the induction motor 1 having a rated capacity ranging at least from 1.5 kW to 55 kW with higher accuracy. As a result, the secondary time constant Tr, the primary inductance L, and the secondary resistance Rr of the induction motor 1 having the rated capacity raging at least from 1.5 kW to 55 kW can be measured with higher accuracy.

In addition, the lower limit of the frequency at which a division value B/C that is a ratio of the voltage resolution C of the inverter 2 to an amplitude B of a quadrature phase component of a voltage command signal vu* relative to the current command signal iu* is equal to or higher than 10 is 0.06 Hz The frequency $0.2/(2\pi Tr)$ of the induction motor having a rated capacity of 45 kW is also 0.06 Hz. Taking this into consideration, the frequencies f1 and f2 of the AC power superimposed at step S302 shown in FIG. 29 are set to fall within the range equal to or higher than 0.06 Hz and equal to or lower than 1.5 Hz, so that the reactance components X1 and X2 corresponding to the frequencies f1 and f2, respectively can be measured for the induction motor 1 having the rated capacity ranging at least from 1.5 kW to 45 kW with higher accuracy. As a result, the secondary time constant Tr, the primary inductance L, and the secondary resistance Rr of the induction motor 1 having the rated capacity ranging at least from 1.5 kW to 55 kW can be measured in a shorter time with higher accuracy.

Moreover, by setting the frequencies f1 and f2 of the power superimposed at step S203 to fail within the range equal to or higher than 0.06 Hz and equal to or lower than 1.2 Hz, the reactance components X1 and X2 corresponding to the frequencies f1 and f2, respectively, can be measured for the induction motor 1 employed in, at least, an elevator with higher accuracy. As a result, the secondary time constant Tr, the primary inductance L, and the secondary resistance Rr of the induction motor 1 employed in, at least, the elevator can be measured in a shorter time with higher accuracy.

Further, by superimposing the AC powers having two types of frequency components equal to or higher than 0.006 Hz and equal to or lower than 1.5 Hz and feeding the superimposed AC power at least once, the values of the current amplitudes I01 and I02 and the frequencies f1 and f2 can be set to desired values, respectively, and this leads to further improvement of the measurement accuracy.

Eighth Preferred Embodiment

In the sixth preferred embodiment, the current iu of the induction motor 1 is controlled so as to substantially coincide with the current command signal iu* based on the current command signal iu* outputted from the signal source 10, and the inverter 2 feeds the corresponding AC power to the induction motor 1 at steps S202 and S205 shown in FIG. 23. However, the present invention is not limited to this. The inverter 2 may feed the AC power to the induction motor 1 based on not the current command signal iu* but the voltage command signal vu*, and the reactance component X1 corresponding to the frequency f1 and the reactance component X2 corresponding to the frequency f2 may be calculated from a relationship between the voltage command signal vu* and the current iu detected by the current detector 3 (this embodiment will be referred to as "an eighth preferred embodiment" hereinafter).

Figure 30:
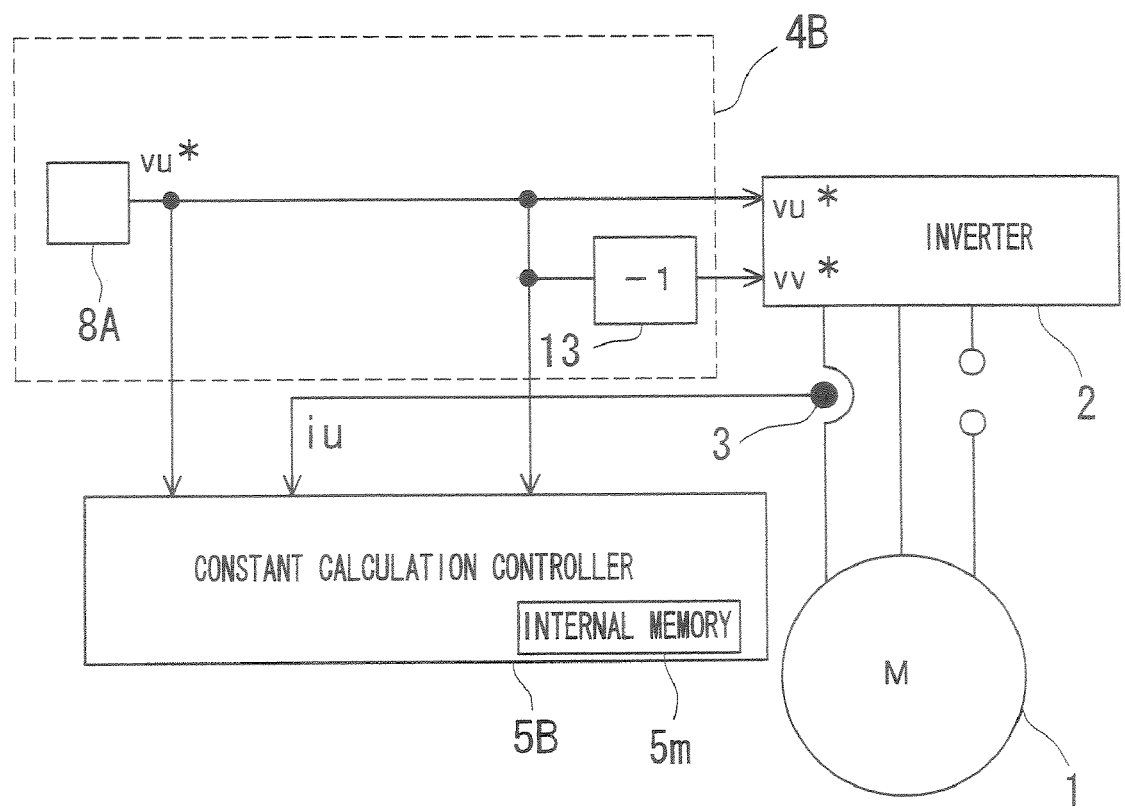
FIG. 30 is a block diagram showing a configuration of an induction motor constant measuring apparatus according to an eighth preferred embodiment of the present invention.

FIG. 30 is a block diagram showing a configuration of an induction motor constant measuring apparatus according to the eighth preferred embodiment of the present invention. In FIG. 30, an induction motor 1, an inverter 2, and a current detector 3 are the same as those of the induction motor constant measuring apparatus according to the sixth preferred embodiment shown in FIG. 20, respectively. In the present preferred embodiment, in a manner similar to that of above, an example during feeding of a single-phase AC power will be described.

An apparatus controller 4B, which is configured by, for example, a digital calculator, includes a signal source 8A and a sign inverter 13. In the apparatus controller 4B, the signal source 8A generates a voltage command signal vu* and output the generated signal to the inverter 2, a constant calculation controller 5B, and the sign inverter 13. The sign inverter 13 calculates a voltage command signal vv* after sign inversion by multiplying the inputted voltage command signal vu* by (−1), and outputs the calculated current command vv* to the inverter 2. Accordingly, the apparatus controller 4B calculates voltage command signal vu* and vv* to be applied to the induction motor 1 and outputs the calculated voltages to the inverter 2. Further, the constant calculation controller 5B, which is configured by, for example, a digital calculator, calculates and outputs constants of the induction motor 1 from the relationship between the voltage command signal vu* from the signal source 8A and the current iu detected by a current detector 3 when the single-phase AC power is fed to the induction motor 1.

Figure 31:
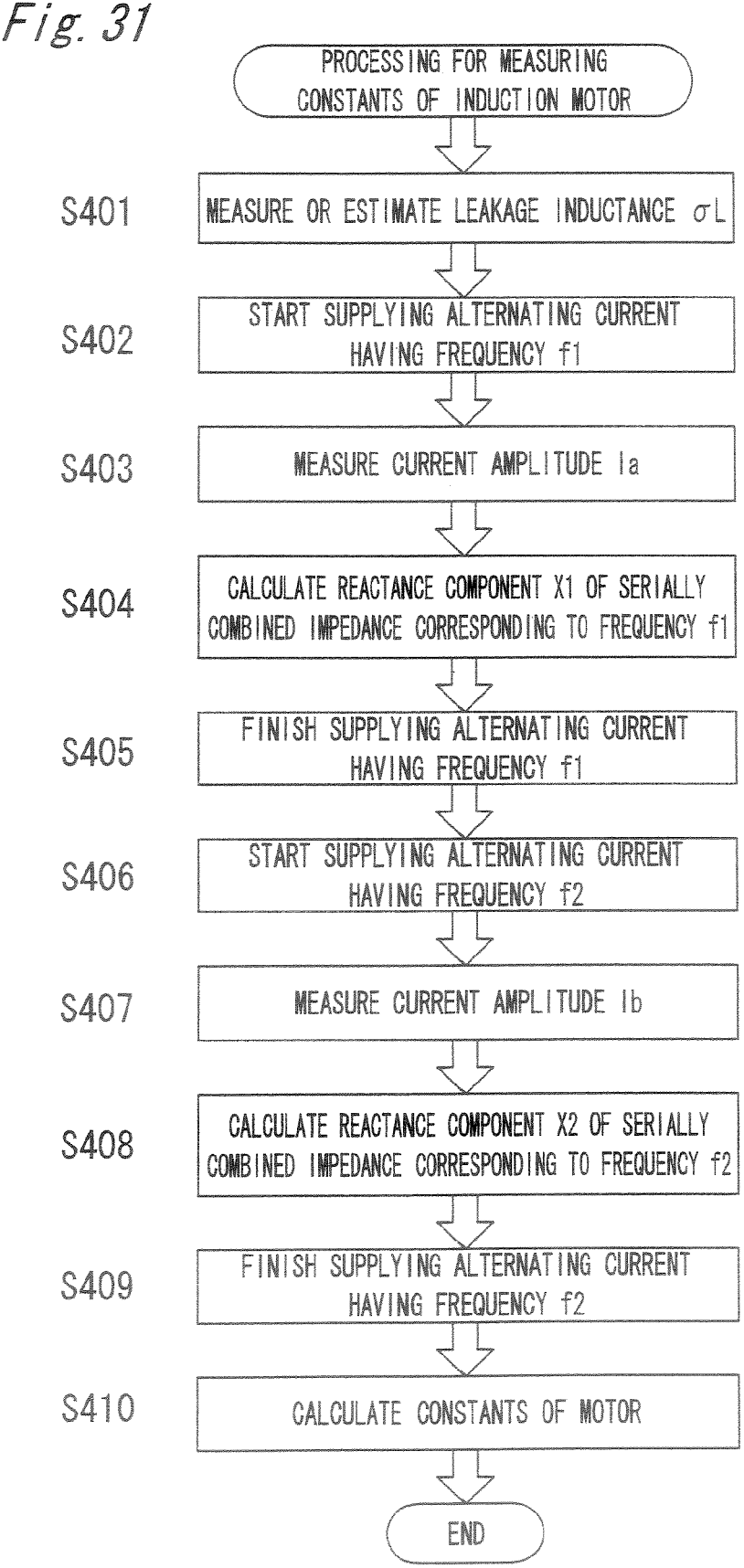
FIG. 31 is a flowchart showing a processing for measuring constants of the induction motor executed by the constant measuring apparatus shown in FIG. 30.

FIG. 31 is a flowchart showing a processing for measuring the constants of the induction motor executed by the constant measuring apparatus shown in FIG. 30. The processing for measuring the constants of the induction motor executed will be described with reference to FIG. 31.

Referring to FIG. 31, at step S401, in a manner similar to that of the step S201 shown in FIG. 23, a leakage inductance σL is measured or estimated. At step S402, feeding of an AC power having a frequency f1 is started. At this time, the signal source 8a generates and outputs, as the voltage command signal vu*, an AC signal vua* having the frequency f1, and the inverter 2 applies AC voltages vu and vv to the induction motor 1 according to the AC signal vua*. At step S403, the amplitude Ia is measured from a current iua of the induction motor 1 detected by the current detector 3 by the feeding of the AC power at step S402. At step S404, the constant calculation controller 5B calculates and measures a reactance component X1 corresponding to the frequency f1. A measurement principle for measuring the reactance component X1 at step S404 will be described.

At step S402 shown in FIG. 31, it is assumed that the AC signal vua* having an amplitude Va and the frequency f1 is applied as the voltage command signal vu*:

$$vua^* = Va \cos(2\pi f1 t) \quad (70).$$

It is assumed that the current of the induction motor 1 at this time is iua, an amplitude Ba of a quadrature phase component of the voltage command signal vua* based on the current iua is expressed by the following equation using a cross-correlation function.

$$Ba = -\frac{2}{IaTa} \int_0^{Ta} Va \sin(2\pi f1 t) iua \, dt, \quad (71)$$

where Ta denotes a preset integral time. In the equation (71), the integral time Ta may be set to an integer multiple of a cycle of the AC signal vua*. Since the amplitude Ia of the current iua can be measured at step S403 shown in FIG. 31, and the amplitude Ba of the quadrature phase component of the voltage based on the current iua can be calculated using the equation (71), the reactance component X1 corresponding to the frequency f1 can be calculated using the following equation:

$$X1 = Ba \div Ia \quad (72).$$

Referring back to the flowchart of FIG. 31, the feeding of the AC power having the frequency f1 is finished at step S405. At step S406, the feeding of a AC power having a frequency f2 is executed by the same method as that used in the processing at step S402. At this time, the signal source 8A generates, as the voltage command signal vu*, an AC signal vub* having the frequency f2, and outputs the generated signal to the inverter 2, the sign inverter 13, and the constant calculation controller 5B. In response to this, the inverter 2 applies the AC voltages vu and vv to the induction motor 1 according to the AC signal vub*. At step S407, the amplitude Ib is measured from a current iub of the induction motor 1 detected by the current detector 3 by the feeding of the AC power at step S406. Further, at step S408, the constant calculation controller 5B calculates and measures a reactance component X2 corresponding to the frequency f2 as follows. At step S406, it is assumed that the voltage command signal vub* having a amplitude Vb and the frequency f2 and expressed by the following equation is applied as the voltage command signal vu*:

$$vub^* = Vb \cos(2\pi f2 t) \quad (73).$$

It is assumed that the current of the induction motor 1 at this time is iub, an amplitude Bb of a quadrature phase component of the voltage command signal vub* based on the current iub is expressed by the following equation using a cross-correlation function:

$$Bb = -\frac{2}{IbTb} \int_0^{Tb} Vb \sin(2\pi f2 t) iub \, dt, \quad (74)$$

where Tb denotes a preset integral time. In the equation (74), the integral time Tb may be set to an integer multiple of a cycle of the AC signal vub*. Since the amplitude Ib of the current iub can be measured at step S407, and the amplitude Bb of the quadrature phase component of the voltage based on the current iub can be calculated using the equation (74), the reactance component X2 corresponding to the frequency f2 can be calculated using the following equation:

$$X2 = Bb \div Ib \qquad (75).$$

Referring back to the flowchart of FIG. 31, the feeding of the AC power having the frequency f2 is finished at step S409. At step S410, the secondary time constant Tr, the primary inductance L, and the secondary resistance Rr are calculated as expressed by the equations (44) to (46), respectively, using the reactance component X1 corresponding to the frequency f1 and the reactance component X2 corresponding to the frequency f2 measured at steps S404 and S408, respectively. After the processing at step 410 is finished, the processing for measuring the constants of the induction motor is finished.

In the eighth preferred embodiment, the deviation amplifier 12 required in the sixth preferred embodiment is unnecessary, so that the configuration of the induction motor constant measuring apparatus can be simplified. In addition, the difference of the eighth preferred embodiment from the sixth preferred embodiment is that the inverter 2 feeds the AC power to the induction motor 1 in the frequency range shown in the sixth preferred embodiment based on not the current command signal iu* but the voltage command signal vu*. The eighth preferred embodiment can, therefore, exhibit the same functions and advantages as those of the sixth preferred embodiment.

Ninth Preferred Embodiment

In the sixth to the eighth preferred embodiments, the inverter 2 opens single phase so as to feed the single-phase AC power to the induction motor 1. However, the present invention is not limited to this. It suffices that the rotation magnetic field is not generated in the induction motor 1. For example, the V-phase voltage command signal vv* and the W-phase voltage command signal vw* expressed by the equations (34) and (35), respectively, as well as the U-phase voltage command signal vu* may be calculated and applied to the inverter 2 instead of opening single phase (this embodiment will be referred to as "a ninth preferred embodiment" hereinafter).

Figure 32:
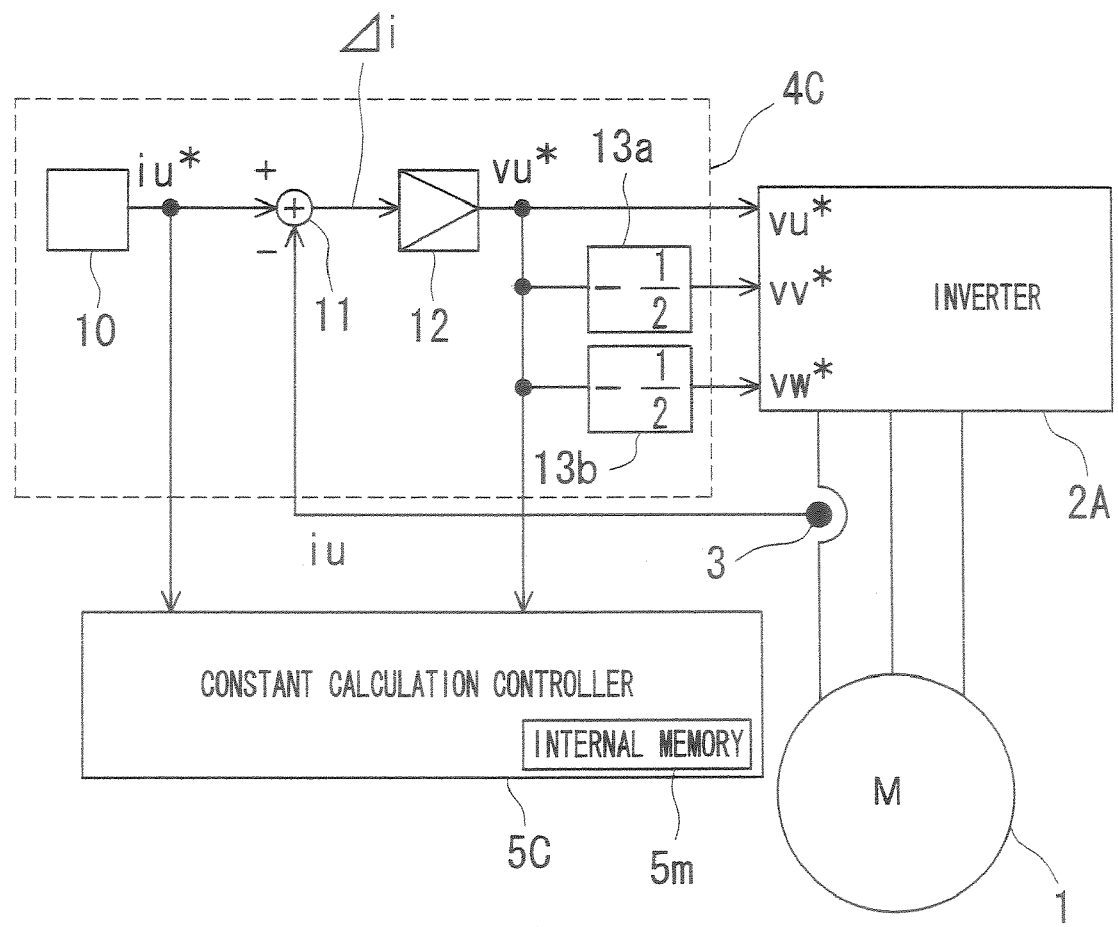
FIG. 32 is a block diagram showing a configuration of an induction motor constant measuring apparatus according to a ninth preferred embodiment of the present invention.

FIG. 32 is a block diagram showing a configuration of an induction motor constant measuring apparatus according to the ninth preferred embodiment of the present invention. The induction motor constant measuring apparatus according to the ninth preferred embodiment shown in FIG. 32 is different from the induction motor constant measuring apparatus according to the sixth preferred embodiment shown in FIG. 20 in the following respects.

(1) An apparatus controller 4C that replaces the apparatus controller 4A includes a multiplier 13a that multiplies a voltage command signal vu* by (−½), calculates a current command signal vv*, and that outputs the calculated signal to an inverter 2, and a multiplier 13b that multiplies the voltage command signal vu* by (−½), calculates a voltage command signal vw*, and that outputs the calculated signal to the inverter 2 in place of the sign inverter 13 that multiplies the voltage command signal vu* from the deviation amplifier 12 by (−1), calculates the voltage command signal vv*, and then, outputs the calculated signal to the inverter 2.

(2) The induction motor 1 and the inverter 2 are connected to each other by three phases.

According to the ninth preferred embodiment configured as mentioned above, the V-phase voltage command signal vv* and the W-phase voltage command signal vw* as expressed by the equations (34) and (35), respectively, are calculated and applied to the inverter 2. Then the inverter 2 can feed the single-phase AC power to the induction motor 1, and the constant calculation controller 5C calculates electric constants of the induction motor 1 based on the current command signal iu* and the voltage command signal vu*. As a result, a work for opening single phase of a connection connected to the induction motor 1 from the inverter 2 can be omitted.

Tenth Preferred Embodiment

In the sixth preferred embodiment, there is no setting guideline regarding the amplitudes I1 and I2 of the current command signal iu* set at steps S202 and S205 shown in FIG. 23. The value of the primary inductance L of the induction motor 1 is changed to depend on the current amplitude, and the induction motor 1 is preferably vector-controlled using a value of the primary inductance L at an amplitude of a rated exciting current (no-load current). Therefore, the amplitude of the rated exciting current (no-load current) may be set as set values of the amplitudes I1 and I2. For example, an approximate value I0 of the amplitude of the rated exciting current may be calculated using the following equation from a face plate of the induction motor 1, and an approximate value I0 of the amplitude of the calculated rated exciting current may be set as the set values of the amplitudes I1 and I2 (this embodiment will be referred to as "a tenth preferred embodiment" hereinafter):

$$I0 = (H1 + H2 \times P100) \sqrt{H3 \times I100^2 + \left(\frac{H4 \times F100 \times P100}{N100 \times V100 \times Pm}\right)^2}, \qquad (76)$$

where P100 denotes a rated capacity of an induction motor 1, I100 denotes a rated current thereof, V100 denotes a rated voltage thereof, F100 denotes a rated frequency thereof, N100 denotes the rated number of rotations, and Pm denote the number of pole pairs thereof. These values are described in the face plate of the induction motor 1. In addition, in the equation (76), H1, H2, H3, and H4 are preset constants, which are values as obtained empirically from the face plates of various induction motors 1.

According to the tenth preferred embodiment configured as mentioned above, by setting amplitudes I1 and I2 of the current command signal iu* to values corresponding to the rated exciting current, the primary inductance L at the amplitude of the rated exciting current optimum when the induction motor 1 is vector-controlled can be advantageously measured. In addition, by calculating the amplitudes I1 and I2 of the current command signal iu* using the equation (76), there can be an advantageous effect that the amplitude of the rated exciting current can be estimated.

Eleventh Preferred Embodiment

In the tenth preferred embodiment, the amplitudes I1 and I2 of the current command signal iu* set at steps S202 and S205 shown in FIG. 23, respectively, are set as the values of the amplitudes of the rated exciting current. In this case, when the current command signal iu* is set to an exciting circuit corresponding to the mutual inductance M shown in FIG. 21 so that the rated exciting current flows, the accuracy for calculating the primary inductance can be further improved. However, when the current iu of the induction motor 1 is divided to the exciting circuit and a secondary circuit and the amplitudes I1 and I2 of the current command signal iu* are set to the same rated exciting current I0, an amplitude of the current flowing in the exciting circuit is lower than I0. Further, an impedance of the exciting circuit is changed to depend on the frequency f. Due to this, when the amplitudes I1 and I2 of the current command signal iu* are made constant irrespectively of the frequencies f1 and f2 set at steps S202 and S205 shown in FIG. 23, respectively, the amplitude of the current flowing in the exciting circuit at step S202 shown in FIG. 23 is different from that at step S205 shown in FIG. 23. Taking this into consideration, an amplitude I of the current command signal iu* set at steps S202 and S205 may be given by a current I00 expressed by the following equation, and the amplitude I may be changed to depend on the frequency f (this embodiment will be referred to as "an eleventh preferred embodiment" hereinafter):

$$I00 = \sqrt{1+4\pi^2 f^2 Tr^2} I0 \qquad (77).$$

The reason for giving the amplitude I of the current command signal iu* by I00 in the equation (77) will be described below. In the T type equivalent circuit of the induction motor 1 in the stopped state shown in FIG. 21 when the leakage inductance 1 is ignored, the amplitude of the current iu of the induction motor 1 is assumed as I0, and the frequency thereof is assumed as f, the amplitude Im of the current flowing in the exciting circuit is approximated as shown in the following equation:

$$Im \cong I0 \frac{Rr}{\sqrt{Rr^2 + 4\pi^2 f^2 M^2}} \qquad (78)$$

$$\cong I0 \frac{Rr}{\sqrt{Rr^2 + 4\pi^2 f^2 L^2}}$$

$$= I0 \frac{1}{\sqrt{1+4\pi^2 f^2 Tr^2}}.$$

Accordingly, when the amplitude I of the current command signal iu* is given by the equation (77), the amplitude of the current flowing in the exciting circuit becomes I0. It is noted, however, that a value of the secondary time constant Tr is necessary so as to set the amplitude I of the current command signal iu* in the equation (77). However, an induction motor constant measuring apparatus according to the present preferred embodiment is intended to obtain the secondary time constant Tr. Due to this, the value of the secondary time constant Tr is unknown at the time of the step S202 shown in FIG. 23 in which step the first supply of the AC power is executed. Taking this into consideration, an approximate value of the secondary time constant Tr is obtained using a design value or an approximate value. Using the obtained approximate value of the secondary time constant Tr, the frequencies f1 and f2 may be set. Therefore, by determining the amplitude I of the current command signal iu* using the equation (77), measurement accuracy for measuring the primary inductance L at the amplitude of the rated exciting current can be further improved.

Twelfth Preferred Embodiment

In the sixth preferred embodiment, the signal source 10 outputs the current command signals (AC signals) iu* at steps S202 and S205 shown in FIG. 23, respectively The signal source 10 outputs the current command iu* having the frequency f1 at step S202, and outputs the current command signal iu* having the frequency f2 and an average value 0A at step S205. However, the present invention is not limited to this. The current command signals iu1* and iu2* as obtained by each adding up a DC component and an AC component and respectively expressed by the following equations may be outputted. This leads to that the DC component is removed in the calculation in each of the equations (50) and (53). Therefore, the signal source 10 may output the signals as obtained by adding the DC component and the AC component and expressed by the following equations in place of the equations (49) and (52) (this embodiment will be referred to as "a twelfth preferred embodiment" hereinafter):

$$iu1^* = I001\{Kdc1 + \cos(2\pi f1 t)\} \qquad (79), \text{ and}$$

$$iu2^* = I002\{Kdc2 + \cos(2\pi f2 t)\} \qquad (80),$$

where I001 and I002 denote amplitudes of a AC current component, and Kdc1 and Kdc2 denote arbitrary DC components. If the DC components Kdc1 and Kdc2 are set to be equal to or larger than 1 or equal to or smaller than −1, the signs of the current command signals iu1* and iu2* are always equal to each other irrespectively of a time t. In addition, the currents I001 and I002 may be set to either the same value as or different values from each other based on the method shown in the eleventh preferred embodiment.

As mentioned above, according to the present preferred embodiment, the signs of the current command signals iu1* and iu2* are set to be always equal to each other irrespectively of the time t, and a signal source 10 outputs the current command signals iu1* and iu2* calculated using the equations (79) and (80), so that there can be obtained a advantageous effect that any influence of a voltage error resulting from a dead time voltage can be advantageously avoided.

Thirteenth Preferred Embodiment

In the sixth preferred embodiment, the signal source 10 outputs the current command signals iu* at steps S202 and S205 shown in FIG. 23, respectively. The signal source 10 outputs the sinusoidal wave AC signal having the frequency f1 and the sinusoidal wave AC signal having the frequency f2 at steps S202 and S205, respectively. However, the present invention is not limited to this. Even if not the sinusoidal wave AC signals but rectangular wave AC signals are outputted, the primary inductance L, the secondary resistance Rr, and the secondary time constant Tr can be measured by the same method as that according to the sixth preferred embodiment as long as amplitudes and phases of the outputted rectangular wave fundamental AC signals can be specified. Accordingly, the current command signals iu* may be rectangular wave signals instead of the sinusoidal wave signals (this embodiment will be referred to as "a thirteenth preferred embodiment" hereinafter) The reason is as follows. A rectangular wave is a signal wave as obtained by superimposing a fundamental wave component and a sinusoidal wave having a frequency of an integral multiple of that of the fundamental wave component. If a sinusoidal wave signal serving as a reference signal is obtained, a higher harmonic component other than the fundamental wave component can be removed in the calculation in each of the equations (50) and (53).

A measurement principle for measuring a reactance component X corresponding to a frequency f at which a current command signal iu* is a rectangular wave signal will be described hereinafter.

A signal source 10 shown in FIG. 20 outputs, as the current command signal iu* a rectangular wave signal iusq* having an amplitude Isq and a cycle 1/f and expressed by an equation

(81) to a subtracter 11 and a constant calculation controller 5A. A loop control circuit configured by an inverter 2, a current detector 3, and an apparatus controller 4A shown in FIG. 20 controls a current iusq of an induction motor 1 so as to substantially coincide with the current command signal iusq*. It is noted that the equation (81) represents the rectangular wave signal iusq* for one cycle, and the rectangular wave signal iusq* for the second cycle and the following is calculated by repeatedly using the equation (81):

$$iusq^* = Isq\left(0 < t < \frac{1}{4f}, \frac{3}{4f} < t < \frac{1}{f}\right) \quad (81)$$
$$= -Isq\left(\frac{1}{4f} < t < \frac{3}{4f}\right),$$

where a fundamental wave component iubase* of the current command signal iusq* is given by the following equation:

$$iubase^* = \frac{4}{\pi} Isq \cos(2\pi ft). \quad (82)$$

In this case, it is assumed that a voltage command signal vu* to the inverter 2 and a terminal voltage vu of the induction motor 1 are vusq* and vusq, respectively. Assuming that the voltage command signal vusq* and the terminal voltage vusq of the induction motor 1 are controlled so as to substantially coincide with each other, an amplitude Bsq of a quadrature phase component regarding the frequency f of the voltage command signal vusq* based on the fundamental wave component iubase* of the current command signal iusq* is expressed by the following equation using a cross-correlation function:

$$Bsq = -\frac{2}{Tsq} \int_0^{T1} vusq^*(2\pi ft) dt, \quad (83)$$

where Tsq denotes a preset integral time. In the equation (83), the integral time Tsq may be set to an integer multiple of the cycle 1/f. In addition, in the equation (83), the higher harmonic component other than the frequency f component of the voltage command signal vusq* is removed. A reactance component X corresponding to the frequency f can be, therefore, calculated using the following equation:

$$X = \frac{\pi}{4} \frac{Bsq}{Isq}. \quad (84)$$

Figure 33:
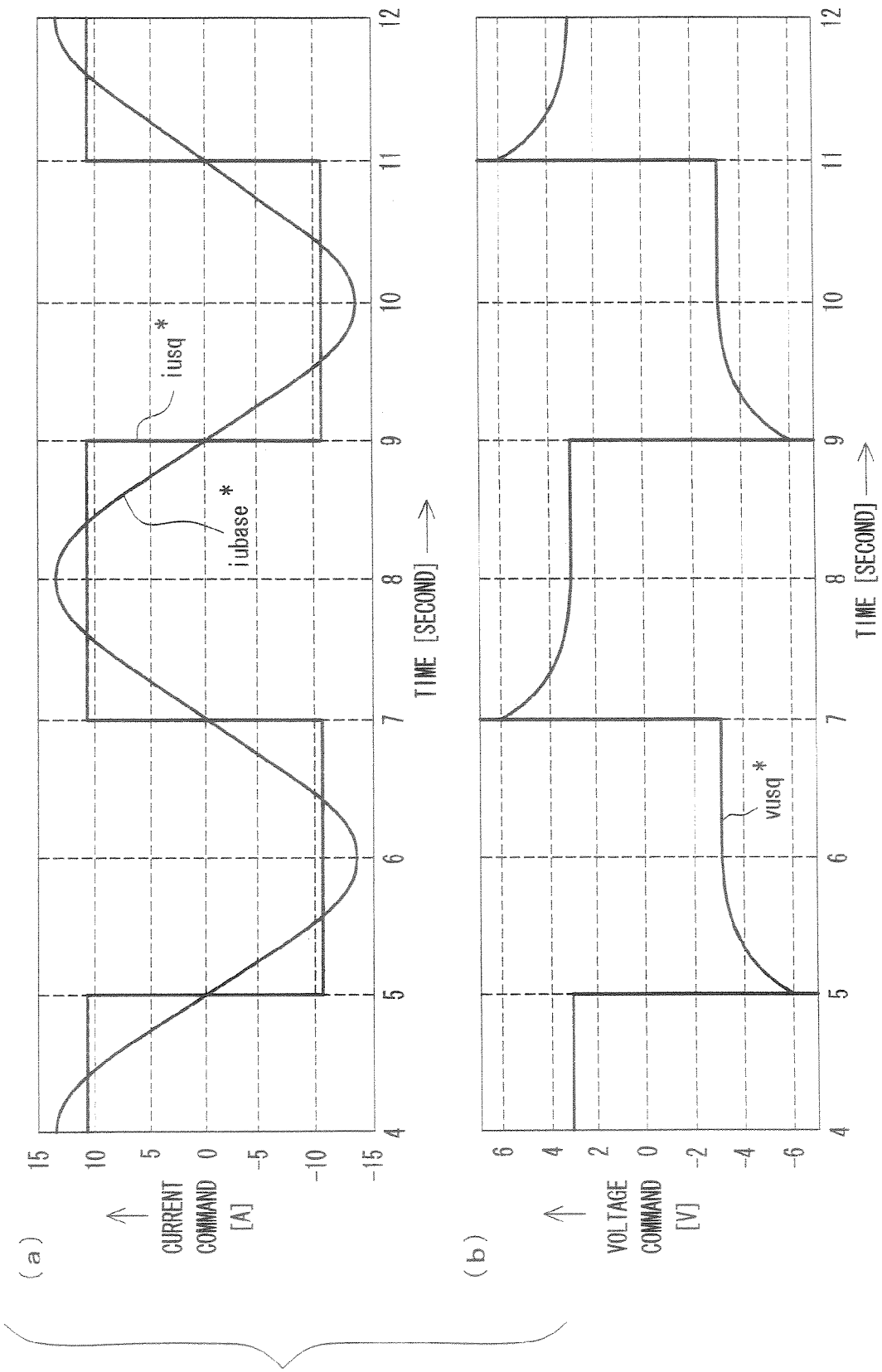
FIG. 33 shows command signals used in an induction motor constant measuring apparatus according to a thirteenth preferred embodiment of the present invention, where

FIG. 33 shows command signals used in an induction motor constant measuring apparatus according to the thirteenth preferred embodiment of the present invention, where FIG. 33(*a*) is a waveform chart showing the current command signal iusq* and its fundamental wave component iubase* when the current command signal iu* is a rectangular wave, and FIG. 33(*b*) is a waveform chart showing the voltage command signal vusq* at that time. As mentioned above, even if the current command signal iu* is not the sinusoidal wave signal but the rectangular wave signal, the reactance component X corresponding to the frequency f can be calculated. Therefore, by measuring the reactance components X for at least two types of frequencies, respectively, the primary inductance L, the secondary resistance Rr, and the secondary time constant Tr can be measured. Even when the current command signal iu* is the rectangular wave signal, the same advantageous effects as those when the current command signal iu* is the sinusoidal wave signal can be attained since the rectangular wave signal is a signal as obtained by superimposing the fundamental wave component and the sinusoidal wave having the frequency of the integer multiple of that of the fundamental wave component.

Fourteenth Preferred Embodiment

In the respective preferred embodiments mentioned above, positive or negative signs of the voltage errors resulting from the dead time voltage within the inverter 2 and from the ON voltage of the switching element are inverted at a timing at which a positive or negative sign of the current is inverted, and an error occurs between the voltage command signal vu* near a current zero cross and the terminal voltage vu of the induction motor 1, accordingly. Taking these situations into consideration, a method for calculating the amplitude B of the quadrature phase component of the voltage command signal vu* based on the current command signal iu* by removing an interval near the current zero cross from a set integral interval when calculating the amplitude B (e.g., when calculating the amplitude B using the equation (50) at step S203 shown in FIG. 23) may be used (this embodiment will be referred to as "a fourteenth preferred embodiment" hereinafter). The method according to the present preferred embodiment will be next described.

It is assumed as follows. A signal source 10 shown in FIG. 20 outputs, as a current command signal iu*, an AC current signal iuc* having an amplitude Ic and a frequency f and expressed by the following equation to a subtracter 11 and a constant calculation controller A. A loop control circuit configured by an inverter 2, a current detector 3, and an apparatus controller 4A controls a current iuc of an induction motor 1 so as to substantially coincide with the current command signal iuc*:

$$iuc^* = Ic \cos(2\pi ft) \quad (85).$$

In this case, a voltage command signal vu* of the inverter 2 and a terminal voltage vu of the induction motor 1 are assumed as vuc* and vus, respectively. It is assumed that the voltage command signal vuc* and the terminal voltage vuc of the induction motor 1 are controlled so as to substantially coincide with each other. It is noted, however, that when an amplitude Bc of a quadrature phase component of the voltage command signal vus* based on the AC signal iuc* is calculated using a cross-correlation function, an interval near a current zero cross where the amplitude of the current command signal iuc* becomes equal to or lower than ±K % of the amplitude Ic is removed from an integral range. That is, the calculation expressed by the following equation is carried out:

$$Bc = -\frac{2}{Tc - Tc0} \int_0^{Tc} vuc^* Kc \sin(2\pi ft) dt, \quad (86)$$

where a coefficient Kc is expressed by the following equation:

$$Kc = \begin{cases} 0 & \left(|\cos(2\pi ft)| < \dfrac{K}{100}\right) \\ 1 & \left(\dfrac{K}{100} \le |\cos(2\pi ft)| \le 1\right) \end{cases}, \quad (87)$$

where Tc denotes a preset integral time and includes an integral range Tc0 to be removed. In addition, Tc0 denotes an integral range (a time interval for which |cos(2πft)|<K<100 is satisfied) to be removed from the integral time Tc. In the equation (86), the integral time Tc may be set to an integer multiple of a cycle of the AC signal iuc*. A ratio of the removed integral range Tc0 to the whole integral time interval Tc is calculated. If K=5%, the ratio is 3.2%, and if K=10%, the ratio is 6.4%.

Alternatively, a correction coefficient Jc may be set in advance, and the amplitude Bc may be calculated using the following equation in place of the equation (86):

$$Bc = -\dfrac{2Jc}{Tc}\int_0^{Tc} vuc^* Kc \sin(2\pi ft)dt. \quad (88)$$

Accordingly, the a reactance component X corresponding to the frequency f can be calculated as expressed by the following equation by using the amplitude Bc calculated by the equation (86) or (88):

$$X = Bc + Ic \quad (89).$$

Figure 34:
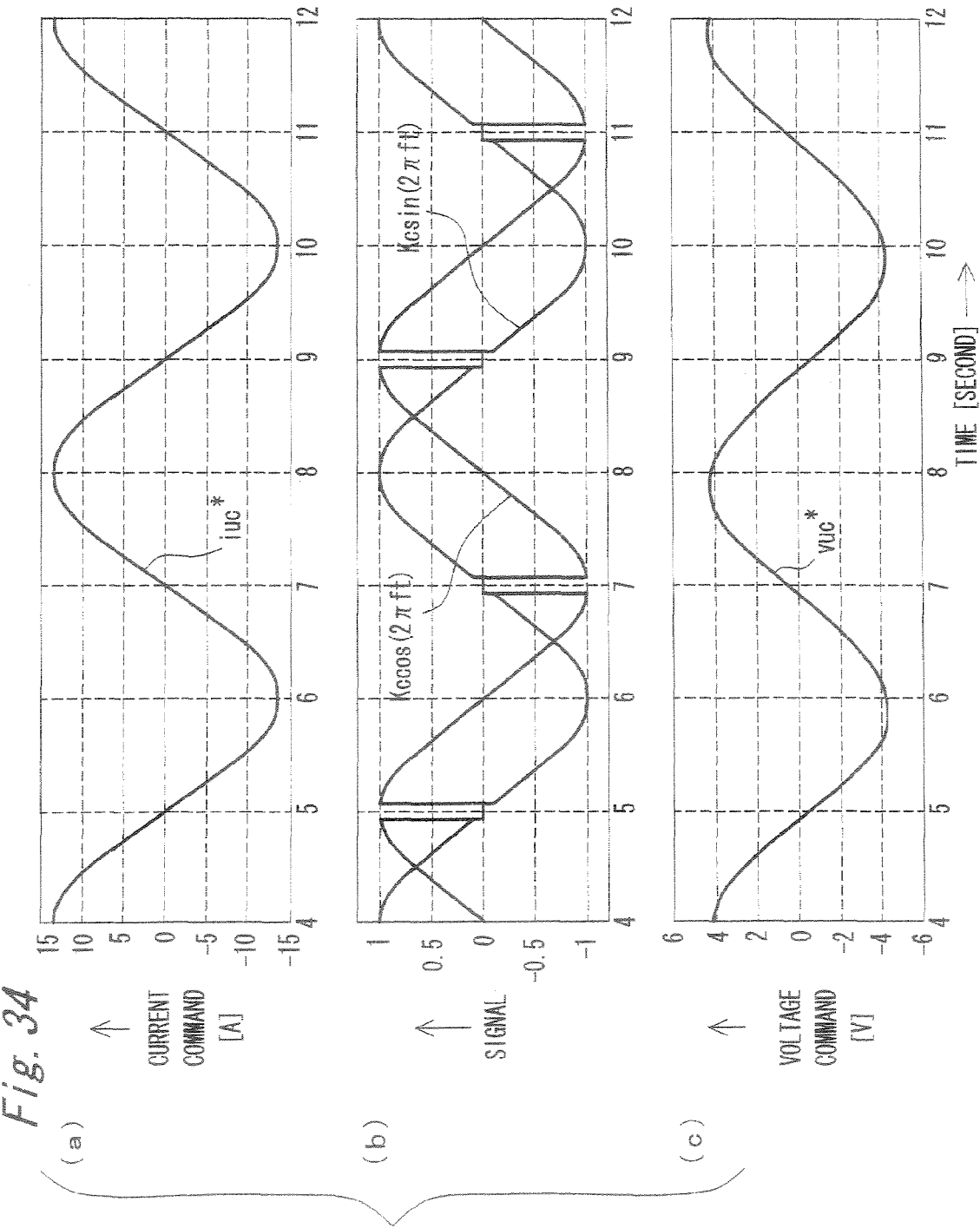
FIG. 34 shows command signals and signals used in an induction motor constant measuring apparatus according to a fourteenth preferred embodiment of the present invention, where

FIG. 34 shows command signals and signals used in the induction motor constant measuring apparatus according to the fourteenth preferred embodiment of the present invention, where FIG. 34(a) is a waveform chart showing the current command signal iuc*, FIG. 34(b) is a waveform chart that depict signals Kc·cos(2πft) and Kc·sin(2πft), and FIG. 34(c) is a waveform chart showing the voltage command signal vuc*. In the present preferred embodiment, by calculating the reactance components X corresponding to at least two types of frequencies, respectively, the primary inductance L, the secondary resistance Rr, and the secondary time constant Tr can be calculated. By removing the interval near the current zero cross from the integral time interval when calculating the amplitude B of the quadrature phase component of the voltage command signal vu* based on the current command signal iu*, it is possible to remove an adverse influence of the inversion of the positive or negative signs of the voltage errors resulting from the dead time voltage within the inverter 2 and from the ON voltage of the switching element, and then to calculate the primary inductance L, the secondary resistance Rr, and the secondary time constant Tr with higher accuracy.

Fifteenth Preferred Embodiment

In the sixth preferred embodiment, the current command signal iu* is given as the sinusoidal wave AC signal In the thirteenth preferred embodiment, the current command signal iu* is given as the rectangular wave AC signal. However, the present invention is not limited to these. As long as currents and voltages corresponding to at least two types of frequencies f1 and f2 for the current command signal iu* or the current of the induction motor 1 and the voltage command signal vu* can be calculated, and amplitudes and phases of the currents and voltages can be calculated, an in,put signal given as the current command signal iu* or the voltage command signal vu* may be a modulation wave such as an AM (amplitude modulated) wave or an FM (frequency modulated) wave at least one of the frequency and the amplitude of which is regularly changed to correspond to the time (this embodiment will be referred to as "a fifteenth preferred embodiment" hereinafter).

Figure 35:
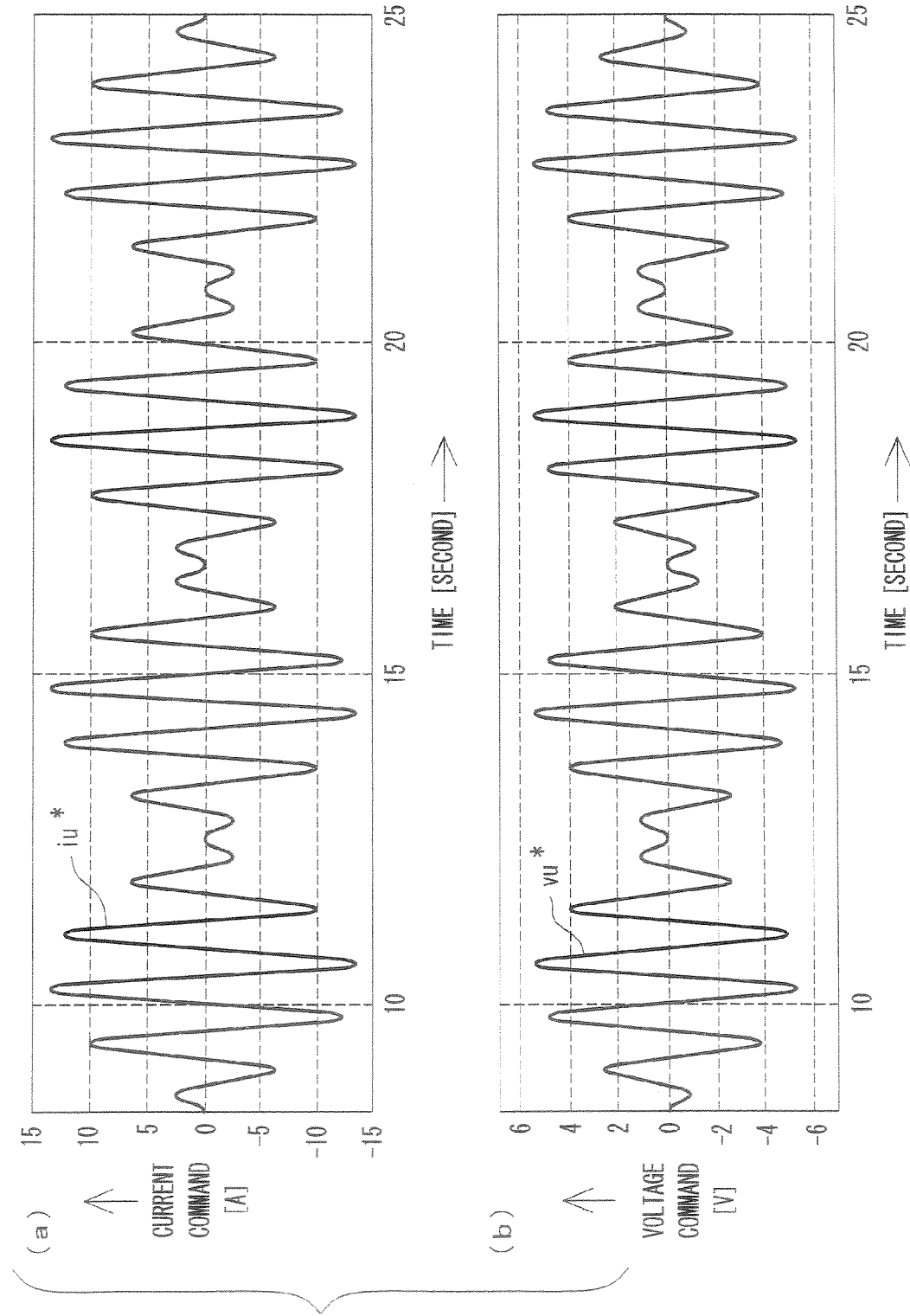
FIG. 35 shows command signals used in an induction motor constant measuring apparatus according to a fifteenth preferred embodiment of the present invention, where
Figure 36:
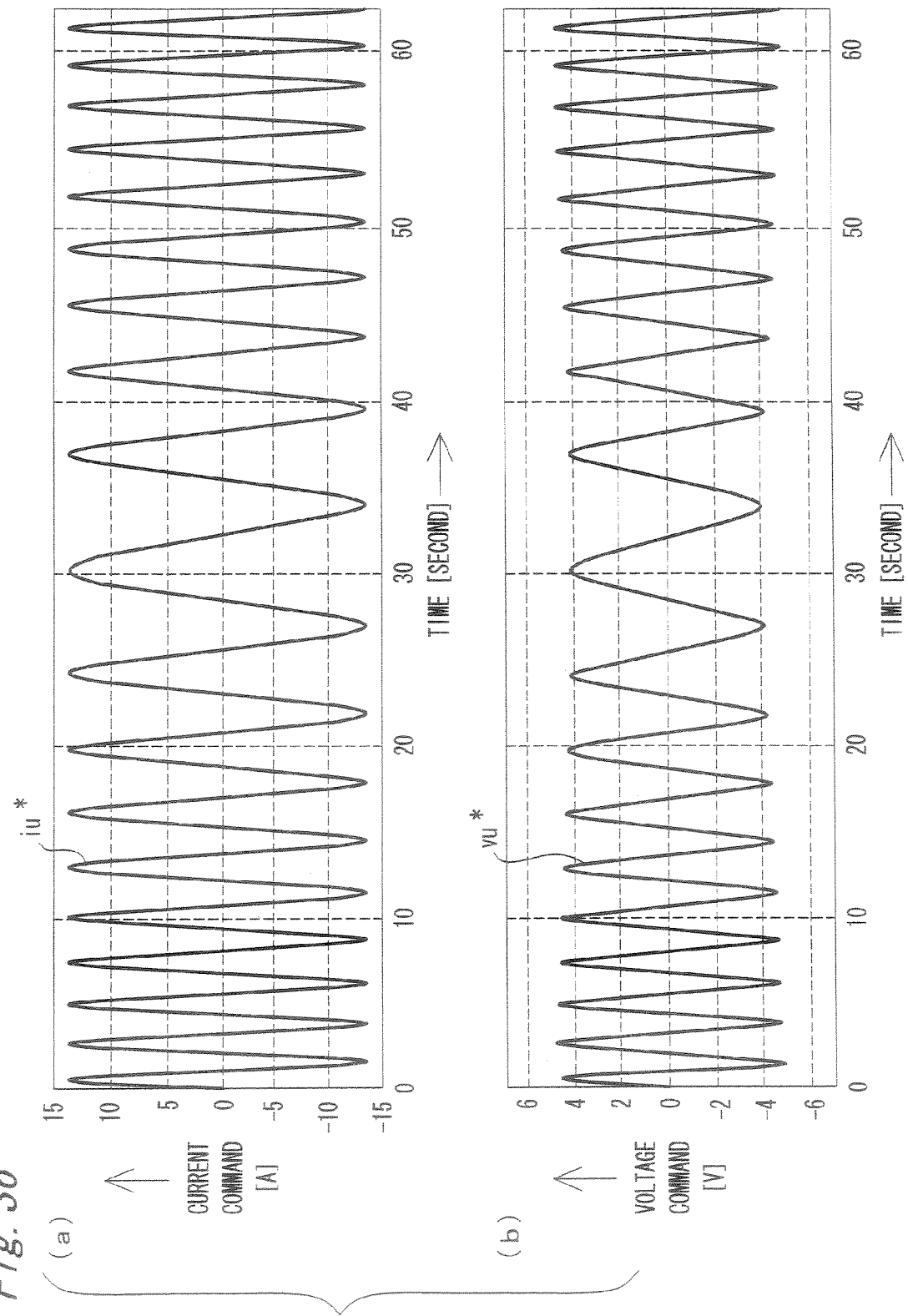
FIG. 36 shows command signals used in the induction motor constant measuring apparatus according to the fifteenth preferred embodiment of the present invention, where

FIG. 35 shows command signals used in an induction motor constant measuring apparatus according to the fifteenth preferred embodiment of the present invention, where FIG. 35(a) is a waveform chart of a current command signal iu* having a modulated amplitude, and FIG. 35(b) is a waveform chart of a voltage command signal vu* having a modulated amplitude. FIG. 36 shows command signals used in the induction motor constant measuring apparatus according to the fifteenth preferred embodiment of the present invention, where FIG. 36(a) is a waveform chart of the current command signal iu* having a modulated frequency, and FIG. 36(b) is a waveform chart of the voltage command signal vu* having a modulated frequency. A method according to the present preferred embodiment will be described below.

It is assumed that a signal source 10 shown in FIG. 20 outputs, as the current command signal iu*, a signal iud* having an arbitrary waveform, and that a current iud of an induction motor 1 is controlled so as to substantially coincide with the current command signal iud*. In this case, the voltage command signal vu* of an inverter 2 and a terminal voltage vu of the induction motor 1 are assumed as vud* and vud, respectively. It is assumed that the voltage command signal vud* and the terminal voltage vud of the induction motor 1 are controlled so as to substantially coincide with each other. In the present preferred embodiment, similarly to the eighth preferred embodiment, a method for causing the inverter 2 to feed the AC power to the induction motor 1 based on the voltage command signal vu* may be used.

In the present preferred embodiment, an amplitude Ifd of a frequency fd component of the current command signal iud* relative to a phase A of a sinusoidal wave having an amplitude 1 is expressed by the following equation. In the following equation, the current iud of the induction motor 1 may be used in place of the current command signal iud*:

$$Ifd = -\dfrac{2}{Tfd}\int_0^{Tfd} iud^* \cos(2\pi fdt + \Delta)dt, \quad (90)$$

where Tfd denotes a preset integral time and Δ denotes a preset phase. In this case, an amplitude Vfd of a frequency fd component of the voltage command signal vud* relative to a quadrature phase of the phase Δ of the sinusoidal wave having the amplitude 1 is expressed by the following equation:

$$Vfd = -\dfrac{2}{Tfd}\int_0^{Tfd} vud^* \sin(2\pi fdt + \Delta)dt, \quad (91)$$

where Δ is set to have the same value as that in the equation (90). Therefore, a reactance component X corresponding to a frequency fd is calculated as expressed by the following equation:

$$X = Vfd + Ifd \quad (92).$$

As mentioned above, according to the present preferred embodiment, by calculating the reactance components X corresponding to at least two types of frequencies in a frequency range equal to or higher than 0.006 Hz and equal to or lower than 1.5 Hz, respectively, the primary inductance L, the secondary resistance Rr, and the secondary time constant Tr can be calculated. Therefore, the present preferred embodiment has such an advantageous effect that the degree of freedom of the input signal given as the current command signal iu* or the voltage command signal vu* can be improved.

Sixteenth Preferred Embodiment

In the preferred embodiments mentioned above, the apparatus for measuring the constants of the induction motor 1 has been described. However, the present invention is not limited to this. The present invention can be applied to a synchronous motor (this embodiment will be referred to as "a sixteenth preferred embodiment" hereinafter).

Figure 37:
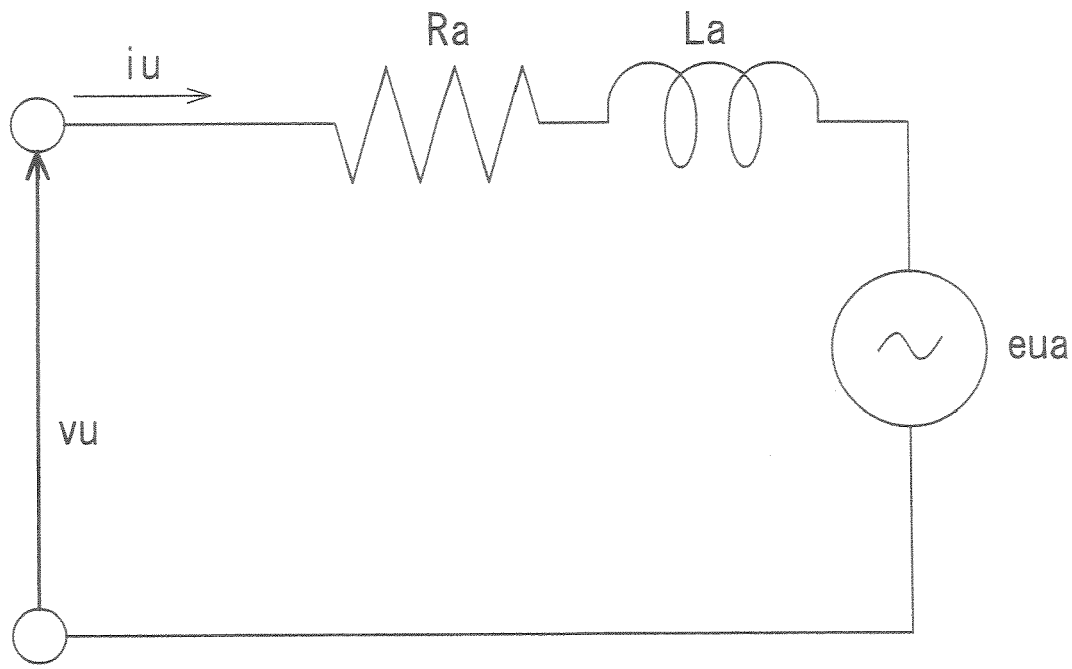
FIG. 37 is a circuit diagram of an equivalent circuit of single phase (U-phase) of a synchronous motor for showing a measurement principle of a synchronous motor constant measuring apparatus according to a sixteenth preferred embodiment of the present invention.
Figure 38:
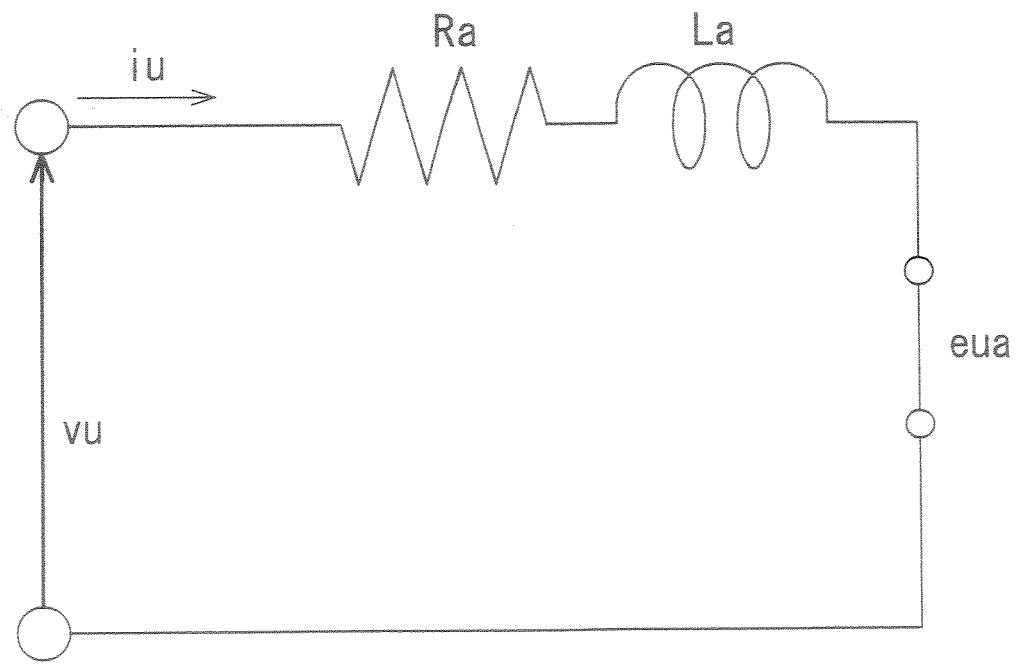
FIG. 38 is a circuit diagram of an equivalent circuit of the equivalent circuit shown in FIG. 37 when the synchronous motor is stopped.

FIG. 37 is a circuit diagram of an equivalent circuit of single phase (U-phase) of a synchronous motor for showing a measurement principle of a synchronous motor constant measuring apparatus according to the sixteenth preferred embodiment of the present invention. FIG. 38 is a circuit diagram of an equivalent circuit of the equivalent circuit shown in FIG. 37 when the synchronous motor is stopped.

Referring to FIG. 37, the equivalent circuit of single phase (U-phase) of the synchronous motor is represented as a serial circuit configured by an armature resistance Ra, an armature inductance La, a voltage source of a U-phase induced voltage esu. The U-phase induced voltage esu is proportional to a rotational angle speed of the synchronous motor. Therefore, when the synchronous motor is stopped, the U-phase induced voltage is zero and the voltage source of the U-phase induced voltage esu is short-circuited. FIG. 38 shows the equivalent circuit of the synchronous motor in a stopped state, where the voltage source of the U-phase induced voltage esu is short-circuited. FIG. 38 is compared with FIG. 3 according to the sixth preferred embodiment. The equivalent circuit of FIG. 38 is configured such that the resistance R in the equivalent circuit of FIG. 3 is replaced by the armature resistance Ra and the inductance L in the equivalent circuit of FIG. 3 is replaced by the armature inductance La. Therefore, it is possible to measure the constants of the synchronous motor using the constant measuring apparatus according to each of the preceding preferred embodiments.

Seventeenth Preferred Embodiment

In the preferred embodiments mentioned above, the constant calculation controllers 5, 5A, and 5B use as voltage information, the voltage command signals from the apparatus controllers 4, 4A, and 4B, respectively The present invention is not limited to this. A voltage detector that measures the terminal voltage of the induction motor 1 may be provided, and an output signal from the voltage detector may be used in place of the voltage command signal from the apparatus controller 4, 4A or 4B, as the voltage information (this embodiment will be referred to as "a seventeenth preferred embodiment" hereinafter). The seventeenth preferred embodiment can exhibit the same functions and advantageous effects as those as mentioned above.

Eighteenth Preferred Embodiment

In the preferred embodiments mentioned above, the inverter 2 feeds the single-phase AC power having the frequency equal to or higher than 0.2 Hz and equal to or lower than 1.5 Hz at least once, and this leads to that the primary inductance (or mutual inductance) and the secondary resistance can be measured with higher accuracy. In each of the preceding preferred embodiments, the rated exciting current is necessary. However, if the rated values described on the face plate of the induction motor 1 include errors, the method for calculating the rated exciting current based on the face plate values according to the tenth preferred embodiment causes errors in measured values. According to the present preferred embodiment, a single-phase AC power having a frequency equal to or higher than 0.2 Hz and equal to or lower than 1.5 Hz is fed at least at two current amplitudes, and this leads to accurate measurement of a rated exciting current and a mutual inductance.

Figure 39:
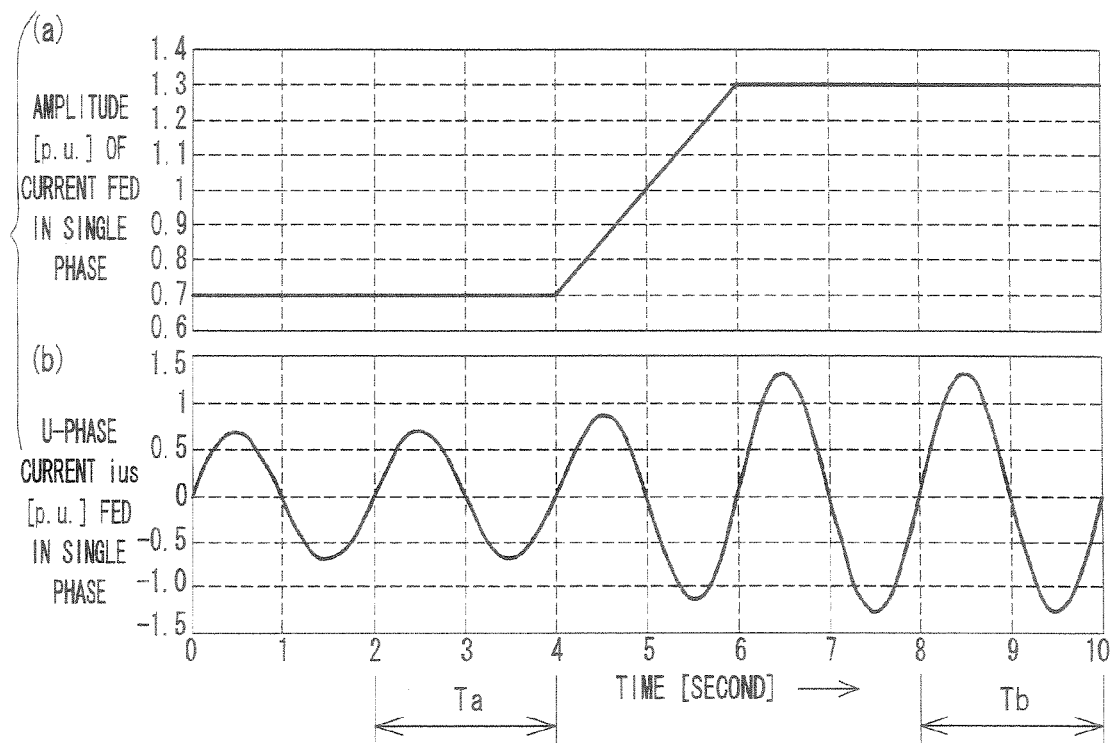
FIG. 39 shows states of feeding a single-phase AC power in an induction motor constant measuring apparatus according to an eighteenth preferred embodiment of the present invention, where

FIG. 39 shows states of feeding a single-phase AC power in an induction motor constant measuring apparatus according to an eighteenth preferred embodiment of the present invention, where FIG. 39(a) is a waveform chart showing an amplitude of a current fed in single phase, and FIG. 39(b) is a waveform chart showing a U-phase current ius of an induction motor 1 fed in single phase. It is noted that the amplitude of the current fed in single phase shown in FIG. 39(a) is normalized by the rated exciting current based on face plate values. Referring to FIG. 39, for an interval Ta, a primary inductance (or mutual inductance) and a secondary resistance when a single-phase AC power is fed when applying a current amplitude command at 0.7 [p.u.] that is a first amplitude are measured by the method according to each of the preceding preferred embodiments. Next, for an interval Tb, the primary inductance (or mutual inductance) and the secondary resistance when the single-phase AC power is fed when applying the current amplitude command signal at 1.3 [p.u.] that is a second amplitude are measured by the method according to each of the preceding preferred embodiments.

Figure 40:
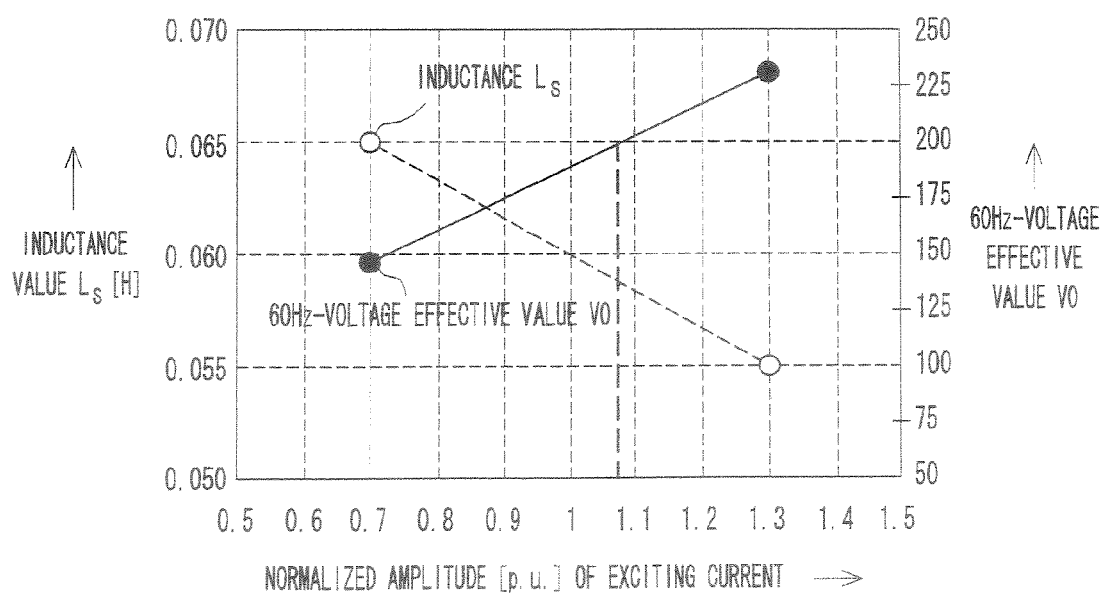
FIG. 40 is a graph showing characteristics of an inductance Ls and a 60-Hz voltage effective value measured by the induction motor constant measuring apparatus according to the eighteenth preferred embodiment of the present invention relative to a normalized amplitude of an exciting current.

FIG. 40 is a graph showing characteristics of an inductance Ls and a 60-Hz voltage effective value measured by the induction motor constant measuring apparatus according to the eighteenth preferred embodiment of the present invention relative to a normalized amplitude of an exciting current As apparent from FIG. 40, an inductance value is reduced by a magnetic saturation as the current amplitude is higher. On the other hand, the no-load voltage V0 [V] when the motor is calculated at a rated frequency F100 [Hz] is expressed by the following equation using the primary inductance Ls and a current amplitude I*:

$$V0 = 2\pi \times F100 \times Ls \times I* \qquad (93).$$

When a relationship between the current amplitude and the primary inductance (or mutual inductance) measured as shown in FIG. 39 is substituted into Ls and I* in the equation (93), two no-load voltages V0 are obtained. In FIG. 40, no-load voltage effective value V0 at the rated frequency F100=60 Hz is plotted as indicated by mark ●. For example, when the rated voltage of the induction motor 1 is 200 V, the rated exciting current is 1.07 [p.u.] and the inductance at this time is 0.065 [H] as seen from the relationship of FIG. 40. The measurement of the inductance based on the relationship of FIG. 40 corresponds to calculation of a rated exciting current amplitude I100 and an inductance value Ls0 using the following equation:

$$I100 = (I1 \times V100 - I2 \times V100 + I2 \times V1 - I1 \times V2) \div (V1 - V2) \qquad (94), \text{ and}$$

$$Ls0 = (I100 \times L1 - I2 \times L1 - I100 \times L2 + I1 \times L2) \div (I1 - I2) \qquad (95),$$

where Ls1 denotes a first inductance relative to a first current amplitude I1, and Ls2 denotes a second inductance relative to a second current amplitude I2. In addition, V100 denotes the rated voltage of the induction motor 1, and voltages V1 and V2 corresponding to the current amplitudes I1 and I2 are expressed by the following equations.

$$V1=2\pi \times F100 \times Ls1 \times I1 \qquad (96), \text{and}$$

$$V2=2\pi \times F100 \times Ls2 \times I2 \qquad (97).$$

In addition, when the secondary resistance Rs is measured based on each of the two current amplitudes I1 and I2 and the secondary resistances Rr of the two measurement results are Rr1 and Rr2, a secondary resistance Rr0 may be recalculated using the following similar equation:

$$Rr0=(I100 \times Rr1-I2 \times Rr1-I100 \times Rr2+I1 \times Rr2) \div (I1-I2) \qquad (98),$$

where Rr1 denotes a first secondary resistance relative to the first current amplitude I1, and Rr2 denotes a second secondary resistance relative to the second current amplitude I2.

As mentioned above, in the induction motor constant measuring apparatus according to the present preferred embodiment, the inverter 2 feeds the single-phase AC power at least at two current amplitudes in the frequency range equal to or higher than 0.006 Hz and equal to or lower than 1.5 Hz. Therefore, it is possible to calculate the relationship between current and inductance. As a result, even when the rated exciting current value is inaccurate, an exciting current value at which a desired voltage is applied at a desired frequency during operation can be calculated. In addition, even for the induction motor 1 the inductance value of which is changed by the magnetic saturation the inductance corresponding to the exciting current at which the desired voltage is applied at the desired frequency during operation can be calculated.

Nineteenth Preferred Embodiment

In the eighteenth preferred embodiment, the inverter 2 feeds the single-phase AC power at least at two current amplitudes in the frequency range equal to or higher than 0.006 Hz and equal to or lower than 1.5 Hz, and the relationship between current and inductance is calculated. However, the present invention is not limited to this. The inverter 2 may feed a single-phase AC power at least at two frequencies in a frequency range equal to or higher than 0.006 Hz and equal to or lower than 1.5 Hz, the feeding of single-phase AC power may be executed at least at two current amplitudes, and the relationship between current and inductance may be calculated.

FIG. 41 shows states of feeding a single-phase AC power in an induction motor constant measuring apparatus according to a nineteenth preferred embodiment of the present invention, where FIG. 41(a) is a waveform chart showing an amplitude of a current fed in single phase, FIG. 41(b) is a waveform chart showing a frequency of the current fed in single phase, and FIG. 41(c) is a waveform chart showing a U-phase current ius of an induction motor 1 fed in single phase. It is noted that the amplitude of the current fed in single phase shown in FIG. 41(a) is normalized by the rated exciting current based on face plate values.

Referring to FIG. 41, for an interval Ta, a current amplitude command signal is applied at 0.5 Hz that is a first frequency with 0.7 [p.u.] that is a first amplitude. For an interval Tb, the current amplitude command is applied at 0.5 Hz that is the first frequency with 1.3 [p.u.] that is a second amplitude I2. For an interval Tc, the current command signal is applied at 1.0 Hz that is a second frequency with 1.3 [p.u.] that is the second amplitude I2. For a interval Td, the current command signal is applied at 1.0 Hz that is the second frequency with 0.7 [p.u.] that is the first amplitude I1. In this case, by measuring the intervals Ta and Td, a first inductance Ls1 and a first secondary resistance Rr1 are measured using the constant measuring method according to the tenth preferred embodiment. Further, by measuring the inter as Tb and Tc, a second inductance Ls2 and a second secondary resistance Rr2 are measured using the constant measuring method according to the tenth preferred embodiment.

As mentioned above, according to the present preferred embodiment, even when the rated exciting current value is inaccurate, an exciting current value I100 and an inductance value Ls100 when a desired voltage is applied at a desired frequency during operation can be calculated with higher accuracy based on the two sets of measured values (Ls1, Rr1) and (Ls2, Rr2) measured at current amplitudes different from each other using a method similar to the constant measuring method according to the eighteenth preferred embodiment. In other words, substituting the first amplitude I1, the second amplitude I2, the first inductance value Ls1, and the second inductance value Ls2 into the equations (93) and (94) according to the eighteenth preferred embodiment, the rated exciting current amplitude I100 and the inductance Ls100 can be calculated. When the frequency or amplitude is changed with a lamp function such as those from 3 to 4 seconds, from 6 to 7 seconds, and from 8 to 9 seconds as shown in FIG. 41, the same advantageous effects can be attained even if the frequency or amplitude is changed at stepped manner.

Twentieth Preferred Embodiment

In the preferred embodiments mentioned above, the current command signal iu* which reaches a pea value at a power-feeding start time t=0 [sec] is applied. However, in the induction motor 1, a time constant of a magnetic flux is generally higher than that of a current. Due to this, in order to measure the constants with higher accuracy, it is preferable to measure the reactance component X using the voltage command signal vu* after the magnetic flux becomes a stationary state from start of power-feeding FIG. 42 shows waveform charts when a current command signal iu* at 0.255 [Hz] which signal reaches a peak value at a power-feeding start time t=0 [sec] according to a twentieth preferred embodiment of the present invention, where FIG. 42(a) is a waveform chart of three-phase voltages vu, v, and vw of an induction motor at that time, FIG. 42(b) is a waveform chart of three-phase currents iu, iv, and iw of the induction motor at that time, and FIG. 42(c) is a waveform chart showing a secondary magnetic flux φur of the induction motor at that time. FIG. 42 shows the results as obtained by using the circuit configuration shown in FIG. 32. Referring to FIG. 42, the secondary magnetic flux φur right after the start of power-feeding is not in the form of a sinusoidal wave, that is, not in a stationary state. When the reactance component X may be calculated after the magnetic flux becomes the stationary state, the time from the start of power-feeding until the magnetic flux becomes the stationary state is wasted, and this leads to such a problem that the measuring time is lengthened.

Therefore, according to the present preferred embodiment, the current command signal iu* is applied as expressed by the following equation so as to solve the above problem and to feed a current iu when the secondary magnetic flux φur becomes the stationary state right after the start of power-feeding to the induction motor 1:

$$iu^*=Iamp \sin(2\pi ft+(2\pi fTr+k\pi)) \qquad (99),$$

where "t" denotes a time with the power-feeding start time set to t=0 [sec], Iamp denotes a current amplitude [A] of the current command signal iu*, f denotes a frequency [Hz] of the current command signal iu*, Tr denotes a secondary time constant [sec], and "k" denotes any integer.

The reason for stabilizing the secondary magnetic flux φur into the stationary state right after the start of power-feeding by applying the current command signal iu* expressed by the equation (99) to the inverter 2 will be described hereinafter.

In order to stabilize the secondary magnetic flux φur right after the start of power-feeding, it suffices that the secondary magnetic flux φur becomes zero at the start of power-feeding and may rise in a sinusoidal fashion relative to the time t. To this end, the current command signal iu* which enables the secondary magnetic flux φur to become zero at the start of power-feeding is obtained. A relational equation between the current iu and the secondary magnetic flux φur is expressed as follows:

$$iu = \frac{1}{M}\left(1 + \frac{d}{dt}Tr\right)\phi ur. \tag{100}$$

As apparent from the equation (100), the secondary magnetic flux φur which becomes zero right after the start of power-feeding is expressed by the following equation:

$$\phi ur = \phi amp \sin(2\pi ft) \tag{101},$$

where φamp denotes an amplitude of the secondary magnetic 15 flux. The current iu when the secondary magnetic flux φur is expressed by the equation (101) is expressed by an equation (102) from the relationship between the equations (100) and (101). When it is assumed that 2πfTr<<1 is satisfied, an approximate equation (103) is used:

$$\begin{aligned} iu &= \frac{\sqrt{1 + 4\pi^2 Tr^2}}{M} \phi amp \, \cos\left(2\pi ft - \tan^{-1}\left(\frac{1}{2\pi fTr}\right)\right) \\ &= Iamp \, \cos\left(2\pi ft - \tan^{-1}\left(\frac{1}{2\pi fTr}\right)\right) \\ &\cong Iamp \, \cos\left(2\pi ft + \left(2\pi fTr - \frac{\pi}{2} + k\pi\right)\right) \\ &= Iamp \, \sin(2\pi ft + (2\pi fTr + k\pi)), \end{aligned} \tag{102}$$

and $$-\tan^{-1}\left|\frac{1}{2\pi fTr}\right| \cong 2\pi fTr - \frac{\pi}{2} + k\pi. \tag{103}$$

Accordingly, by applying the current command signal iu* to the inverter 2 so that the current iu the phase of which is (2πfTr+kπ) [rad] at the power-feeding start time t=0 [sec] as expressed in the equation (102) flows in the induction motor 1, the secondary magnetic flux φur becomes zero right after the start of power-feeding.

FIG. 43 shows waveform charts when the current command signal iu* at 0.255 [Hz] is applied to the inverter 2 so that the secondary magnetic flux φur becomes zero at the power-feeding start time according to the twentieth preferred embodiment of the present invention, where FIG. 43(a) is a waveform chart of three-phase voltages vu, vv, and vw of the induction motor at that time, FIG. 43(b) is a waveform chart of three-phase currents iu, iv, and iw of the induction motor at that time, and FIG. 43(c) is a waveform chart showing the secondary magnetic flux φur of the induction motor at that time. FIG. 43 shows results as obtained by using the circuit configuration shown in FIG. 32. As apparent from FIG. 43, by applying the current command signal iu* expressed by the equation (99) to the inverter 2, the secondary magnetic flux φur turns into a sinusoidal form right after the start of power-feeding.

It is noted that the AC rotary machine constant measuring apparatus shown in the present preferred embodiment is intended to obtain the secondary time constant Tr, and the secondary time constant Tr is, therefore, unknown. According to the present preferred embodiment, a design value or an approximate value is used as an estimated value of the secondary time constant Tr. As can be seen from the above, by applying the current command signal iu* which enables the secondary magnetic flux to become approximately zero at the start of power-feeding as expressed by the equation (99), there can be obtained such advantageous effects that a settling time before the secondary magnetic flux φur becomes the stationary state can be shortened, the measurement accuracy right after the start of power-feeding can be improved, and the reactance component X can be measured with high accuracy.

As mentioned above, in the AC rotary machine constant measuring apparatus according to the present preferred embodiment, the inverter 2 feeds the sinusoidal wave current at which the secondary magnetic flux becomes approximately zero at the start of power-feeding to the induction motor 1 so as to shorten the settling time before the secondary magnetic flux becomes the stationary state, and to improve the measurement accuracy right after the start of power-feeding. By feeding this current to the induction motor 1, the settling time before the magnetic flux becomes the stationary state can be shortened, and the measurement accuracy right after the start of power-feeding can be improved. When FIG. 43 shows a case of feeding the AC power at one frequency, the same advantageous effects can be attained even when AC power is fed continuously at different frequencies as shown in FIG. 41.

Modified Preferred Embodiments

In the preferred embodiments mentioned above, the apparatus for measuring the constants of the induction motor 1 or the synchronous motor has been described. However, the present invention is not limited to this. The constant measuring method according to each of the preferred embodiments mentioned above can be easily applied to an apparatus for measuring constants of a generator of one of these apparatuses. Accordingly, the constant measuring method according to each of the preferred embodiments can be widely applied to AC rotary machines including the induction motor, the synchronous motor, and the synchronous generator.

INDUSTRIAL APPLICABILITY

As mentioned above in detail, according to the AC rotary machine constant measuring apparatus of the present invention, the measuring apparatus can measure electric constants such as the primary inductance, the secondary resistance and the secondary time constant of the AC rotary machine having a rated capacity of, for example, at least 1.5 kW to 280 kW with higher accuracy than that of the prior art, even when the AC rotary machine is connected to a load equipment or machine. In addition, the measuring apparatus of the present invention can quickly measure the electric constants of the AC rotary machine, and can comfortably measure them within quite a shorter time without making the machine user has any consciousness of the waiting time.

The invention claimed is:

1. An apparatus for measuring constants of an AC rotary machine, comprising:
   said AC rotary machine;
   a power conversion device for converting an inputted voltage command signal into a single-phase AC power, and feeding the single-phase AC power to said AC rotary machine;

a current detection device for detecting a current of the single-phase AC power fed from said power conversion device to said AC rotary machine;

a first control device for generating a voltage command signal corresponding to an AC voltage to be applied to said AC rotary machine from said power conversion device, and outputting the generated voltage command signal to said power conversion device; and a second control device for calculating the constants of said AC rotary machine based on a relationship between the voltage and the current of the single-phase AC power fed to said AC rotary machine, wherein said first control device generates the voltage command signal and controls said power conversion device so as to feed the single-phase AC power having at least one frequency selected in a range, which is equal to or higher than a lower limit frequency of 0.006 Hz, and which is equal to or lower than an upper limit frequency of 1.5 Hz, to said AC rotary machine at least once, so that said second control device calculates the electric constants of said AC rotary machine based on the voltage command signal.

2. The apparatus for measuring the constants of the AC rotary machine according to claim 1, wherein said first control device generates the voltage command signal and controls said power conversion device so as to feed the single-phase AC power to said AC rotary machine for an interval selected in a range of the number of cycles, which are equal to or larger than a lower limit number of cycles that is two, and which are equal to or smaller than a predetermined upper limit number of cycles.

3. The apparatus for measuring the constants of the AC rotary machine according to claim 2, wherein the lower limit frequency is set to 0.06 Hz.

4. The apparatus for measuring the constants of the AC rotary machine according to claim 2, wherein the lower limit frequency is set to 0.06 Hz, and the upper limit number of cycles is set to 45.

5. The apparatus for measuring the constants of the AC rotary machine according to claim 2, wherein the lower limit frequency is set to 0.1 Hz, the lower limit number of cycles is set to 3, and the upper limit number of cycles is set to 45.

6. The apparatus for measuring the constants of the AC rotary machine according to claim 1, wherein said first control device generates the voltage command signal and controls said power conversion device so as to feed the single-phase AC power having the frequency selected in a frequency range, which is equal to or higher than 40 Hz, and which is equal to or lower than a carrier frequency of said power conversion device, to said AC rotary machine, so that said second control device calculates a leakage inductance of said AC rotary machine.

7. The apparatus for measuring the constants of the AC rotary machine according to claim 1, wherein said first control device generates the voltage command signal and controls said power conversion device so as to feed the single-phase AC powers having at least two frequencies different from each other, to said AC rotary machine, so that said second control device calculates the electric constants of said AC rotary machine.

8. The apparatus for measuring the constants of the AC rotary machine according to claim 1, wherein said first control device generates the voltage command signal and controls said power conversion device so as to feed the single-phase AC powers having at least two current amplitudes different from each other, to said AC rotary machine, so that said second control device calculates the electric constants of said AC rotary machine.

9. The apparatus for measuring the constants of the AC rotary machine according to claim 7, wherein said first control device generates the voltage command signal and controls said power conversion device so as to feed the single-phase AC powers having at least two current amplitudes different from each other, to said AC rotary machine, so that said second control device calculates the electric constants of said AC rotary machine.

10. The apparatus for measuring the constants of the AC rotary machine according to claim 9, wherein said second control device calculates the electric constants of said AC rotary machine, by calculating an amplitude of a quadrature phase component of the voltage command signal relative to a current command signal, using an integral operation equation for integrating said current command signal for an integral interval obtained by removing an interval near a current zero cross from a predetermined set integral interval.

11. The apparatus for measuring the constants of the AC rotary machine according to claim 7, wherein said first control device generates the voltage command signal and controls said power conversion device so as to feed the single-phase AC powers having at least the two frequencies different from each other, to said AC rotary machine in a time division manner, so that said second control device calculates the electric constants of said AC rotary machine.

12. The apparatus for measuring the constants of the AC rotary machine according to claim 7, wherein said first control device generates the voltage command signal and controls said power conversion device so as to superimpose the single-phase AC powers having at least the two frequencies different from each other, and feed a superimposed single-phase AC power to said AC rotary machine, so that said second control device calculates the electric constants of said AC rotary machine.

13. The apparatus for measuring the constants of the AC rotary machine according to claim 7, wherein said second control device calculates reactance components of serially combined impedances of an equivalent circuit of said AC rotary machine corresponding to said at least two frequencies different from each other, and calculates the electric constants of said AC rotary machine based on the calculated reactance components of the respective serially combined impedances.

14. The apparatus for measuring the constants of the AC rotary machine according to claim 7, wherein said second control device calculates the electric constants of said AC rotary machine by measuring amplitude ratios of quadrature phase components of the current detected by said current detection device, relative to the voltage command signal so as to correspond to said at least two frequencies, respectively.

15. The apparatus for measuring the constants of the AC rotary machine according to claim 7, wherein said power conversion device converts said inputted voltage command signal into three-phase AC powers equivalent to the single-phase AC power, and feeds the three-phase AC powers to said AC rotary machine.

16. The apparatus for measuring the constants of the AC rotary machine according to claim 7, wherein said first control device generates the voltage command signal and outputs the voltage command signal to said power conversion device based on a generated current command signal and the current detected by said current detection device, and wherein said current command signal is set to a rated exciting current value of said AC rotary machine.

17. The apparatus for measuring the constants of the AC rotary machine according claim 7, wherein said second control device calculates the electric constants of said AC rotary machine, by calculating an amplitude of a quadrature phase component of the voltage command signal relative to a current command signal, using an integral operation equation for integrating said current command signal for an integral interval obtained by removing an interval near a current zero cross from a predetermined set integral interval.

18. The apparatus for measuring the constants of the AC rotary machine according to claim 17, wherein said first control device generates the voltage command signal and outputs the voltage command signal to said power conversion device based on a generated current command signal and the current detected by said current detection device, and wherein said current command signal at least at start of power-feeding is a sinusoidal wave having one frequency f selected in a range, which is equal to or higher than the lower limit frequency of 0.006 Hz, and which is equal to or lower than the upper limit frequency of 1.5 Hz, and a phase of the current command signal at a power-feeding start time of t=0 [sec] is set to ($2\pi fTr+kr$) [rad] for the sinusoidal wave that becomes zero at the power-feeding start time of t=0 [sec], based on a secondary time constant Tr, the frequency f, and any integer "k".

19. The apparatus for measuring the constants of the AC rotary machine according to claim 1, wherein said power conversion device converts said inputted voltage command signal into three-phase AC powers equivalent to the single-phase AC powers and feeds the three-phase AC powers to said AC rotary machine.

20. The apparatus for measuring the constants of the AC rotary machine according to claim 1, wherein said first control device generates the voltage command signal and outputs the voltage command signal to said power conversion device based on a generated current command signal and the current detected by said current detection device, and wherein said current command signal at least at start of power-feeding is a sinusoidal wave having one frequency f selected in a range, which is equal to or higher than the lower limit frequency of 0.006 Hz, and which is equal to or lower than the upper limit frequency of 1.5 Hz, and a phase of the current command signal at a power-feeding start time of t=0 [sec] is set to ($2\pi fTr+kr$) [rad] for the sinusoidal wave that becomes zero at the power-feeding start time of t=0 [sec], based on a secondary time constant Tr, the frequency f, and any integer "k".

* * * * *